(12) United States Patent
Miura et al.

(10) Patent No.: US 6,317,523 B1
(45) Date of Patent: Nov. 13, 2001

(54) IMAGE DATA ADJUSTING DEVICE AND METHOD

(75) Inventors: Hideki Miura; Koji Urasawa; Kazuhiko Ito, all of Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 08/959,619

(22) Filed: Oct. 28, 1997

(30) Foreign Application Priority Data

| Oct. 30, 1996 | (JP) | ................................................ 8-303844 |
| Dec. 27, 1996 | (JP) | ................................................ 8-358786 |
| Sep. 24, 1997 | (JP) | ................................................ 9-278091 |

(51) Int. Cl.[7] ........................................................ G06K 9/32
(52) U.S. Cl. ........................ 382/298; 382/300; 345/127; 358/428
(58) Field of Search ............................ 382/276, 298–299, 382/300; 348/448, 452, 458; 358/447, 428, 525, 431; 364/723; 345/515, 432, 516, 439, 501, 427, 136–137, 127, 130–132, 428, 128, 186, 196; 708/290

(56) References Cited

U.S. PATENT DOCUMENTS

| 4,853,794 | * | 8/1989 | Fukumoto et al. ................... 358/447 |
| 4,988,984 | * | 1/1991 | Gonzalez-Lopez .................. 345/132 |
| 5,054,100 | * | 10/1991 | Tai ....................................... 382/300 |
| 5,222,204 | * | 6/1993 | Swanson .............................. 345/427 |
| 5,299,300 | * | 3/1994 | Femal et al. ......................... 345/428 |
| 5,719,594 | * | 2/1998 | Potu ..................................... 345/130 |
| 5,801,678 | * | 9/1998 | Huang et al. ........................ 345/127 |
| 5,847,714 | * | 12/1998 | Naqvi et al. ......................... 345/439 |

FOREIGN PATENT DOCUMENTS 0 303 214 A2 * 2/1989 (EP) ............................... G06F/15/72

* cited by examiner

Primary Examiner—Leo Boudreau
Assistant Examiner—Ishrat Sherali
(74) Attorney, Agent, or Firm—Akin, Gump, Strauss, Hauer & Feld, L.L.P.

(57) ABSTRACT

An image data adjusting device adjusts the number of pixels of input image data. The device includes a data adjusting table representing magnifications for all the pixels of the input image data per direction in which the number of the pixels of the input image data is adjusted. The device further includes a data adjusting section which refers to the data adjusting table and copies each of the pixels serially inputted in a scan direction as many times as represented by the corresponding magnification of the data adjusting table, thereby to obtain output image data.

3 Claims, 53 Drawing Sheets

| X-DIRECTION MAGNIFICATION TABLE | |
|---|---|
| COLUMN | MAGNIFI-CATION |
| 0 | 2 |
| 1 | 2 |
|  |  |
| x1−1 | 3 |
| TOTAL | x2 |

1X

| Y-DIRECTION MAGNIFICATION TABLE | |
|---|---|
| COLUMN | MAGNIFI-CATION |
| 0 | 3 |
| 1 | 4 |
|  |  |
| y1−1 | 3 |
| TOTAL | y2 |

1Y

INPUT IMAGE SIZE: x1·y1
OUTPUT IMAGE SIZE: x2·y2

FIG. 7A

INCREASE (FOUR TIMES)

| Index | MAGNIFICATION |
|-------|---------------|
| 0 | 4 |
| 1 | 4 |
| 2 | 4 |
| 3 | 4 |
| ⋮ | ⋮ |
| n−2 | 4 |
| n−1 | 4 |

} REDUNDANT

FIG. 7B

INCREASE (1.5 TIMES)

| Index | MAGNIFICATION |
|-------|---------------|
| 0 | 1 |
| 1 | 2 |
| 2 | 1 |
| 3 | 2 |
| ⋮ | ⋮ |
| n−2 | 1 |
| n−1 | 2 |

} REDUNDANT

FIG. 8

INCREASE (1.5 TIMES)

| Index | MAGNIFICATION |
|-------|---------------|
| 0 | 1 |
| 1 | 2 |

TABLE SIZE = 2

INPUT IMAGE

IMAGE DATA ADJUSTING DEVICE AND METHOD

BACKGROUND OF THE INVENTION

1. Field of the Invention

The present invention relates to a device and a method for adjusting, by a desired magnification, the number of pixels of image data which is displayed or printed using a data processing device.

2. Description of the Prior Art

In personal computers, printers and various other data processing devices, when transferring image data between applications having different image data resolutions, an image data adjusting process is carried out for a resolution adjustment by increasing or decreasing the number of pixels of the image data. Further, when storing image data having a large number of pixels into a memory, a process is performed to decrease the number of pixels of the image data for reducing a storage capacity of the memory. The number of the pixels of the image data may also be reduced upon transmitting the image data via a communication line for reducing a transmission time.

When, for example, increasing the number of pixels of image data by integer times (integral magnifications) in width and height directions (X- and Y-directions), respectively, each pixel is copied as many times as represented by the magnifications in the X- and Y-directions. Accordingly, for example, each pixel is copied N times in the X-direction and M times in the Y-direction so that image data having N×M times pixels can be obtained.

On the other hand, when increasing the number of pixels of image data by a magnification of a real number not an integer, such as 1.5 times or 2.5 times, in either direction, the pixels to be copied and the pixels not to be copied are mixed to achieve such a magnification.

For increasing the number of pixels, it is the simplest to add a pixel of the same pixel value at a subsequent position. However, in case of an image expressing the halftone, unnatural shade is generated to deteriorate the quality of the image when displayed or printed. This is particularly significant when adjusting the number of pixels of image data by a non-integral magnification.

Accordingly, for achieving smooth change in pixel values of pixels in an output image which are increased by copying, a proper calculation is carried out by referring to a plurality of peripheral pixels. This is called a resampling process, wherein the method of first degree interpolation or the like is used for calculating pixel values of the respective pixels.

However, the foregoing conventional technique has the following problem:

For calculating pixel values of output pixels in an output image using the method of first degree interpolation or the like, it is necessary to provide in advance pixel values of input pixels disposed around each of the output pixels whose pixel values are to be derived. Accordingly, it is necessary that, for example, substantially one-page image data or the like be stored in advance in a buffer memory and then read out in turn to be subjected to a given process.

Thus, the conventional technique can not achieve the effective use of the memory and prolongs an image data processing time.

SUMMARY OF THE INVENTION

Therefore, it is an object of the present invention to provide an improved image data adjusting device.

It is another object of the present invention to provide an improved image data adjusting method.

According to one aspect of the present invention, there is provided an image data adjusting device for adjusting the number of pixels of input image data to obtain output image data, the device comprising: a data adjusting table representing magnifications for all the pixels of the input image data per direction in which the number of the pixels of the input image data is adjusted; and a data adjusting section which refers to the data adjusting table to copy each of the pixels serially inputted in a scan direction as many times as represented by the corresponding magnification of the data adjusting table, thereby to obtain the output image data.

According to another aspect of the present invention, there is provided an image data adjusting method for adjusting the number of pixels of input image data to obtain output image data, the method comprising the steps of: preparing a data adjusting table representing magnifications for all the pixels of the input image data per direction in which the number of the pixels of the input image data is adjusted; and referring to the data adjusting table to copy each of the pixels serially inputted in a scan direction as many times as represented by the corresponding magnification of the data adjusting table, thereby to obtain the output image data.

According to another aspect of the present invention, there is provided an image data adjusting device for adjusting the number of pixels of input image data to obtain output image data, the device comprising: a magnification deriving section which derives, based on a predetermined regular relationship between positions of the pixels in the input image data as seen in a pixel adjusting direction of the input image data and magnifications of the corresponding pixels, a magnification for each of the pixels in the pixel adjusting direction of the input image data; and a data adjusting section which copies each of the pixels serially inputted in a scan direction as many times as represented by the magnification derived by the magnification deriving section, thereby to obtain the output image data.

According to another aspect of the present invention, there is provided an image data adjusting method for adjusting the number of pixels of input image data to obtain output image data, the method comprising the steps of: performing a modulo arithmetic relative to a position coordinate of each of the pixels in the input image data as seen in a pixel adjusting direction of the input image data; deriving a magnification for each of the pixels in the pixel adjusting direction of the input image data corresponding to a result of the modulo arithmetic; and copying each of the pixels serially inputted in a scan direction as many times as represented by the derived magnification, thereby to obtain the output image data.

According to another aspect of the present invention, there is provided an image data adjusting method, wherein the number of pixels of input image data is increased by a given magnification in a given direction to obtain output image data and a pixel value of each of pixels of the output image data is subjected to a first degree interpolation based on a position of each of the pixels of the output image data in an image represented by the input image data, the method comprising the steps of: setting a pixel value of each of the pixels of the input image data to be equal to a pixel value of a pixel at a corner of a tetragonal block corresponding to one of the pixels of the input image data and obtained by increasing the number of the pixels of the input image data by the given magnification; and first-degree-interpolating pixel values of the other pixels forming the tetragonal block based on pixel values of pixels at corners of adjacent tetragonal blocks.

According to another aspect of the present invention, there is provided an image data adjusting method for increasing the number of pixels of input image data by a given magnification in a given direction to obtain output image data, the method comprising the steps of: setting a tetragonal lattice formed by the pixels of the input image data at a corresponding position in an image represented by the output image data; and first-degree-interpolating pixel values of output pixels included in the tetragonal lattice based on pixel values of the input pixels forming the tetragonal lattice.

It may be arranged that one of the output pixels in the tetragonal lattice is selected and subjected to a first-degree-interpolating, and each of the pixel values of the other output pixels in the tetragonal lattice is derived by applying to a result of the first-degree-interpolation a conversion process based on a positional relationship to the selected pixel.

According to another aspect of the present invention, there is provided an image data adjusting device, wherein an input image is equally divided into small regions by boundaries parallel to a main scan direction and boundaries parallel to a secondary scan direction, and each of pixel values of output pixels is derived by averaging pixel values of input pixels included in the corresponding small region so as to obtain an output image, the device comprising: an input image buffer for receiving and holding one-line data, as seen in a main scan direction, of pixel values of pixels forming the input image; an intermediate result buffer for accumulating the pixel values of the pixels, received in the input image buffer, in turn in the main scan direction and for holding per the small region the sum of the pixel values derived up to detection of a boundary pixel closest to and prior to the corresponding boundary parallel to the secondary scan direction; and a controller for processing the input image per one line in the secondary direction, reading from the intermediate result buffer the sum of the pixel values in each small region derived up to detection of a boundary pixel closest to and prior to the corresponding boundary parallel to the main scan direction, dividing the sum by the number of the pixels included in the corresponding small region to derive the mean value of the pixel values therein, and setting the mean value as the pixel value of the pixel of the output image.

It may be arranged that a parameter holding section is provided which sets and holds a sampling interval for sampling a portion of the pixels included in each small region and for totaling the pixel values of the sampled pixels, and that the intermediate result buffer totals the pixel values of the sampled pixels per sampling interval by referring to the parameter holding section and holds the sum of the pixel values of the sampled pixels.

It may be arranged that a plurality of sampling regions are set in each of the small regions so that each of the sampling regions includes a plurality of the pixels in the corresponding small region which are continuously arranged in the main scan direction, that a sampling total counter is further provided for totaling the sampled pixel values to obtain a total pixel value per the sampling region, that the controller derives a mean value of the sampled pixel values in each of the sampling regions based on the total pixel value and the number of the pixels included in the corresponding sampling region, and that the intermediate result buffer holds an accumulated value of the mean values for each of the small regions.

According to another aspect of the present invention, there is provided an integral magnification calculator comprising: a first storage section for storing an N-figure value below decimal point of a result of multiplication in which an integer to be processed is multiplied by a real number; a second storage section for storing an N-figure value below decimal point of the real number; and a calculating section for comparing the value stored in the first storage section and the value stored in the second storage section, and outputting an integral part of the multiplication result when the former value is not smaller than the latter value while outputting a value obtained by raising to unit figures below decimal point of the multiplication result when the former value is smaller than the latter value.

According to another aspect of the present invention, there is provided an image data adjusting device, wherein the product of a coordinate value of each of pixels in an input image and a real number representing a magnification for increasing the number of the pixels of the input image in a given direction is derived and an integer not exceeding the product is determined to be the number of copy times for the corresponding pixel so as to obtain output image data, the device comprising: a register for holding only an N-figure value below decimal point of the product and allowing a value above decimal point of the product to overflow to be invalid; and a magnification deriving section for comparing the value held in the register and an N-figure value below decimal point of the real number every time the product is derived, and determining the number of copy times to be a value obtained by omitting figures below decimal point of the product when the former value is not smaller than the latter value while determining the number of copy times to be a value obtained by raising to unit figures below decimal point of the product when the former value is smaller than the latter value.

According to another aspect of the present invention, there is provided an image data adjusting device, wherein the number of pixels of an input image is increased by a magnification represented by a real number to obtain an output image, the input pixels forming the input image are mapped on the output image to set rectangular regions defined by the mapped input pixels as neighborhood areas, and an integer not exceeding the product of a coordinate value representing a position of the corresponding neighborhood area in the output image and the magnification is determined to be the number of output pixels arranged in a coordinate axis direction in the corresponding neighborhood area, the device comprising: a register for holding only an N-figure value below decimal point of the product and allowing a value above decimal point of the product to overflow to be invalid; and a magnification deriving section for comparing the value held in the register and an N-figure value below decimal point of the real number every time the product is derived, and determining the number of the output pixels to be a value obtained by omitting figures below decimal point of the product when the former value is not smaller than the latter value while determining the number of the output pixels to be a value obtained by raising to unit figures below decimal point of the product when the former value is smaller than the latter value.

It may be arranged that an initial value of an output of the magnification deriving section is set to be a predetermined constant.

According to another aspect of the present invention, there is provided an image data adjusting device, wherein the product of a coordinate value of each of pixels in an input image and a real number representing a magnification for increasing the number of the pixels of the input image in a given direction is derived and an integer not exceeding the product is determined to be the number of copy times for the corresponding pixel so as to obtain output image data, the device comprising: a register for holding only an N-figure value below decimal point of the product and allowing a value above decimal point of the product to overflow to be invalid; a magnification deriving section for comparing the value held in the register and an N-figure value below decimal point of the real number every time the product is derived, and determining the number of copy times to be a value obtained by omitting figures below decimal point of the product when the former value is not smaller than the latter value while determining the number of copy times to be a value obtained by raising to unit figures below decimal point of the product when the former value is smaller than the latter value; and a clipping calculator which, when an edge portion of an output image represented by the output image data protrudes from a printable region, derives a pixel magnification for the edge portion of the output image based on data about the printable region and sets the pixel magnification for the edge portion to be an initial value of the number of copy times.

BRIEF DESCRIPTION OF THE DRAWINGS

The present invention will be understood more fully from the detailed description given hereinbelow, taken in conjunction with the accompanying drawings.

In the drawings:

FIGS. 1A and 1B are diagrams for explaining an operation of an image data adjusting device according to a first preferred embodiment of the present invention, wherein FIG. 1A shows X- and Y-direction pixel magnification tables and FIG. 1B shows input image data and output image data;

FIGS. 7A and 7B are diagrams for explaining redundancy of a data adjusting table;

FIG. 8 is a diagram showing a magnification table to be used in the second preferred embodiment;

DESCRIPTION OF THE PREFERRED EMBODIMENT

Now, preferred embodiments of the present invention will be described hereinbelow.

Throughout the specification, "increasing or decreasing the number of pixels of image data" may also be referred to as "increasing or decreasing image data" for brevity of description.

<First Embodiment>

Figures 1A, 1B:
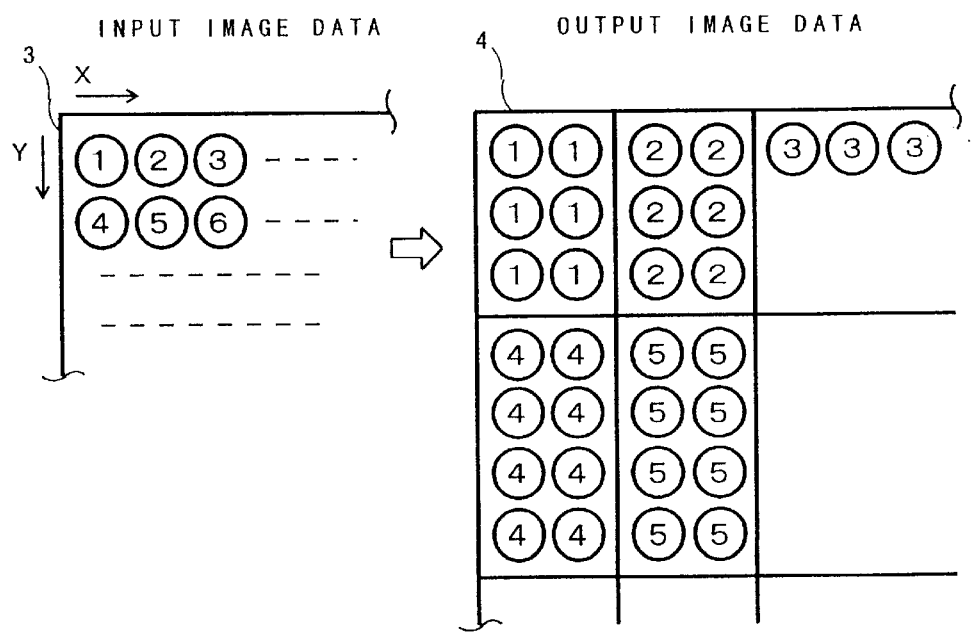

FIGS. 1A and 1B are diagrams for explaining an operation of an image data adjusting device 6 (see FIG. 2) according to the first preferred embodiment, wherein FIG. 1A shows X- and Y-direction pixel magnification tables 1X and 1Y and FIG. 1B shows input image data 3 and output image data 4.

When, for example, increasing the number of pixels of the input image data 3, that is, increasing the input image data 3, by (x2/x1) times in an X-direction and (y2/y1) times in a Y-direction, each input pixel is copied by given magnifications in the X- and Y-directions, respectively, as shown in FIG. 1B. In this embodiment, pixel values are unchanged. By setting the pixel magnifications to be different depending on positions of the pixels in the input image data, the input image data can be increased by a non-integral magnification.

In FIG. 1A, the X-direction magnification table 1X shows pixel magnifications in the X-direction, while the Y-direction magnification table 1Y shows pixel magnifications in the Y-direction. For example, a pixel on column 0 and line 0 of the input image data, that is, a pixel 1 of the input image data 3 shown in FIG. 1B is, by referring to the tables 1X and 1Y, copied two times in the X-direction and three times in the Y-direction. Similarly, a pixel 4 of the input image data 3 shown in FIG. 1B is copied two times in the X-direction and four times in the Y-direction. Accordingly, the tables 1X and 1Y as a whole represent a magnification per pixel and per direction in which the number of the pixels of the input image data is adjusted.

The image data is normally handled as a bit stream and processed per pixel in the X-direction (main scan direction), and the process is repeated in the Y direction (secondary scan direction).

The tables 1X and 1Y are provided so that the pixels of the input image data 3 serially received in the main scan direction can be processed in turn as they are.

Figure 2:
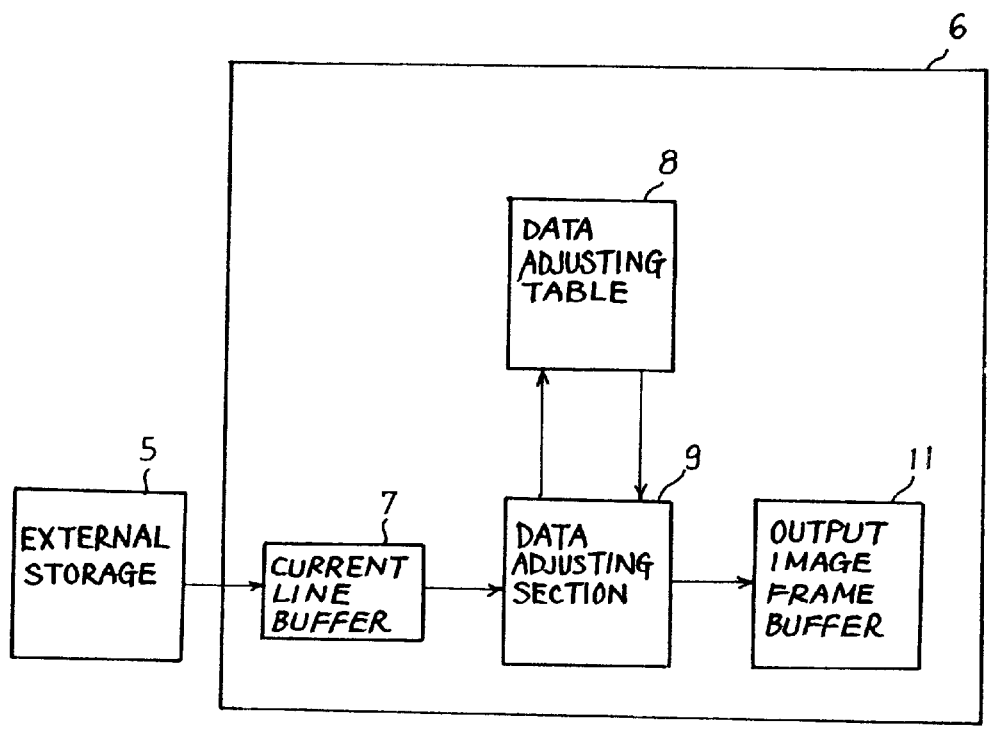
FIG. 2 is a block diagram showing the image data adjusting device according to the first preferred embodiment.

FIG. 2 is a block diagram showing the image data adjusting device 6 according to the first preferred embodiment. The image data adjusting device 6 is actually incorporated in a data processing device, such as a personal computer or a printer, for receiving the input image data stored in an external storage 5 and adjusting the number of the pixels thereof. The image data adjusting device 6 comprises a current line buffer 7, a data adjusting table 8, a data adjusting section 9 and an output image frame buffer 11. The current line buffer 7 is a memory for storing and holding the image data, per line, inputted in the main scan direction from the external storage 5. The data adjusting table 8 includes the X-direction magnification table 1X and the Y-direction magnification table 1Y shown in FIG. 1A. The data adjusting section 9 performs the data adjusting process as shown in FIG. 1B by referring to the data adjusting table 8. The image data applied with the data adjusting process is stored in the output image frame buffer 11. To the output image frame buffer 11 is connected an external device (not shown) to which the image data applied with the data adjusting process is transferred.

Now, comparison will be made to a case where the image data is increased by integer times and a case where the image data is increased by non-integer times.

Figure 3:
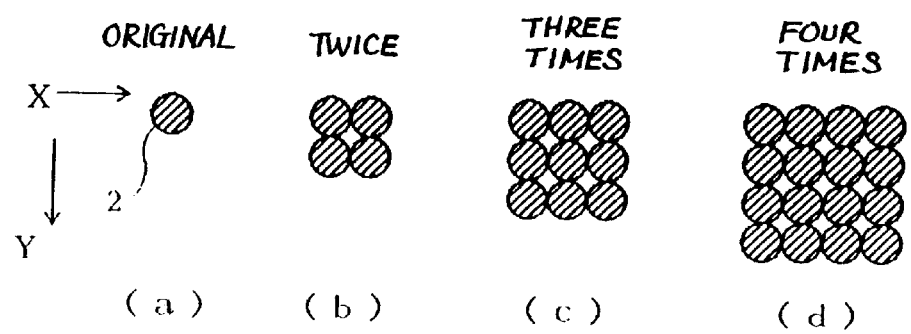
FIG. 3 is a diagram for explaining a case where the number of pixels of input image data is increased by an integral magnification.

FIG. 3 shows the former case (integer times).

In FIG. 3, if an original pixel 2 as shown at (a) is increased two times in the X-direction and two times in the Y-direction, the result is as shown at (b). Similarly, in case of three times in the X-direction and three times in the Y-direction, the result is as shown at (c). Similarly, in case of four times in the X-direction and four times in the Y-direction, the result is as shown at (d). As appreciated, even if the magnifications in the X- and Y-directions are further changed, similar results are obtained. In case of integer times, all the input pixels are subjected to the same process.

Figure 4:
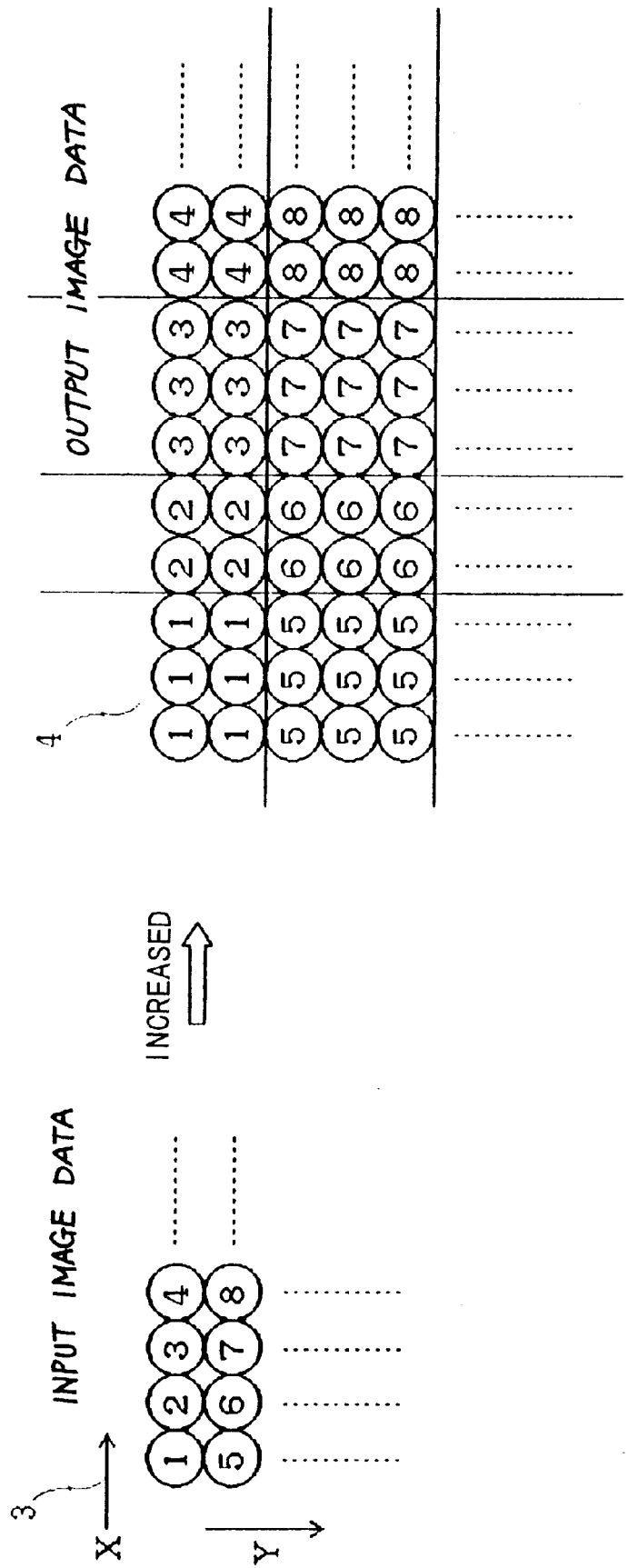
FIG. 4 is a diagram for explaining a case where the number of pixels of input image data is adjusted by a non-integral magnification.

On the other hand, FIG. 4 shows the latter case (non-integer times), wherein the nearest neighborhood method is carried out.

In FIG. 4, for increasing the image data by given real number magnifications in the X- and Y-directions, respectively, magnifications are set to be different per pixel. For example, a pixel 1 of the input image data 3 is copied three times in the X-direction and two times in the Y-direction in the output image data 4. On the other hand, a pixel 2 of the input image data 3 is copied two times in the X-direction and two times in the Y-direction in the output image data 4. Further, a pixel 5 in the input image data 3 is copied three times in the X-direction and three times in the Y-direction in the output image data 4. In the combination of these pixel magnifications, the increase of the image data by, for example, 1.2 times or 2.3 times can be achieved on the whole. On the other hand, when decreasing the image data, for example, when the output image data 4 is decreased to the input image data 3, a process is carried out that, every time one output pixel is received, the given numbers of subsequent pixels are removed or decimated in the X- and Y-directions, respectively.

In the first preferred embodiment, the tables 1X and 1Y shown in FIG. 1A are provided for immediately obtaining the output image data 4 when the input image data 3 is serially inputted in order of the pixels 1, 2, 3 - - - .

Figure 5:
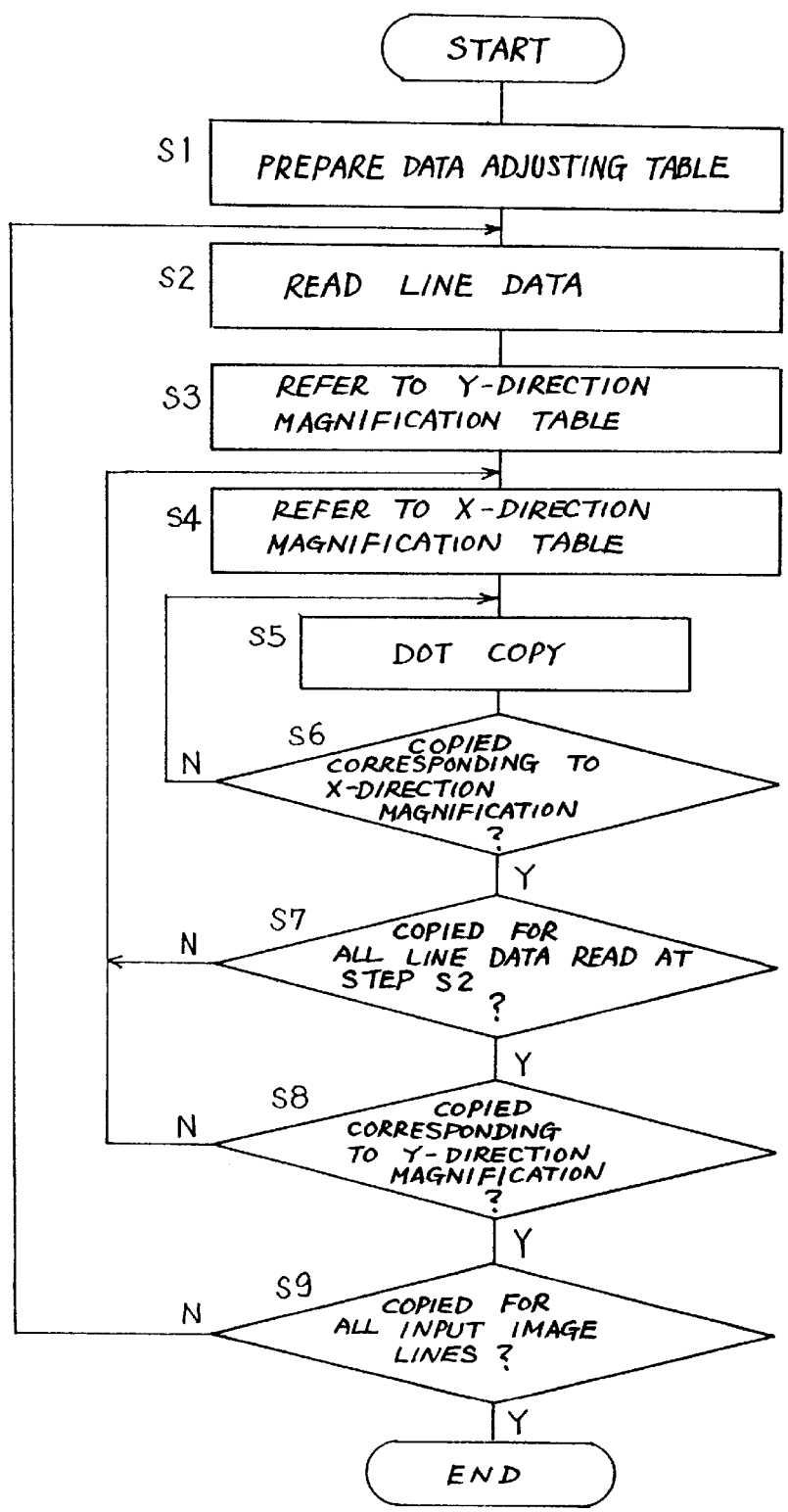
FIG. 5 is a flowchart representing an operation of the image data adjusting device according to the first preferred embodiment.

FIG. 5 is a flowchart representing an operation of the image data adjusting device 6 shown in FIG. 2, that is, an image data adjusting method according to the first preferred embodiment. The flowchart of FIG. 5 is actually executed by a CPU of the data processing device.

First at step S1, X- and Y-direction magnification tables are prepared. In practice, the tables are prepared in advance according to experimental data based on given increasing/decreasing magnifications of input image data in the X- and Y-directions. The table may be prepared in advance per magnification and per direction and stored in a memory or the like of the data processing device.

Then, at step S2, one-line input image data (bit stream) is read into the current line buffer 7 from the external storage 5 shown in FIG. 2. Subsequently, at step S3, the data adjusting section 9 refers to the Y-direction magnification table. Further, at step S4, the data adjusting section 9 refers to the X-direction magnification table. After recognizing the number of copy times of the corresponding pixel of the input image data in the X- and Y-directions, dot copy is carried out for that pixel. The dot copy is a process for copying a dot (pixel) in the X- or Y-direction to increase the number of dots as required, with a pixel value being unchanged. Subsequently, at step S6, it is checked whether the pixel (dot) has been copied corresponding to the X-direction magnification. In this manner, the input pixel is copied in the X-direction as many times as designated by the X-direction magnification table.

Then, for carrying out the same processes in turn in the X-direction, step S7 checks whether all the pixels stored in the current line buffer 7 have been processed. In this manner, the execution of steps S4 to S6 is repeated for all the pixels in the current line buffer 7. If answer at step S7 becomes positive, the routine advances to step S8 for processing the next line of the output image. Specifically, the execution of steps S4 to S7 is repeated corresponding to the Y-direction magnification read out at step S3. In this manner, the data increasing process for one line of the input image data in the X- and Y-directions is finished. Subsequently, the routine proceeds to step S9 where the data increasing process for the next line of the input image data is executed.

By repeating the execution of steps S2 to S9 corresponding to all the lines of the input image data, the data increasing process for all the pixels of the input image data is finished.

<Effect of First Embodiment>

As described above, in the first preferred embodiment, when the increasing/decreasing magnifications of the input image data in the X- and Y-directions are determined, there are provided the tables representing increasing/decreasing magnifications for all the pixels in the X- and Y-directions, respectively. With this arrangement, while receiving the input image data serially in the main scan direction, the data adjusting process can be applied to the input image data in turn. Thus, it is not necessary to store one-page input image data in the buffer memory in advance of the data adjusting process so that the limited memory resource can be effectively used. Further, since the data adjusting process can be carried out only by referring to the tables, the speed-up of the process can be realized.

In the foregoing flowchart, explanation has been made to the case where the input image data is increased. On the other hand, by setting a regulation that an X-direction magnification of zero represents deletion of the corresponding pixel and a Y-direction magnification of zero represents deletion of the corresponding line, the data decreasing process can be easily carried out by decimating the pixels and the lines. Further, the X- and Y-direction tables are free in expression and structure as long as they represent data about increasing/decreasing magnifications for each pixel in the corresponding directions, respectively.

<Second Embodiment>

In the foregoing first preferred embodiment, the integral magnifications assigned to the input pixels are stored in the form of the X- and Y-direction magnification tables. Accordingly, depending on magnitudes of the pixel magnifications or the input image size (throughout the specification, "size" represents "the number of pixels"), the data amount of the tables becomes relatively large. In the second preferred embodiment, the method is provided for reducing the data amount of the tables.

Figure 6:
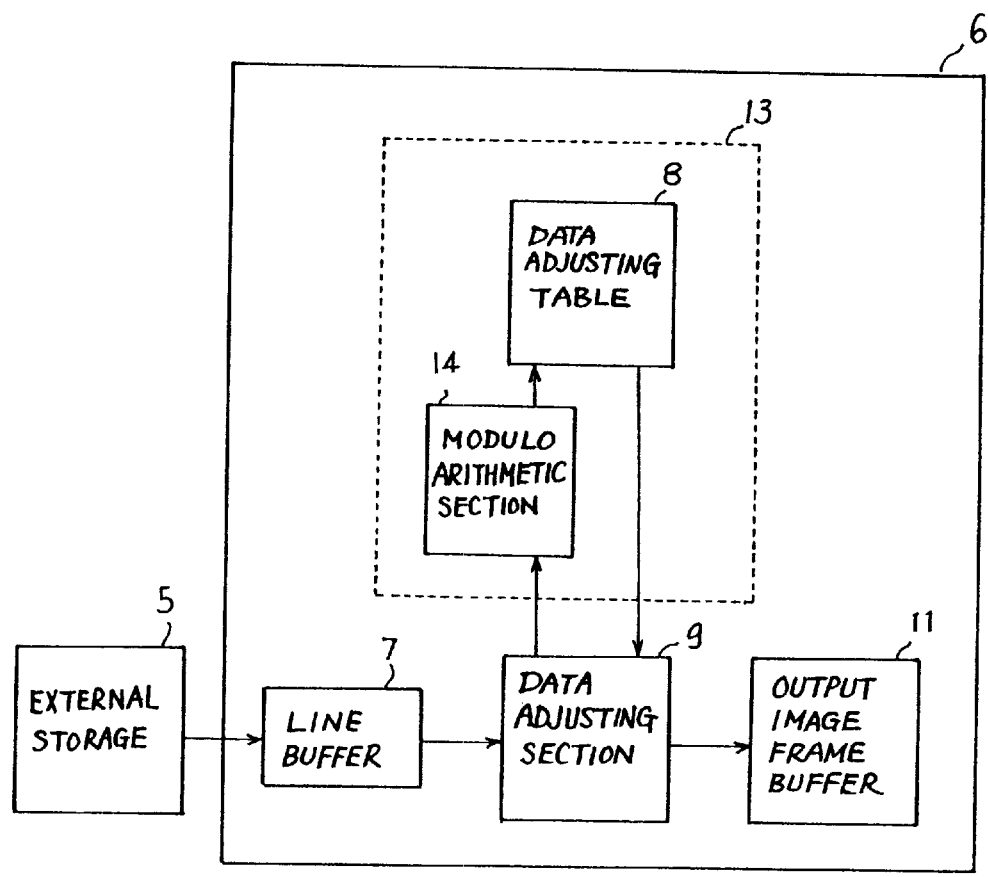
FIG. 6 is a block diagram showing an image data adjusting device according to a second preferred embodiment of the present invention.

FIG. 6 is a block diagram showing an image data adjusting device 6 using the modulo arithmetic.

The image data adjusting device 6 in the second preferred embodiment differs from that in the first preferred embodiment that a magnification deriving section 13 is provided instead of the data adjusting table 8. The magnification deriving section 13 comprises a data adjusting table 8 and a modulo arithmetic section 14. The data adjusting table 8 in the second preferred embodiment has the reduced contents as compared with that in the first preferred embodiment.

FIGS. 7A and 7B are diagrams for explaining redundancy of the data adjusting table.

FIG. 7A shows an X-direction magnification table 1X or a Y-direction magnification table 1Y. "Index" represents a column number (X-direction magnification table) or a line number (Y-direction magnification table). Assuming that FIG. 7A shows the X-direction magnification table 1X, the table 1X represents that the image data is increased by integer times (four times in FIG. 7A) in the X-direction.

However, since the magnifications for all the pixels are set to be 4, the magnification data of the same contents is stored in a memory for the number of the pixels. This is extremely redundant. FIG. 7B shows the contents of a table for increasing the image data by 1.5 times in the corresponding direction. In this case, magnifications of the pixels are alternate repetition of 1 and 2, that is, 1, 2, 1, 2, . . . It is also quite redundant to store all the data having such a regularity in the memory, which is against the effective use of the resource.

Accordingly, the contents of such a magnification table are derived through calculation. Specifically, in consideration of a regular relationship between positions of the pixels in the image data and magnifications of the corresponding pixels, a magnification for each of the pixels is derived through calculation. With this arrangement, it is possible to immediately perform the data adjusting process using the calculated data, or it is also possible to once prepare the X- and Y-direction tables using the calculated data and then carry out the data adjusting process. In either case, the effect is that it is not necessary to prestore in the memory the X- and Y-direction tables prepared per magnification of the image data.

The modulo arithmetic is shown below:

line 0→0% 2=0→refer to Index=0 line 1→1% 2=1→refer to Index=1 line 2→2% 2=0→refer to Index=0 line 3→3% 2=1→refer to Index=1 line 4→4% 2=0→refer to Index=0 line 5→5% 2=1→refer to Index=1 line 6→6% 2=0→refer to Index=0 wherein % represents an operator for the modulo arithmetic.

The modulo arithmetic is calculation for deriving a remainder of division. As appreciated from the above, the calculation results are 0 for line 0, 1 for line 1, 0 for line 2, . . . , that is, alternate repetition of 0 and 1 is obtained. On the other hand, as shown in FIG. 8, for increasing the image data by, for example, 1.5 times, a table (Y-direction table in FIG. 8 corresponding to the modulo arithmetic relative to the lines of the image data) is provided which represents a magnification of one time when Index=0 and a magnification of two times when Index=1. Accordingly, using the result of the modulo arithmetic, a magnification of pixels per line in the Y-direction is obtained.

In this manner, with the small amount table data as shown in FIG. 8, the data adjusting process can be achieved for all the input pixels.

As appreciated, magnifications of pixels in the X-direction can also be obtained by carrying out the modulo arithmetic relative to columns of the image data and preparing an X-direction table corresponding to the Y-direction table shown in FIG. 8.

Figure 9:
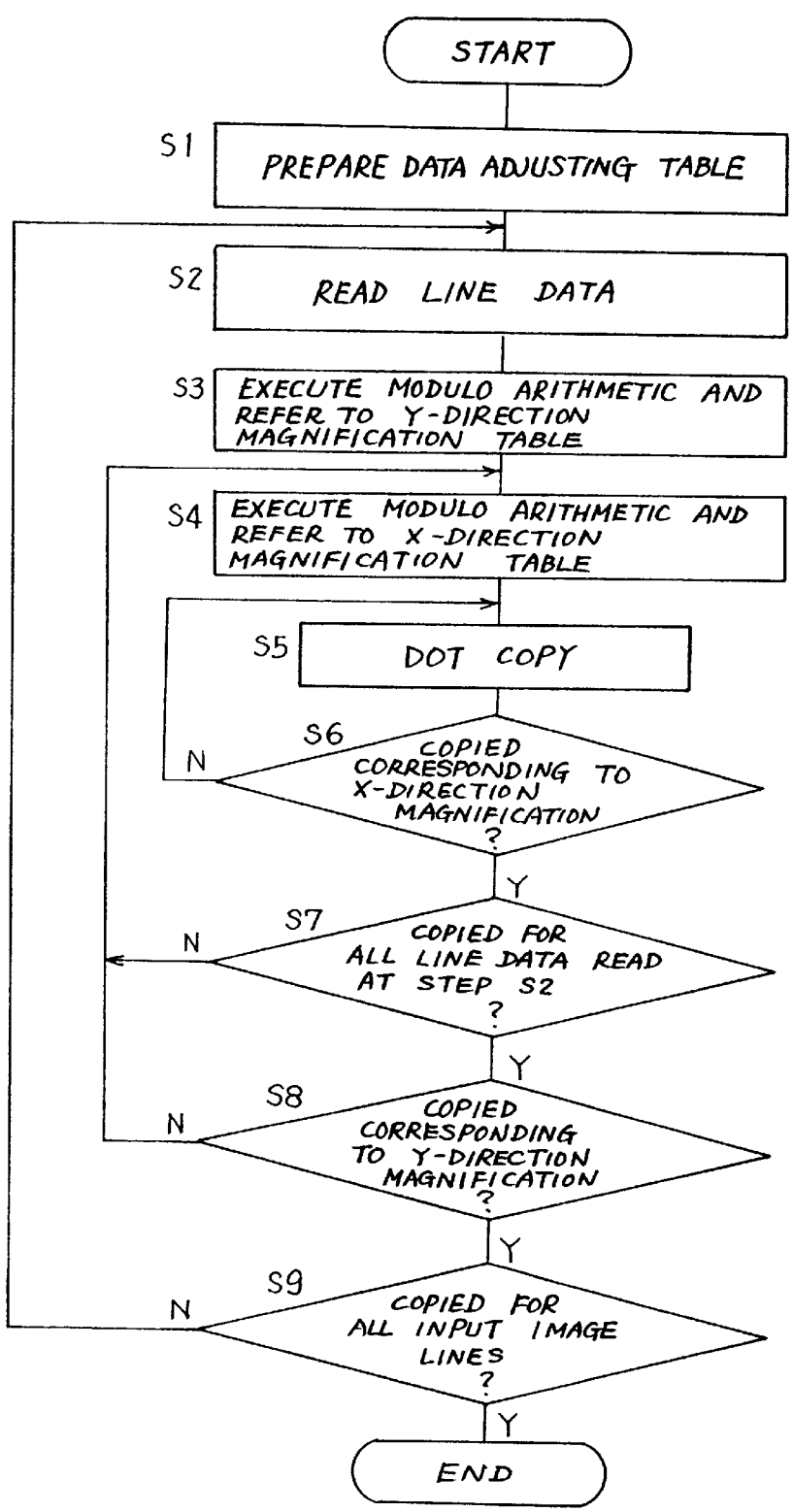
FIG. 9 is a flowchart representing an operation of the image data adjusting device according to the second preferred embodiment.

FIG. 9 is a flowchart representing an operation of the image data adjusting device 6 shown in FIG. 6, that is, an image data adjusting method according to the second preferred embodiment.

The operation is similar to that of the first preferred embodiment described using FIG. 5. First at step S1, X- and Y-direction magnification tables as shown in FIG. 8 are prepared. Then, one-line input image data is read in at step S2, and the modulo arithmetic is carried out at steps S3 and S4. Specifically, at step S3, the modulo arithmetic is executed for a line of the input image data and, using the calculation result as an index, the Y-direction table is referred to. On the other hand, at step S4, the modulo arithmetic is executed for a column of the input image data and, using the calculation result as an index, the X-direction table is referred to. Subsequently, at step S5, dot copy is carried out for the corresponding pixel. Step S6 checks whether the pixel has been copied corresponding to an X-direction magnification, and step S7 checks whether all the pixels read at step S2 have been processed. Then, step S8 checks whether the process has been finished corresponding to the Y-direction magnification read out at step S3. After the process for one line of the input image data is finished, the routine proceeds to step S9 where it is checked whether the process has been finished for all the input image lines. In this manner, the respective loops are executed to carry out the data adjusting process for all the pixels of the input image data.

At steps S3 and S4, by executing the modulo arithmetic every time the X- or Y-direction table is referred and producing a table for the corresponding part while carrying out the data adjusting process, it is not necessary to store the whole table data. On the other hand, it may be arranged that the modulo arithmetic is executed at step S1 so as to produce the whole table data corresponding to the X- and Y-direction magnification tables of the foregoing first preferred embodiment. Even in this case, the amount of data to be stored in a table storing memory can be largely reduced as compared with the case where the whole table data is stored in the memory per magnification of the image data.

<Effect of Second Embodiment>

In the second preferred embodiment, if a regular relationship exits between positions of the pixels in the input image data as seen in a direction in which the input image data is increased or decreased and magnifications of the corresponding pixels, a necessary table can be produced through calculation and referred to. Thus, the whole table data as required in the foregoing first preferred embodiment is not required. Accordingly, the data amount of the tables to be prestored in the memory can be largely decreased to reduce a storage capacity thereof.

<Third Embodiment>

Figure 10:
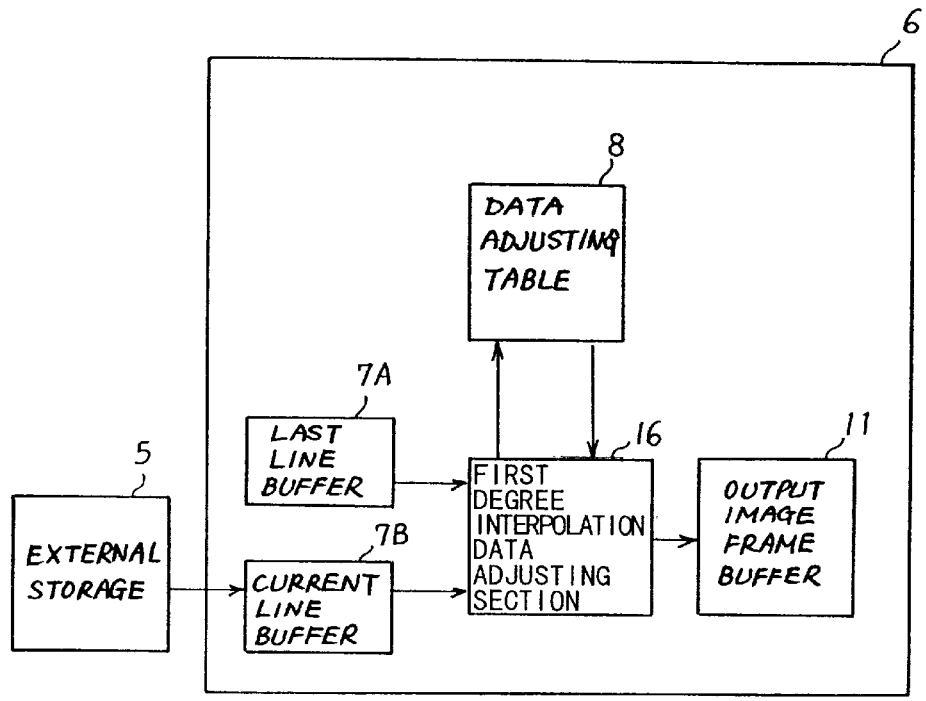
FIG. 10 is a block diagram showing an image data adjusting device according to a third preferred embodiment of the present invention.

FIG. 10 is a block diagram showing an image data adjusting device 6 according to the third preferred embodiment.

In FIG. 10, the image data adjusting device 6 comprises a last line buffer 7A, a current line buffer 7B, a data adjusting table 8, a first degree interpolation data adjusting section 16 which performs a later-described data adjusting process, and an output image frame buffer 11.

Figure 11:
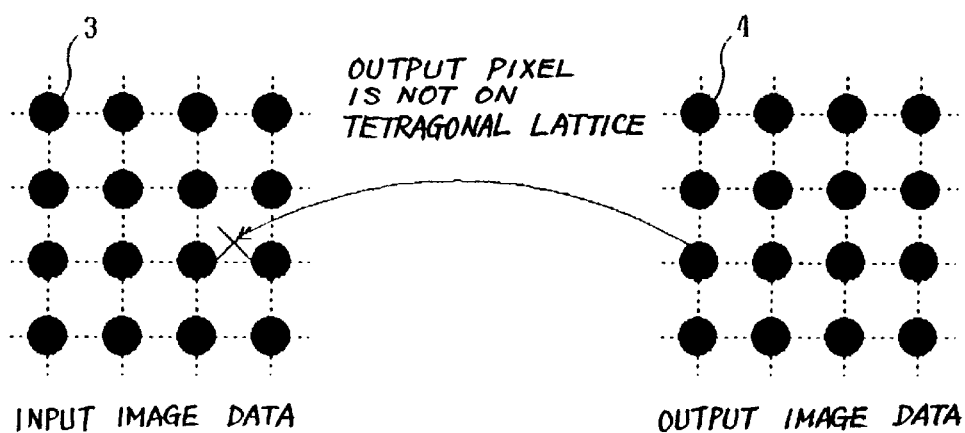
FIG. 11 is a diagram for explaining resampling for correction of pixel values which has been adopted for an image data adjusting process.
Figure 12:
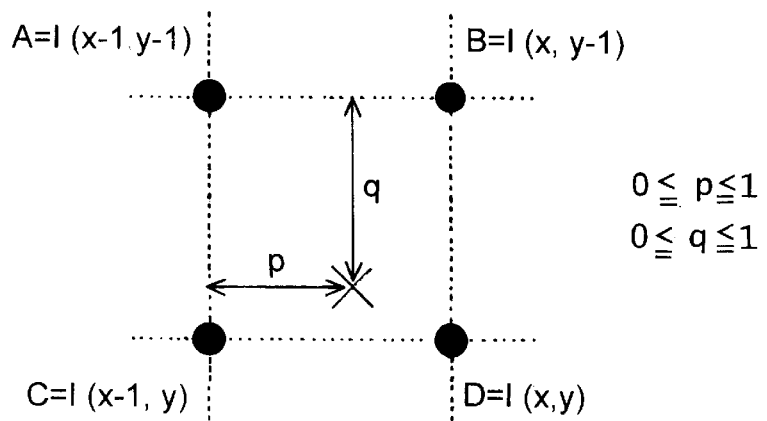
FIG. 12 is a diagram for explaining a tetragonal lattice.

FIG. 11 is a diagram for explaining resampling for correction of pixel values which has been adopted for the image data adjusting process. FIG. 12 is a diagram for explaining a tetragonal lattice. The tetragonal lattice is a hollow rectangle (not necessarily a square) free in length of sides and having a pixel at each of four corners (lattice points).

In FIG. 11, it is assumed that output image data 4 is obtained by increasing input image data 3. After the data increasing process, there appear those output pixels whose positions do not coincide with positions of corresponding input pixels. In this case, for preventing deterioration of the quality of an output image, pixel values of the pixels of the output image data 4 are adjusted through calculation in the following manner.

First, a position of each pixel of the output image data 4 in the input image data 3 is derived. In this case, as shown in FIG. 12, it is assumed that an output pixel F is located at a point X surrounded by a tetragonal lattice formed by input pixels A, B, C and D. Then, a pixel value of the output pixel F is derived based on pixel values of the input pixels A, B, C and D and a distance relationship between the point X and the input pixels A, B, C and D.

Specifically, in FIG. 12, a distance from an upper side of the tetragonal lattice to the point X is set to q, while a distance from a left side to the point X is set to p. The distances p and q are expressed by decimals between 0 and 1, respectively. In this case, a pixel value Fv of the output pixel F is given by the following equations:

$$Fv=(1-p)(1-q)A+p(1-q)B+q(1-p)C+pqD$$

$$p=Fx/mx-Ax$$

$$q=Fy/my-Ay$$

wherein Fx and Fy represent X and Y coordinates of the output pixel F on the output image, respectively, Ax and Ay represent X and Y coordinates of the input pixel A on the input image, respectively, and mx and my represent magnifications of the input image data in the X- and Y-directions, respectively.

However, for calculating pixel values of the output image data based on the foregoing technique, it is necessary to prestore in the buffer memory all the peripheral input image data around the output pixels to be processed.

Figure 13:
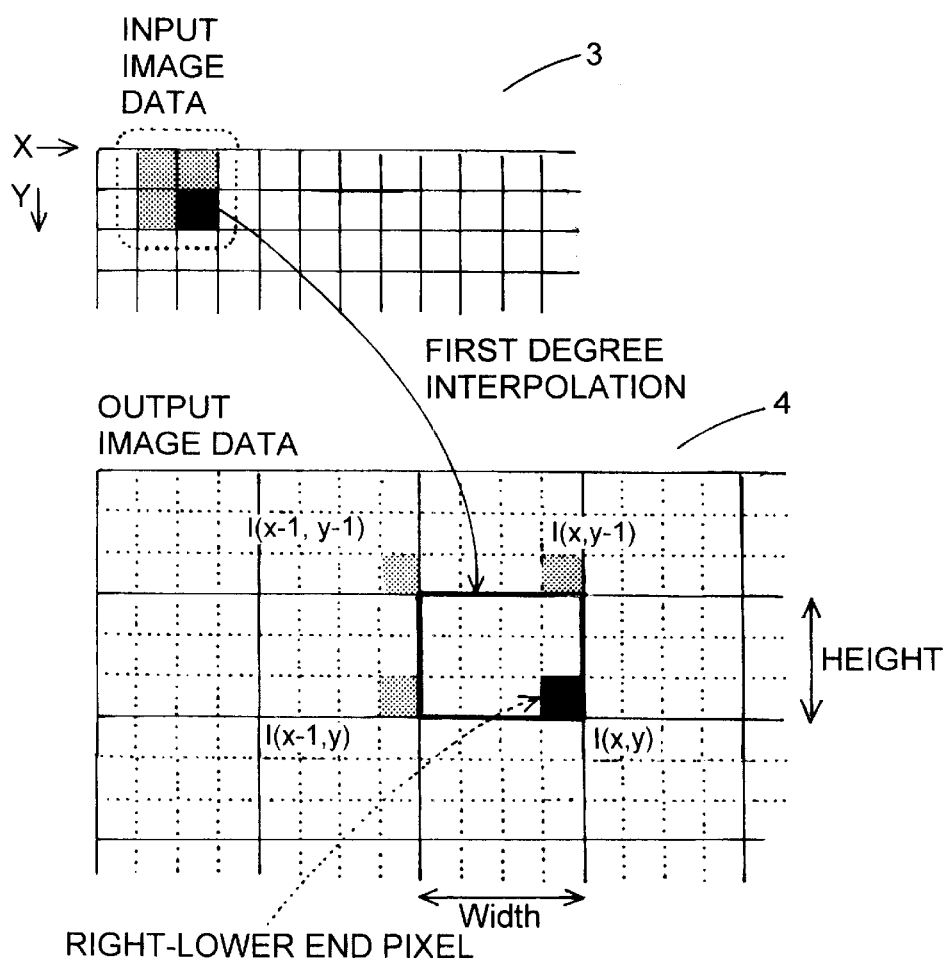
FIG. 13 is a diagram for explaining a first degree interpolation according to the third preferred embodiment.

FIG. 13 is a diagram for explaining a first degree interpolation according to the third preferred embodiment.

In FIG. 13, the input image data 3 is increased four times in the X-direction and three times in the Y-direction by carrying out, for example, the first preferred embodiment. In a 4×3 pixel block (matrix defined by a thick black line in the figure) of the output image data 4 obtained by copying each of the input pixels, it is defined that, for example, a lower-right corner pixel is a pixel on a lattice point of the tetragonal lattice. This pixel is indicated in black.

In this case, a pixel (in black) at a coordinate point of X=3, Y=2 of the input image data 3 is copied at a coordinate point of X=12, Y=6 of the output image data 4. Pixel values of the other output pixels in the pixel block including the copied output pixel are derived through the first degree interpolation using pixel values of the peripheral four pixels indicated in black and by dots. Through this process, the pixel values of the output pixels added between the adjacent input pixels can be smoothly changed to achieve an output image of high quality.

A pixel value Pv of each pixel in a pixel block can be derived by the following equation:

$$Pv=((WIDTH-P)\cdot(HEIGHT-Q)\cdot I(x-1, y-1)+P\cdot(HEIGHT-Q)\cdot I(x, y-1) +(WIDTH-P)\cdot Q\cdot I(x-1, y)+P\cdot Q\cdot I(x, y))/(WIDTH\cdot HEIGHT)$$

wherein WIDTH represents a magnification of a corresponding input pixel in the X-direction, HEIGHT represents a magnification of the corresponding input pixel in the Y-direction, P represents an X coordinate of a corresponding output pixel in an pixel block, and Q represents a Y coordinate of the corresponding output pixel in the pixel block.

As appreciated from the foregoing, with two-line input image data stored in the last and current line buffers 7A and 7B, and more precisely, with pixel values of four pixels indicated in black and by dots of the input image data 3, pixel values of all twelve output pixels in the pixel block defined by the thick black line can be calculated.

Figure 14:
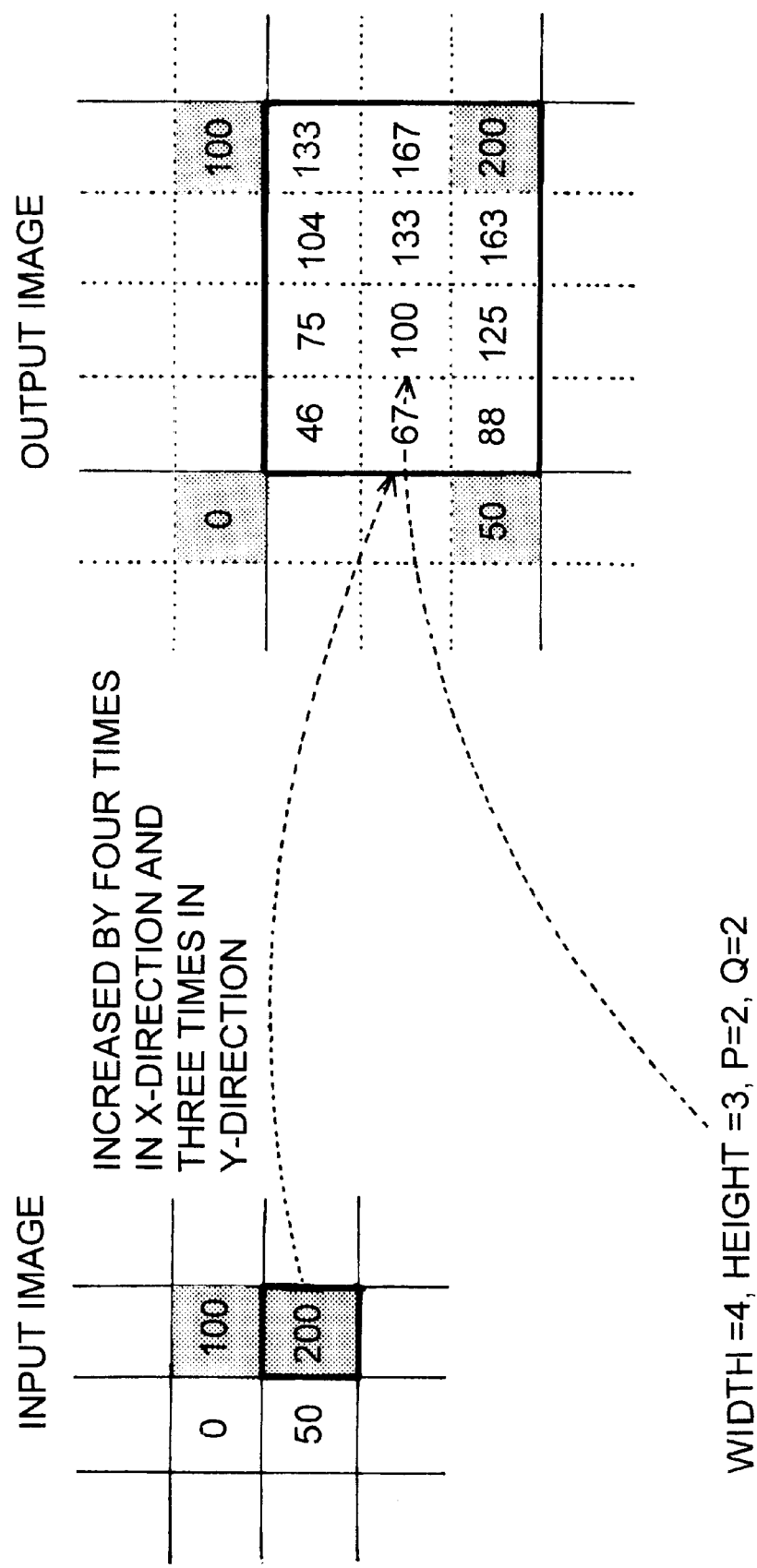
FIG. 14 is a diagram for explaining a concrete example of the first degree interpolation according to the third preferred embodiment.

FIG. 14 is a diagram for explaining a concrete example of the first degree interpolation according to the third preferred embodiment.

In FIG. 14, pixel values of input pixels at lattice points are set to 0, 100, 50 and 200, and the input image data is increased four times in the X-direction and three times in the Y-direction. The pixel values of the input pixels are copied at the lower-right corners of the corresponding pixel blocks, respectively. In FIG. 14, pixel values of the other eleven output pixels in a pixel block including a pixel with a pixel value of 200 are derived through the first degree interpolation and shown. The following equation is an example of pixel value calculation with P=2 and Q=2:

$$Pv = ((4-2)\cdot(3-2)\cdot 0 + 2\cdot(3-2)\cdot 100 +$$

$$(4-2)\cdot 2\cdot 50 + 2\cdot 2\cdot 200)/(4\cdot 3)$$

$$= (2\cdot 1\cdot 0 + 2\cdot 1\cdot 100 + 2\cdot 2\cdot 50 + 2\cdot 2\cdot 200)/(4\cdot 3)$$

$$= (0 + 200 + 200 + 800)/12$$

$$= 1200/12 = 100$$

By deriving the pixel values in the foregoing manner, the image data can be increased without lowering the image quality.

Figure 15:
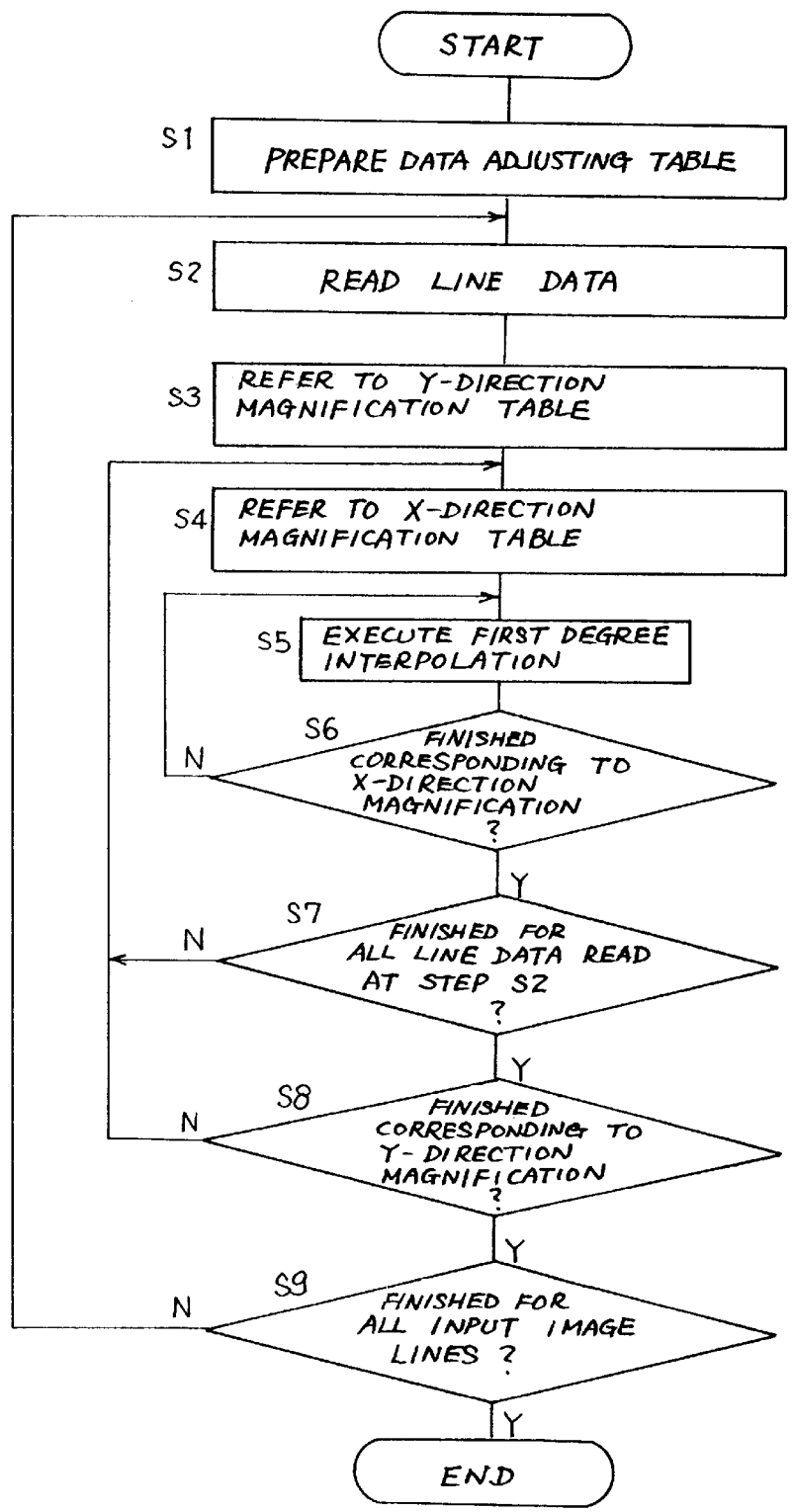
FIG. 15 is a flowchart representing an operation of the image data adjusting device according to the third preferred embodiment.

FIG. 15 is a flowchart showing an operation of the image data adjusting device 6 shown in FIG. 10, that is, an image data adjusting method according to the third preferred embodiment.

In this flowchart, steps S1 to S4 are the same as those in the flowchart of FIG. 5 in the first preferred embodiment. Specifically, X- and Y-direction magnification tables are prepared, one-line input image data is read in, and then the X- and Y-direction tables are referred to. In this embodiment, at step S5, the foregoing first degree interpolation process is carried out. This process is performed for all the pixels in the corresponding pixel block, and then for all the pixel blocks in turn in the main scan direction for all the input image lines. The other process is the same as that of the first preferred embodiment.

In this embodiment, the pixel value of each input pixel is copied at the lower-right corner of the corresponding pixel block. This is necessary for achieving the calculation using only the serially inputted two-line image data stored in the buffer memories. This effect is also achieved even if the pixel value of each input pixel is copied at one of the other three corners of the corresponding pixel block.

<Effect of Third Embodiment>

According to the third preferred embodiment, the data adjusting process based on the first degree interpolation can be achieved by holding only the corresponding two-line input image data in the buffer memories although the conventional technique requires one-page input image data to be stored in the buffer memory. Thus, the data adjusting process with high image quality can be realized using a reduced buffer memory area.

<Fourth Embodiment>

Figure 16:
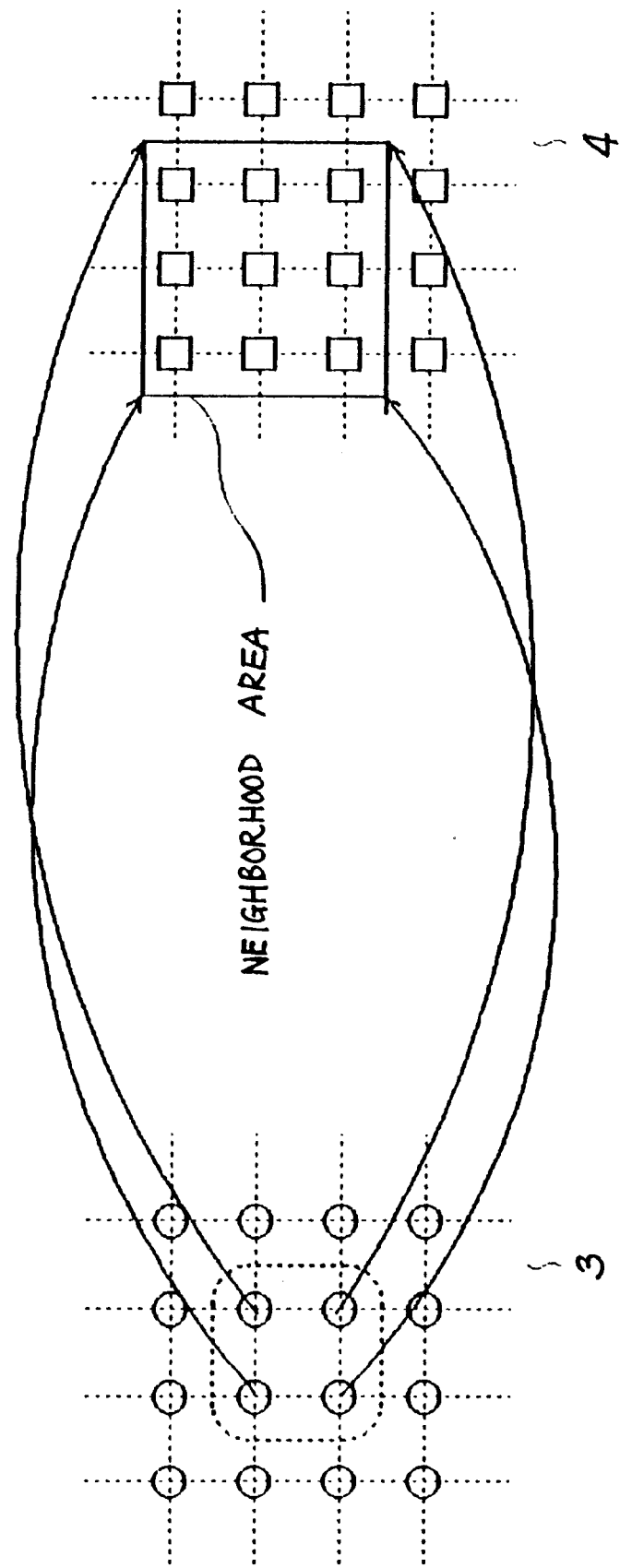
FIG. 16 is a diagram for explaining a principle of a fourth preferred embodiment of the present invention.

FIG. 16 is a diagram for explaining a principle of the fourth preferred embodiment.

In this embodiment, coordinates of tetragonal lattices of input image data 3 are converted to coordinates on output image data 4 so as to divide the output image data 4 into corresponding regions. Each of these regions will be referred to as a neighborhood area. In FIG. 16, a tetragonal lattice is defined by four input pixels of the input image data 3 surrounded by a dotted line, and a corresponding neighborhood area is written in the output image data 4 as shown by a solid line. As shown in FIG. 16, the neighborhood area includes, for example, nine output pixels. Pixel values of these output pixels are derived from pixel values of the four input pixels using the foregoing method of first degree interpolation. With this arrangement, the pixel values of the respective output pixels included in the neighborhood area can be derived only from the pixel values of the four adjacent input pixels of the input image data. Accordingly, similar to the third preferred embodiment, it is sufficient to store two-line input image data in the buffer memories. Further, as will be described later, a calculation process becomes simpler.

Figure 17:
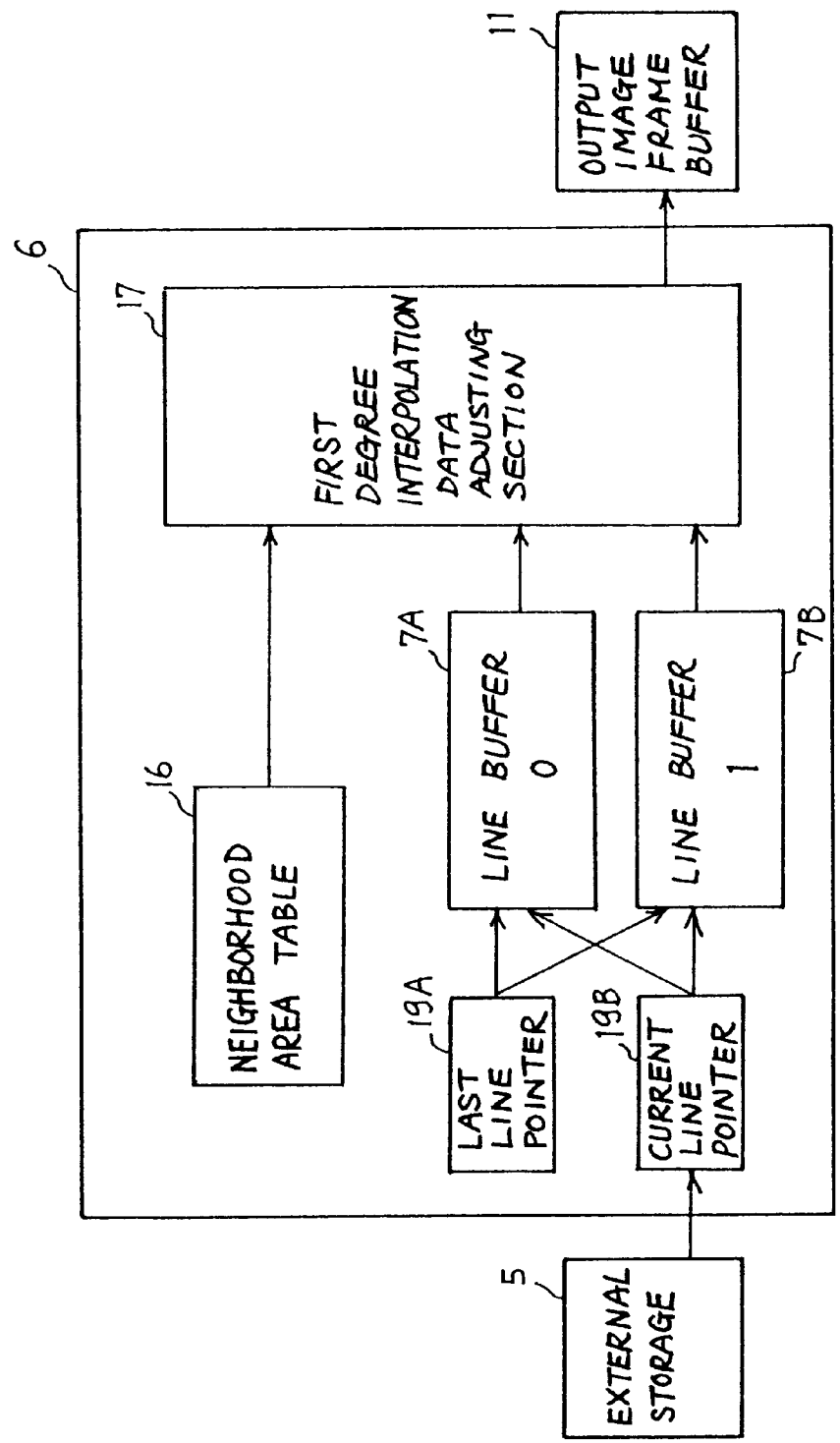
FIG. 17 is a block diagram showing an image data adjusting device according to the fourth preferred embodiment.

FIG. 17 is a block diagram showing an image data adjusting device 6 according to the fourth preferred embodiment.

In FIG. 17, the image data adjusting device 6 comprises a last line pointer 19A, a current line pointer 19B, a line buffer 7A, a line buffer 7B, a neighborhood area table 16, and a first degree interpolation data adjusting section 17 which performs a later-described data adjusting process.

Figure 18:
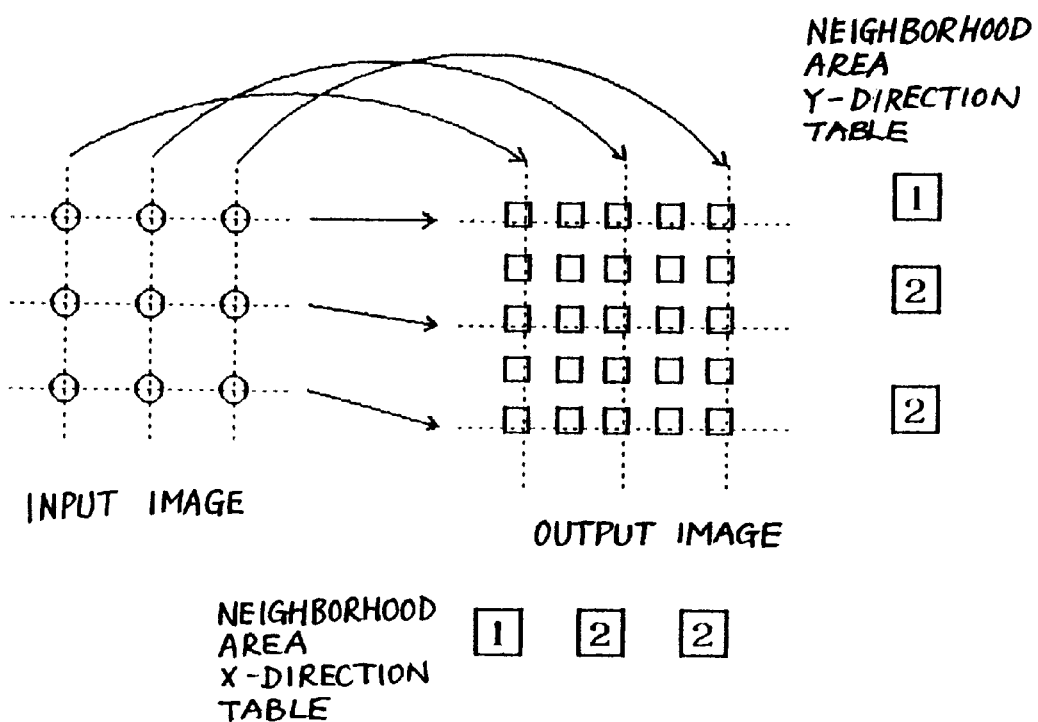
FIG. 18 is a diagram for explaining a neighborhood area table.

FIG. 18 is a diagram for explaining the neighborhood area table 16.

The neighborhood area table 16 includes a neighborhood area X-direction table and a neighborhood area Y-direction table. In FIG. 18, a 3×3 pixel input image is increased to a 5×5 pixel output image. Neighborhood areas are set on the output image as shown by dotted lines. For example, the neighborhood area at the upper-left corner of the output image includes one pixel, while the neighborhood area at the lower-right corner includes 2×2 pixels. For identifying the number of the output pixels in each of the neighborhood areas, the X- and Y-direction tables are provided. In general, the contents of each table can be derived in the following manner:

When A≠1 and X≠0, the number of output pixels in a corresponding neighborhood area in the X- or Y-direction is given by $$\left[\frac{X(B-1)}{A-1}\right] - \left[\frac{(X-1)(B-1)}{A-1}\right]$$

When A≠1 and X=0, the number of output pixels in a corresponding neighborhood area in the X- or Y-direction is given by 1.

When A=1, the number of output pixels in a corresponding neighborhood area in the X- or Y-direction is given by B.

[n] is the Gauss' symbol and represents the maximum integer not exceeding n, A represents the number of input pixels of an input image in the X- or Y-direction, B represents the number of output pixels of an output image in the X- or Y-direction, and X represents a position of the corresponding neighborhood area from the first in the X- or Y-direction.

Figure 19A:
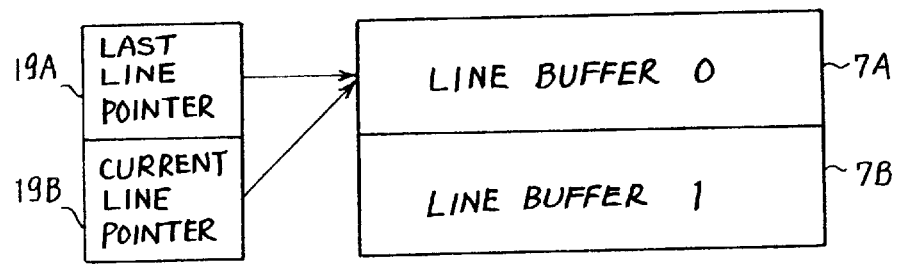
FIGS. 19A to 19C are diagrams for explaining line buffers.
Figure 19B:
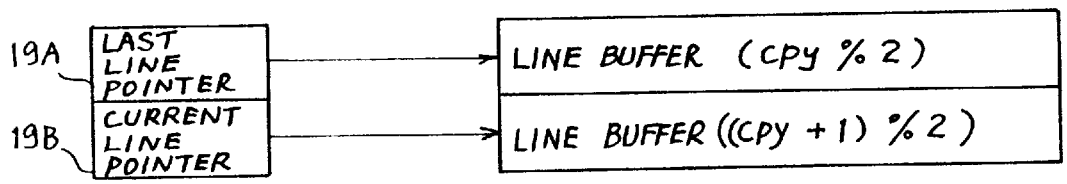
Figure 19C:
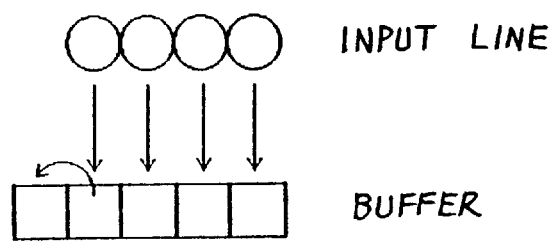

FIGS. 19A to 19C are diagrams for explaining the line buffers 7A and 7B.

As described above, the two-line input image data are stored in the line buffers 7A and 7B during the data adjusting process. Specifically, the line buffers 7A and 7B alternately receive and store new one-line input image data. The last line pointer 19A and the current line pointer 19B are provided for identifying which line buffer holds the last line data or the current line data. Accordingly, as shown in FIG. 19A, initial values of the pointers 19A and 19B are both set to point the line buffer 7A. The line buffers to be pointed by the pointers 19A and 19B, respectively, are determined by carrying out the modulo arithmetic as shown in FIG. 19B.

Specifically, when cpy%2=0, the pointer 19A points the line buffer 7A, while, when cpy%2=1, the pointer 19A points the line buffer 7B. Similarly, when (cpy+1)%2=0, the pointer 19B points the line buffer 7A, while when (cpy+1)%2=1, the pointer 19B points the line buffer 7B. In the equations, cpy represents a line number of the input image.

FIG. 19C shows a structure of each line buffer. The capacity of the line buffer is set greater than a width of the input image by one pixel, and the first and second elements of the line buffer store the same pixel value. Specifically, if the capacity of the line buffer is the same as the width of the input image, data about four input pixels for the first degree interpolation can not be provided so that the line buffer stores a dummy dot.

Figures 20A, 20B:
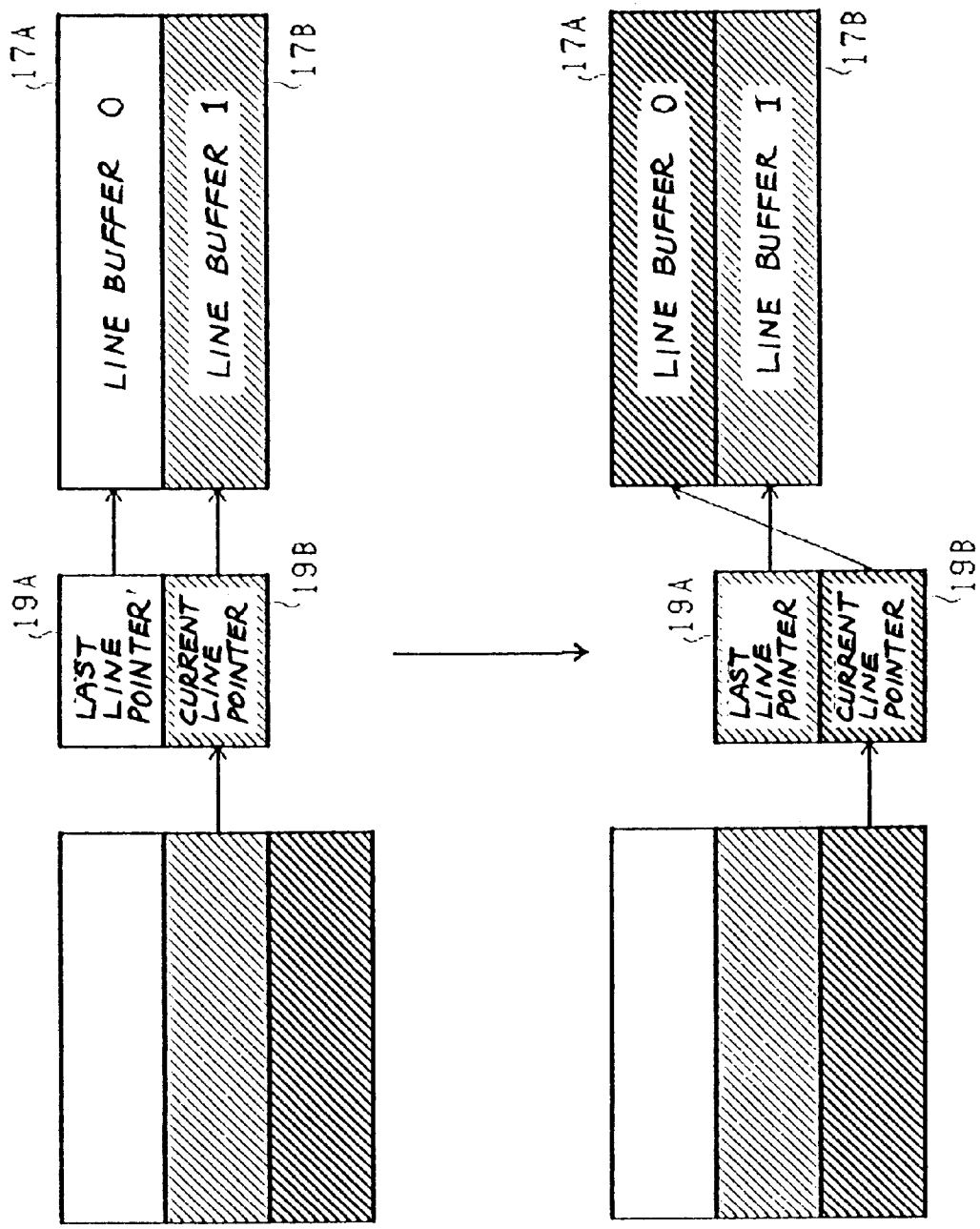
FIG. 20 is a diagram for explaining an image data storing process.

FIG. 20 is a diagram for explaining an image data storing process.

With the foregoing arrangement, for example, as shown at (a) in FIG. 20, the data adjusting process advances while the line buffer 17A stores line data processed immediately before, and the line buffer 17B stores line data being processed. When the process for the line data stored in the line buffer 17B is finished, the line buffer 17A stores the next new line data. Accordingly, as shown at (b) in FIG. 20, the current line pointer 19B now points the line buffer 17A, while the last line pointer 19A now points the line buffer 17B.

Figure 21:
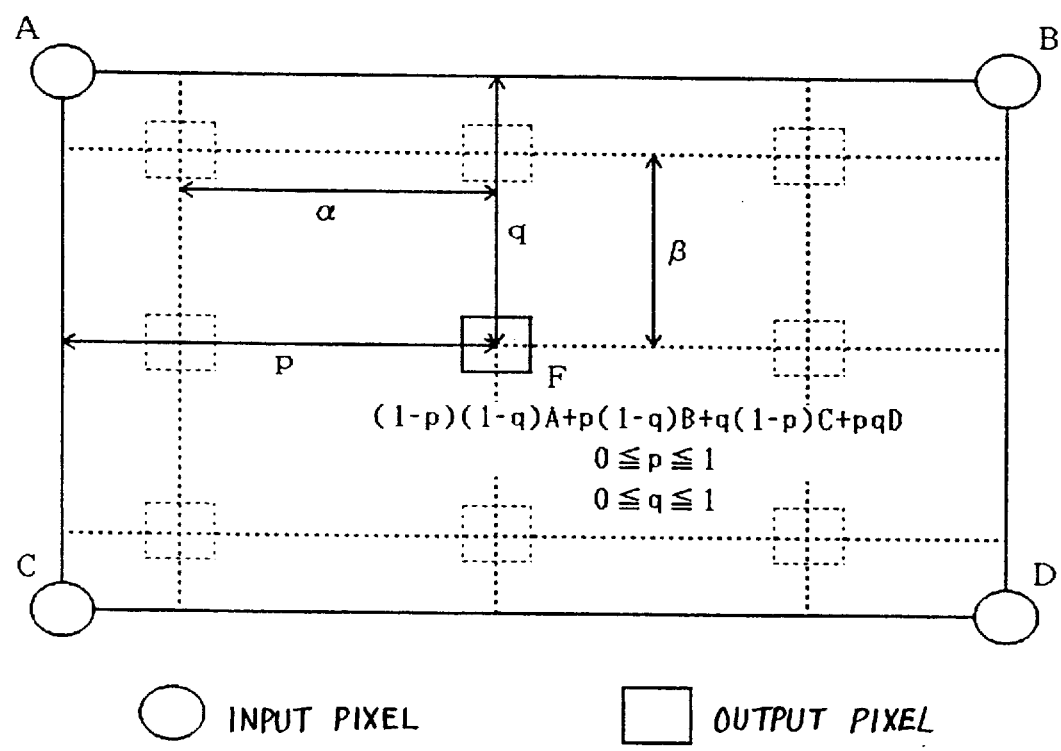
FIG. 21 is a diagram showing a neighborhood area on an enlarged scale.

FIG. 21 is a diagram showing a neighborhood area on an enlarged scale.

Assuming that the neighborhood area is defined by input pixels having pixel values A, B, C and D, a pixel value F of an output pixel (shown by a solid rectangle) included in the neighborhood area is derived through calculation as shown in FIG. 21. The calculation itself is the same as the foregoing equation explained in the first degree interpolation process. In FIG. 21, α represents a width (X-direction) of a lattice defined by four output pixels and β represents a height (Y-direction) thereof. Further, q represents a distance from an upper side of the neighborhood area to the output pixel having the pixel value F, while p represents a distance from a left side of the neighborhood area to that output pixel. If magnifications in pixel of the input image are set to be mx and my in the X- and Y-directions, respectively, α=1/mx and β=1/my.

Figure 22:
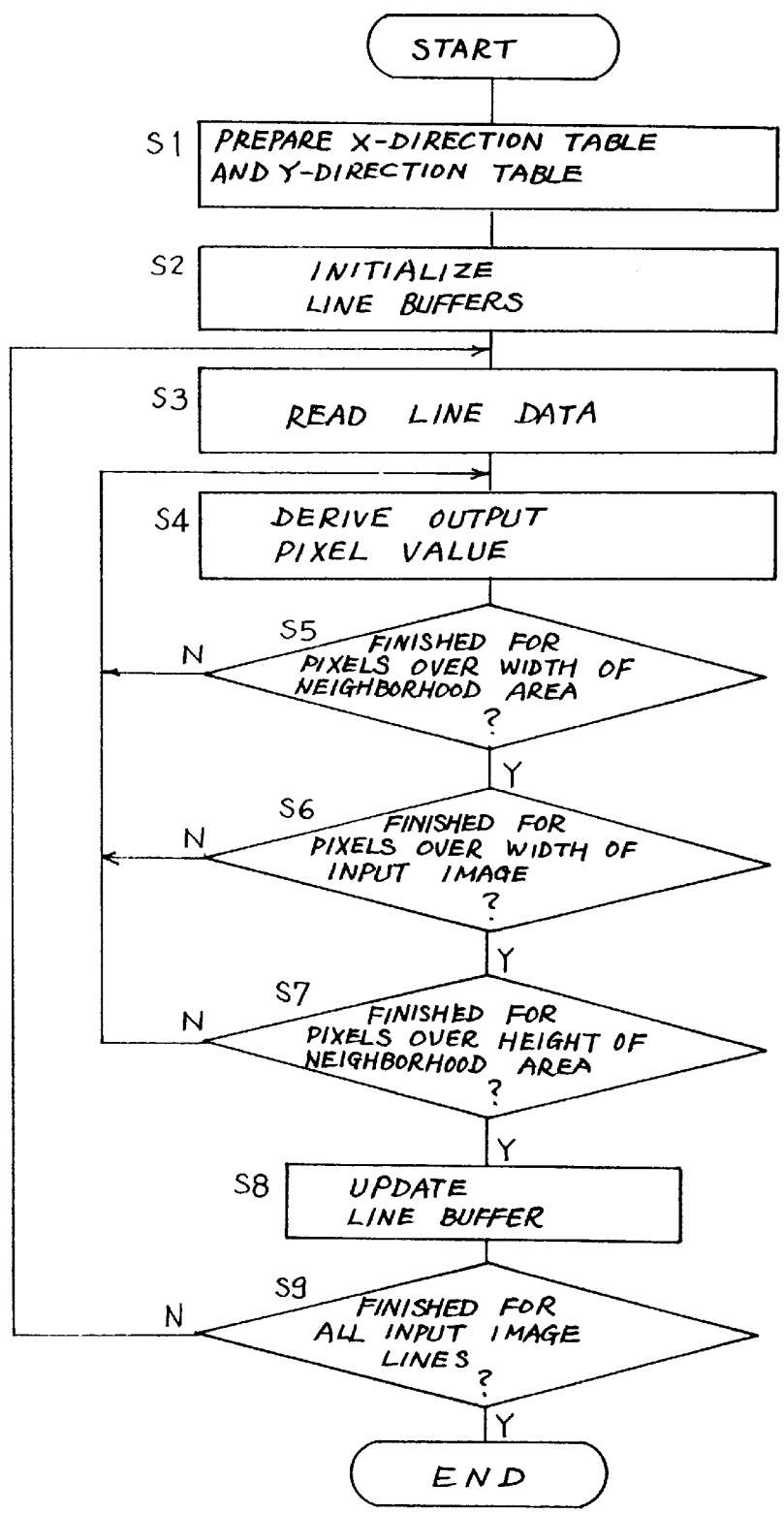
FIG. 22 is a flowchart representing an operation of an image data adjusting device according to the fourth preferred embodiment.

FIG. 22 is a flowchart showing an operation of the image data adjusting device 6 shown in FIG. 17, that is, an image data adjusting method according to the fourth preferred embodiment.

First at step S1, the foregoing neighborhood area X- and Y-direction tables are prepared. Then, at step S2, each of the line buffers 7A and 7B is initialized. Subsequently, at step S3, line data is read into the line buffers. Then, at step S4, the output pixel value calculation as shown in FIG. 21 is executed. At step S5, it is checked whether the process has been finished for pixels over the width of the neighborhood area. Then, at step S6, it is checked whether the process has been finished for pixels over the width of the input image. If answer at step S6 is positive, that is, if the process has been finished for one line of the output image, the routine process to step S7 where it is checked whether the process has been finished for pixels over the height of the neighborhood area. If finished at step S7, the routine proceeds to step S8 where the buffer is updated as explained with reference to FIG. 20. Then, at step S9, it is checked whether the process has been finished for all the input image lines. If positive, the routine is terminated.

<Effect of Fourth Embodiment>

Figure 23:
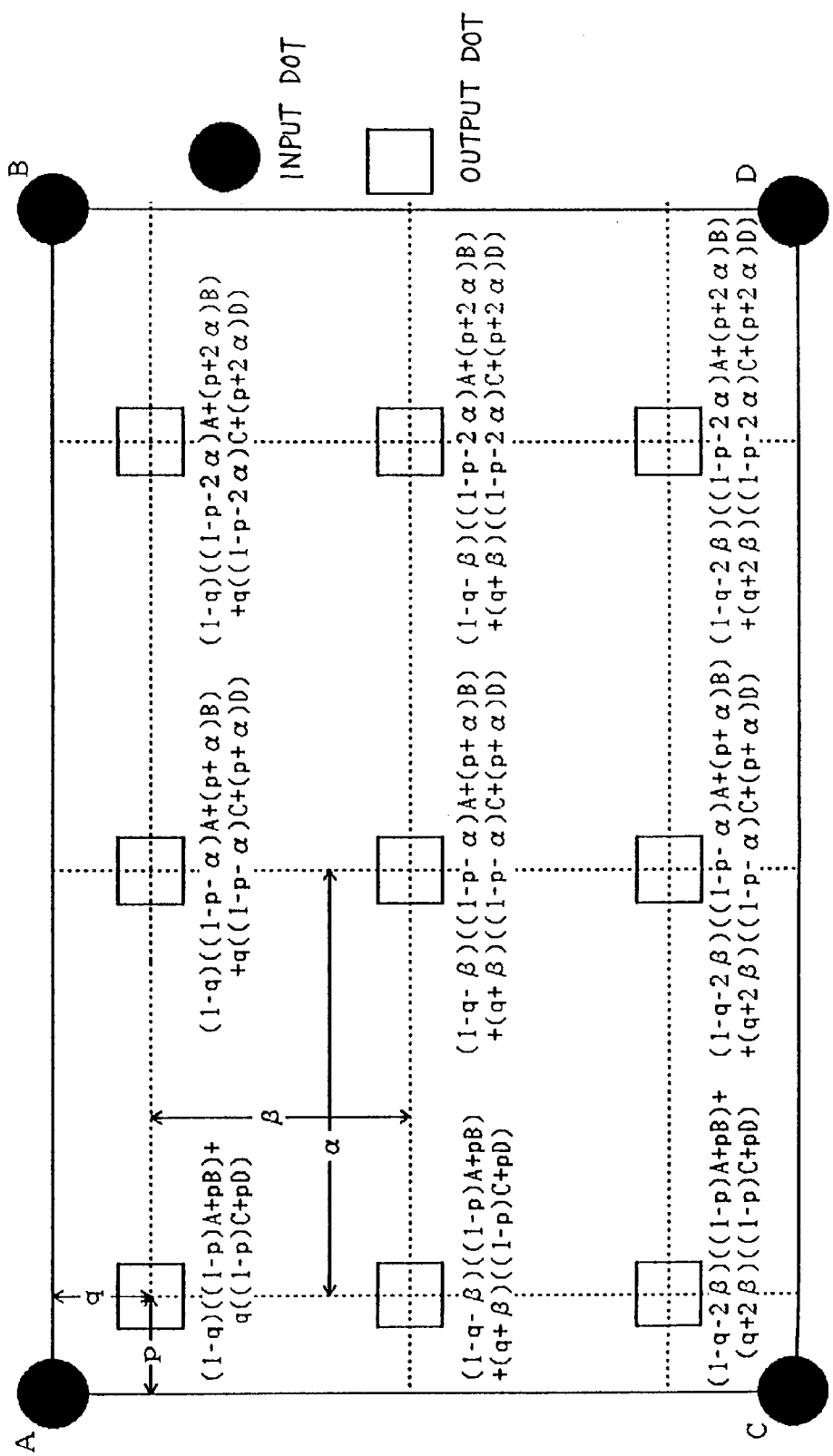
FIG. 23 is a diagram for explaining calculation of output pixel values according to the fourth preferred embodiment.

FIG. 23 is a diagram for explaining calculation of the output pixel values.

As shown in FIG. 23, the pixel values of all the nine output pixels included in the neighborhood area can be calculated from the four input pixel values. Accordingly, by holding only the two-line input image data and alternately updating per one-line data, the pixel values of all the output pixels can be calculated in turn using the method of first degree interpolation so that a buffer memory area to be used can be largely reduced.

<Fifth Embodiment>

In the fourth preferred embodiment, seven-times addition and ten-times multiplication are carried out for deriving the pixel value of each of the output pixels included in the neighborhood area. On the other hand, by considering a regular relationship among positions of those output pixels, the calculation process can be further simplified.

Figure 24:
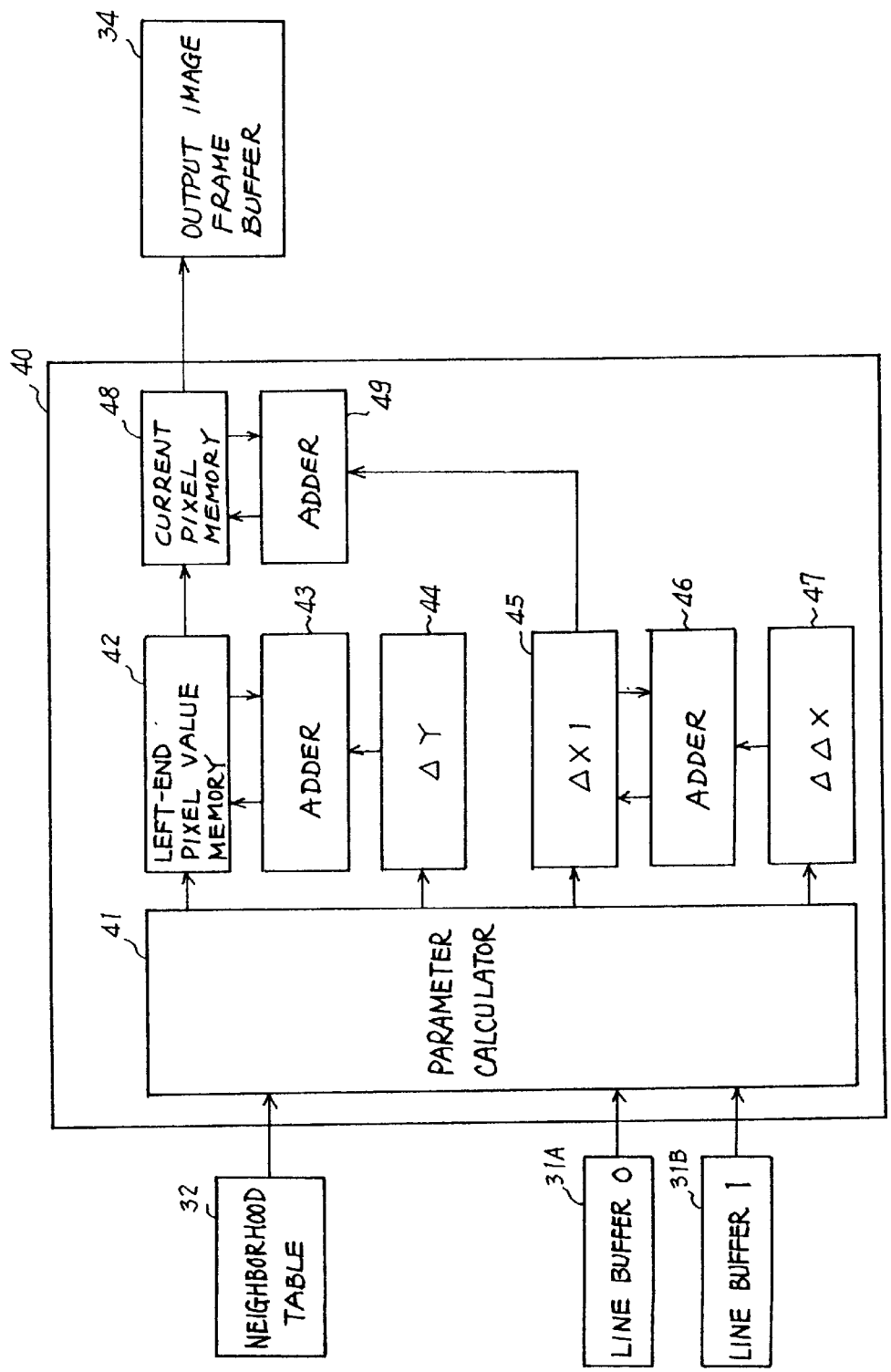
FIG. 24 is a block diagram showing an image data adjusting device according to a fifth preferred embodiment of the present invention.

FIG. 24 is a block diagram showing an image data adjusting device according to the fifth preferred embodiment.

The device stores pixels in line buffers 31A and 31B and carries out a calculation process similar to that of the fourth preferred embodiment, while further simplifying the calculation process. For the purpose thereof, a first degree interpolation data adjusting section 40 has a structure as shown in FIG. 24. The section 40 comprises a parameter calculator 41, a left-end pixel value memory 42, an adder 43, a $\Delta Y$ memory 44, a $\Delta X1$ memory 45, an adder 46, a $\Delta\Delta X$ memory 47, a current pixel memory 48 and an adder 49. An output of a neighborhood area table 32 is inputted into the parameter calculator 41. An output of the first degree interpolation data adjusting section 40 is stored in an output image frame buffer 34.

Figure 25:
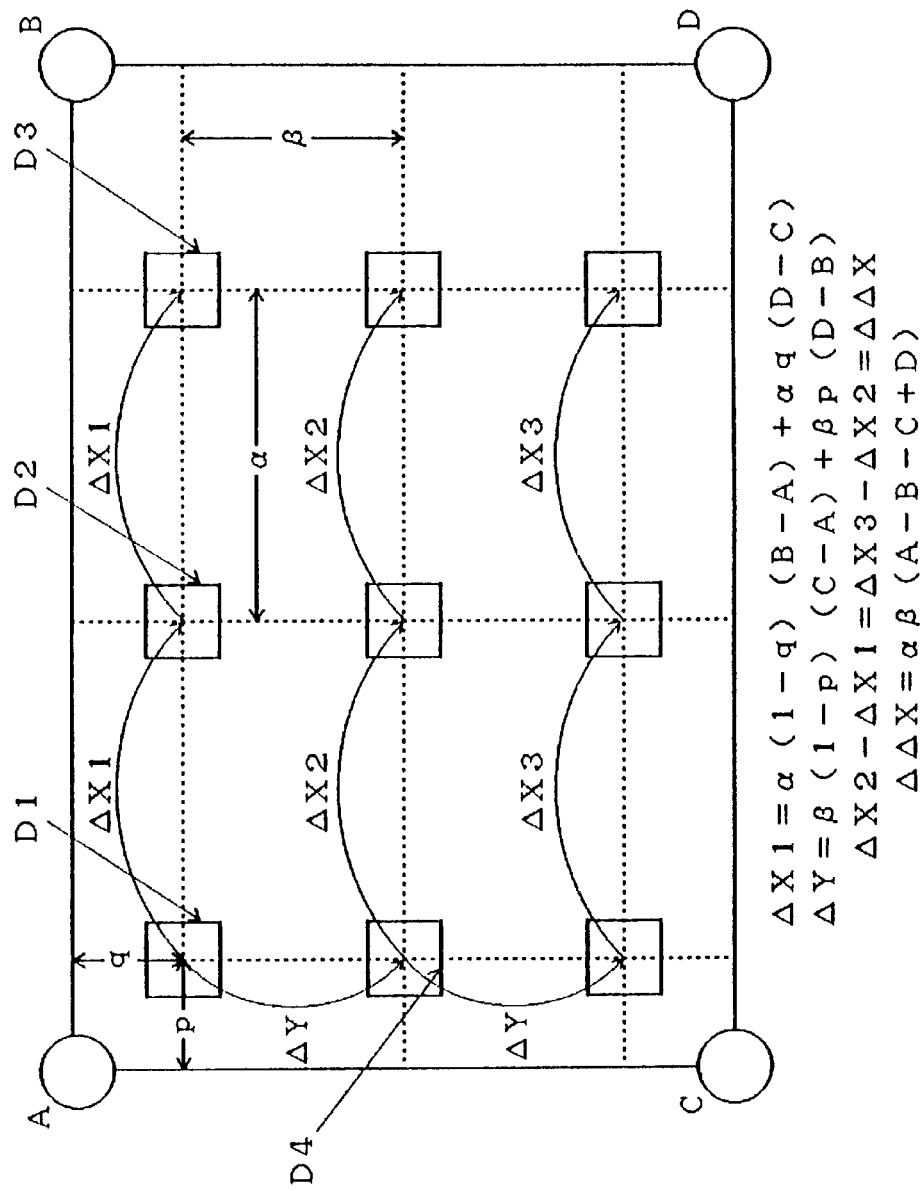
FIG. 25 is a diagram for explaining an interrelation among pixels.

FIG. 25 is a diagram for explaining an interrelation among dots (pixels).

In this embodiment, the calculation process is simplified using this dot interrelation. Specifically, as shown in FIG. 25, it is assumed that the nine output pixels are included in the neighborhood area as in the fourth preferred embodiment. In this case, an interval in the X-direction between the adjacent pixels can be set to $\alpha$, and an interval in the Y-direction between the adjacent pixels can be set to $\beta$. Since the intervals between the adjacent pixels in the X- and Y-directions are constant, by deriving a pixel value of an upper-left end output pixel D1 and pixel value differences $\Delta X1$ and $\Delta Y$, pixel values of the pixels located at the right side or the lower side relative to the pixel D1 can be derived in turn through a conversion process. Specifically, pixel values of all the output pixels included in the neighborhood area can be derived based on the pixel value of D1, $\Delta X1$, $\Delta Y$ and $\Delta\Delta X$. In this embodiment, the calculation process of each pixel value is simplified using this principle.

Figure 26:
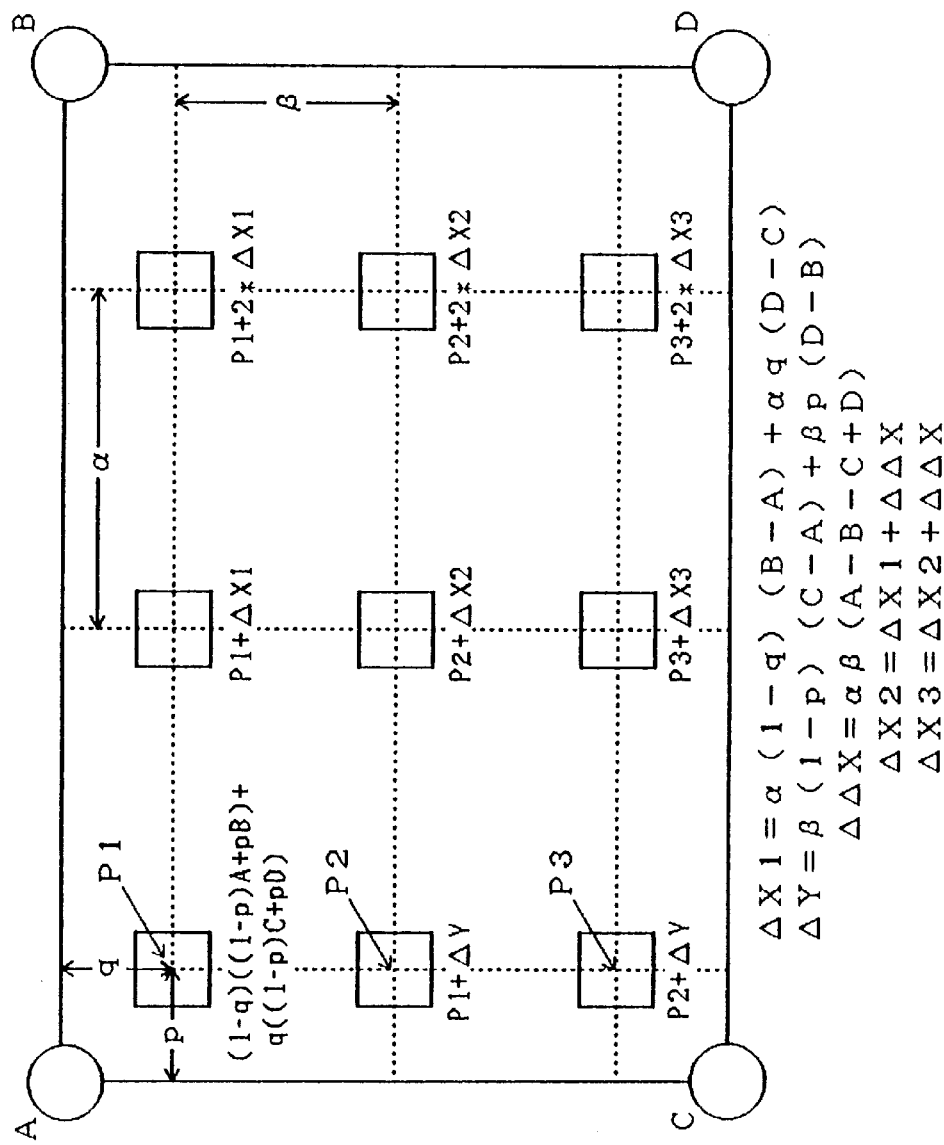
FIG. 26 is a diagram for explaining an interrelation among pixels in further detail.

FIG. 26 is a diagram for explaining an interrelation among dots (pixels) in further detail.

In FIG. 26, a calculation expression for deriving each pixel value is shown. As appreciated, if a pixel value of an upper-left end pixel P1 is derived, pixel values of the other pixels in the neighborhood area can be derived through simple calculation.

Figure 27:
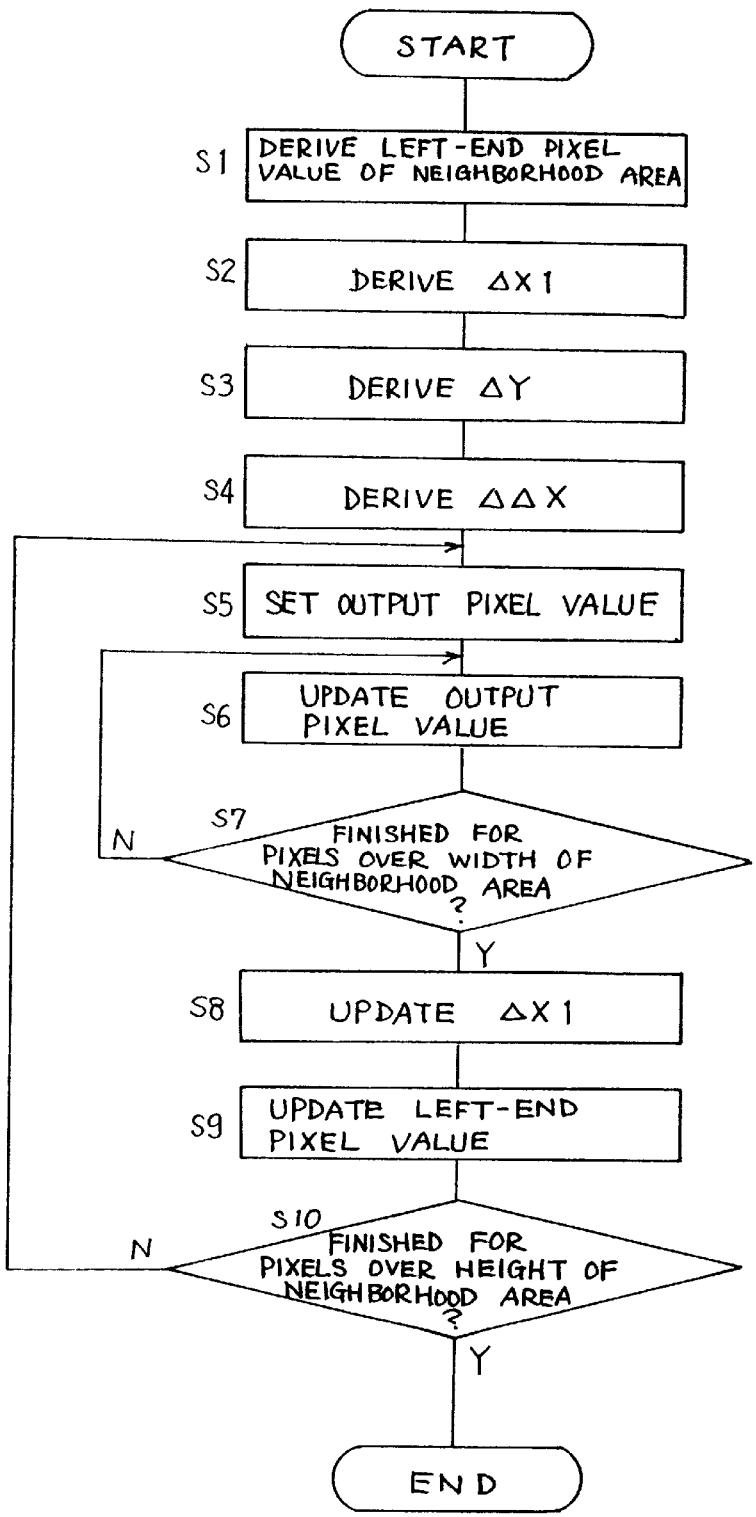
FIG. 27 is a flowchart representing an operation of the image data adjusting device according to the fifth preferred embodiment.

FIG. 27 is a flowchart showing an operation of the image data adjusting device shown in FIG. 24, that is, an image data adjusting method according to the fifth preferred embodiment.

First at step S1, a pixel value of the pixel at the upper-left end of the neighborhood area is calculated according to the calculation expression shown in FIG. 26. Then, $\Delta X1$ is derived at step S2, $\Delta Y$ is derived at step S3, and $\Delta\Delta X$ is derived at step S4. Subsequently, at step S5, the output pixel value derived at step S1 is set. Then, at step S6, the output pixel value is updated in the manner shown in FIG. 26. Subsequently, at step S7, it is checked whether the process has been finished for pixels over the width of the neighborhood area. If not finished at step S7, the execution of steps S6 and S7 is repeated. Then, for processing the pixels on the next line in the neighborhood area, the routine proceeds to step S8 where $\Delta X1$ is updated and further to step S9 where the pixel value set at step S5 is updated. Thereafter, at step S10, it is checked whether the process has been finished for pixels over the height of the neighborhood area. If not finished at step S10, the execution of steps S5 to S9 is repeated. When answer at step S10 becomes positive, the calculation process shown in FIG. 26 is finished.

<Effect of Fifth Embodiment>

In the fifth preferred embodiment, although seven-times addition and ten-times multiplication are required for deriving the pixel value of the upper-left end pixel, the pixel values of the other pixels can be derived by executing addition less than seven times, respectively. Accordingly, the first degree interpolation process can be improved.

<Sixth Embodiment>

Figure 28:
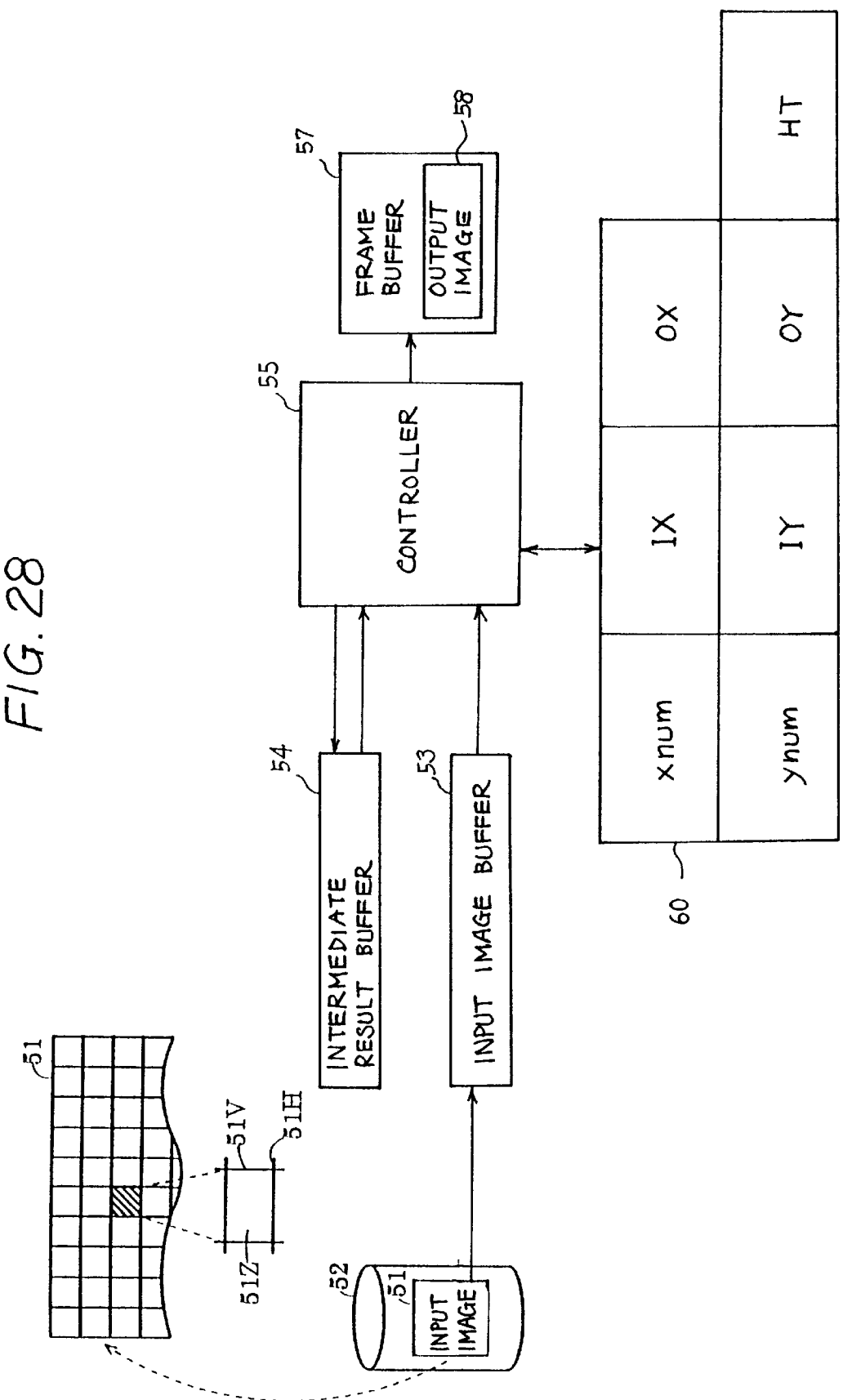
FIG. 28 is a block diagram showing an image data adjusting device according to a sixth preferred embodiment of the present invention.

FIG. 28 is a block diagram showing an image data adjusting device according to the sixth preferred embodiment.

In this embodiment, the device is used for decreasing the number of pixels of input image data. In FIG. 28, an input image 51 is equally divided into small regions 51Z by boundaries 51H parallel to a main scan direction and boundaries 51V parallel to a secondary scan direction. Each of pixel values of output pixels is derived by averaging pixel values of input pixels included in the corresponding small region 51Z. In this case, if the pixel values of all the input pixels are stored in a buffer, a large memory area is required. Accordingly, the device has a structure shown in FIG. 28.

The pixel values of all the pixels of the input image 51 are stored in an external storage 52. For processing these data, the device comprises an input image buffer 53, an intermediate result buffer 54, a controller 55 and a frame buffer 57.

The input image buffer 53 receives the pixels of the input image 51 per line in the main scan direction and holds them. The intermediate result buffer 54 stores the total values of the input pixel values as many as the number of the small regions arranged in the main scan direction. In the frame buffer 57, an output image 58 processed by the controller 55 is stored. The controller 55 includes a parameter holding section 60 storing an X-direction group dot counter value xnum, a Y-direction group dot counter value ynum, an X-direction input pixel counter value IX, a Y-direction input pixel counter value IY, an X-direction output pixel counter value OX, a Y-direction output pixel counter value OY and an X-direction total counter value HT. As appreciated, the X-direction represents the main scan direction, and the Y-direction represents the secondary scan direction.

The X-direction group dot counter value xnum represents the number of the input pixels included in the small region 51Z in the main scan direction and is used for an averaging process. The Y-direction group dot counter value ynum represents the number of the input pixels included in the small region 51Z in the secondary scan direction and is used for the averaging process. The X-direction input pixel counter value IX represents the number of the input pixels of the input image 51 in the main scan direction and is used for determining whether to finish a process for one-line data. The Y-direction input pixel counter value IY represents the number of the input pixels of the input image 51 in the secondary scan direction and is used for determining whether a process for one-page data is finished. The X-direction output pixel counter value OX represents a position on the frame buffer in the main scan direction on which an output pixel value is to be stored. The Y-direction output pixel counter value OY represents a position on the frame buffer in the secondary scan direction on which an output pixel value is to be stored. The X-direction total counter value HT represents an intermediate total value of the input pixel values, which is transferred to the intermediate result buffer 54 every time totaling of the input pixel values for one small region in the main scan direction is finished.

FIGS. 29 to 32 are diagrams for explaining grouping of the pixels of the input image when the input image is equally divided into the small regions.

Figure 29:
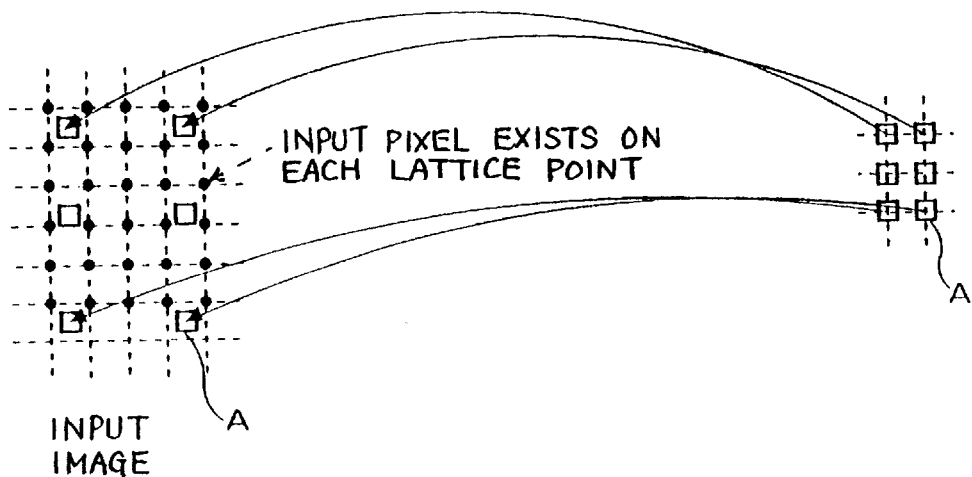
FIGS. 29 to 32 are diagrams for explaining grouping of pixels of an input image when the input image is equally divided into small regions.

In FIG. 29, it is assumed that the pixels of the input image exist on the lattice points of the dotted lattices, respectively. Then, it is considered to decrease the number of the pixels of the input image to obtain an output image shown on the right in the figure having an arrangement of output pixels A as represented by rectangles. In this case, coordinate positions of the output pixels A on the input image are derived, respectively. Those positions are indicated by rectangles in the dotted lattices on the input image. A pixel value of each output pixel A is derived by averaging the pixel values of the peripheral pixels of the input image.

Figure 30:
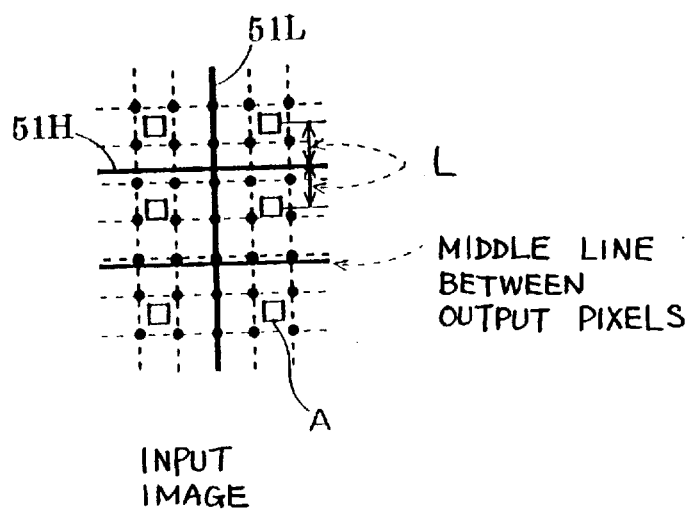

Accordingly, as shown in FIG. 30, lines are drawn between the adjacent output pixels A at the middle points therebetween to equally divide the input image. Thus, as shown in FIG. 30, if the output pixels A are arranged at intervals of 2L in the secondary scan direction, the boundaries 51H parallel to the main scan direction are set at intervals of 2L. Similarly, the boundaries 51L parallel to the secondary scan direction are set. In this manner, the pixels of the input image are grouped per small region by the boundaries 51H and 51L.

Figure 31:
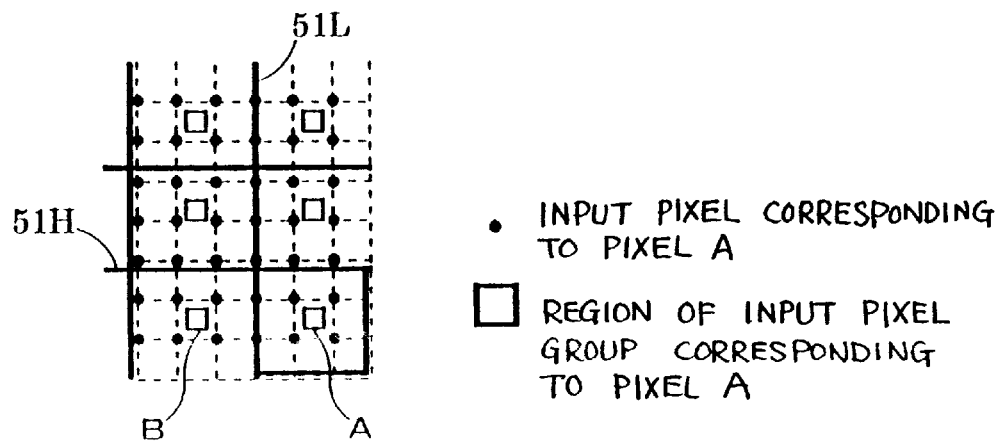

In FIG. 31, a pixel value of the lower-right output pixel A is obtained by averaging the pixel values of the four input pixels surrounding the lower-right output pixel A and located in the same group region defined by the boundaries 51H and 51L. On the other hand, due to selection of the boundaries, a group region corresponding to a lower-left output pixel B includes sixth input pixels.

Figure 32:
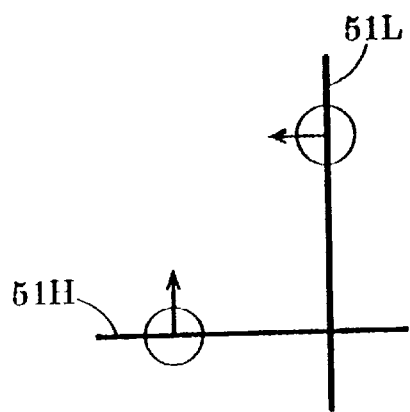

Specifically, as shown in FIG. 32, when the input pixel is located just on the boundary 51L or 51H, it is defined that, for example, such an input pixel belongs to a group of input pixels included in a left or upper region, respectively.

Figure 33:
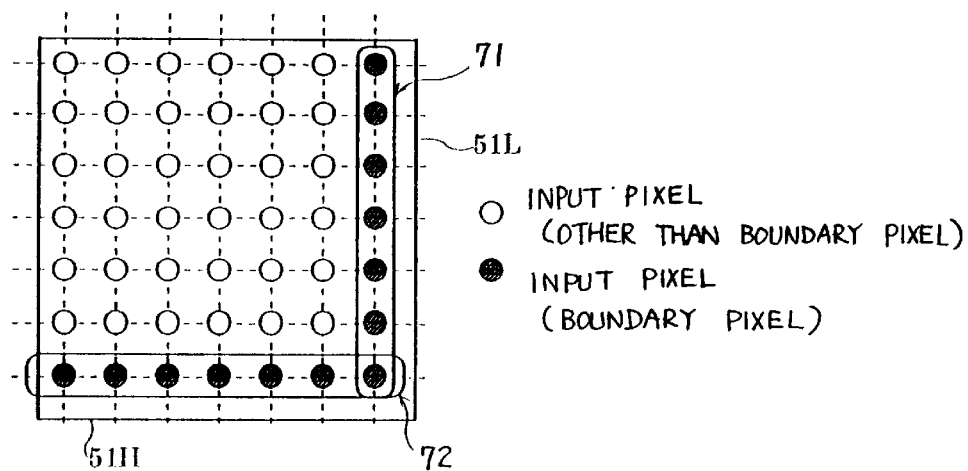
FIG. 33 is a diagram for explaining a region of an input pixel group.

FIG. 33 is a diagram for explaining the region of the input pixel group.

Each of the small regions defined by the boundaries 51L and 51H includes, as shown in FIG. 33, input pixels indicated in white and input pixels indicated in black. In this case, the pixels of one line closest to and prior to the boundary 51H parallel to the main scan direction is defined as X-direction boundary pixels 72. Similarly, the pixels of one column closest to and prior to the boundary 51L parallel to the secondary scan direction is defined as Y-direction boundary pixels 71. The device shown in FIG. 28 recognizes these boundary pixels (indicated in black) from the other pixels (indicated in white) and, when detecting the boundary pixel, carries out a given totaling process or a given averaging process. With this arrangement, using the intermediate result buffer 54 and the input image buffer 53 both of relatively small capacities, the device derives a mean value of the pixel values of the input pixels in a group per region.

Figure 34:
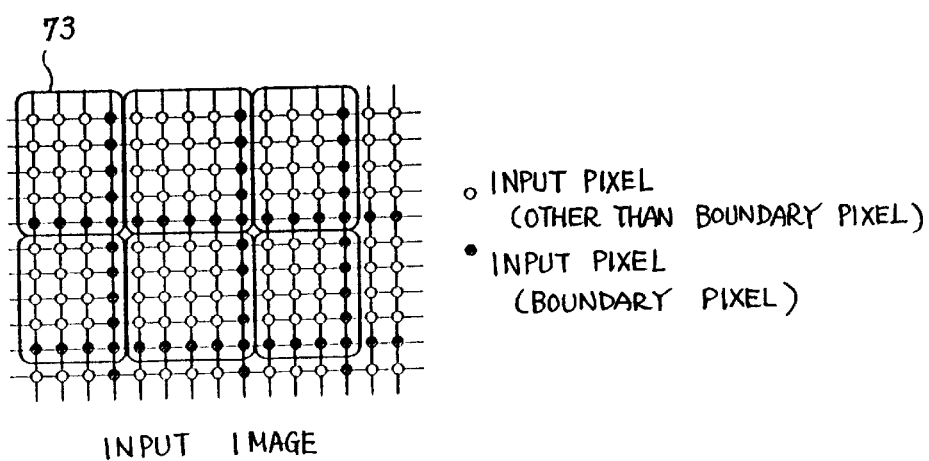
FIG. 34 is a diagram for explaining an averaging method using boundary pixels.

FIG. 34 is a diagram for explaining an averaging method using the boundary pixels.

When carrying out the region setting and the grouping as described above, the input pixels are grouped by frames 73 as shown in FIG. 34 and, for deriving means values of the grouped input pixels, the Y-direction boundary pixels 71 and the X-direction boundary pixels 72 are read in.

Figure 35:
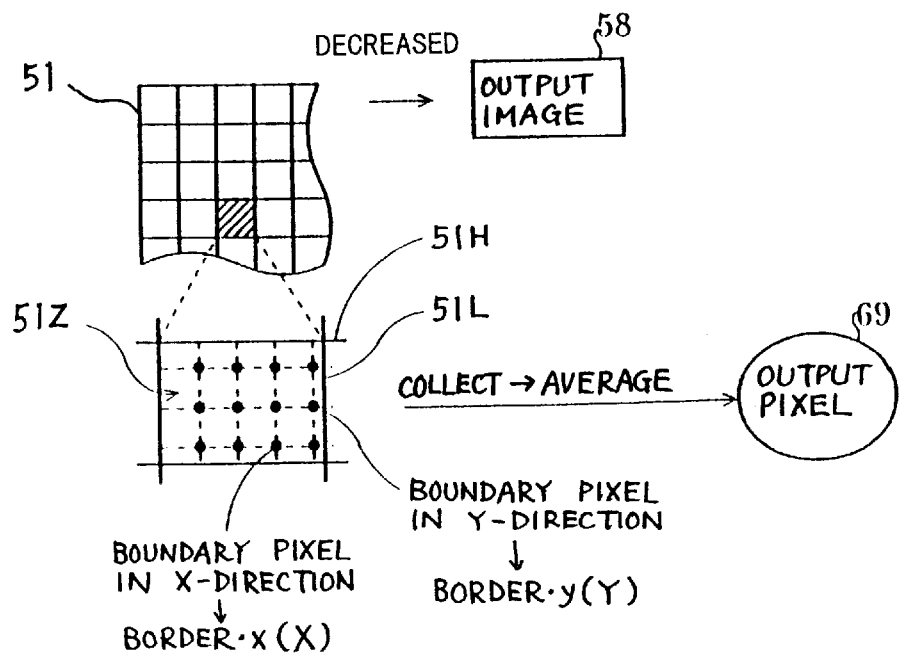
FIG. 35 is a diagram for explaining a criterion for a boundary pixel.

FIG. 35 is a diagram for explaining a criterion for the boundary pixel.

For determination to be the foregoing boundary pixel, the criterion for the boundary pixel is required as follows:

$$border \cdot x(X) = \begin{cases} 1: [(dst \cdot x \cdot X)/src \cdot x] < [(dst \cdot x \cdot (X+1))/src \cdot x] \\ 0: [(dst \cdot x \cdot X)/src \cdot x] \geq [(dst \cdot x \cdot (X+1))/src \cdot x] \end{cases}$$

$$border \cdot y(Y) = \begin{cases} 1: [(dst \cdot y \cdot Y)/src \cdot y] < [(dst \cdot y \cdot (Y+1))/src \cdot y] \\ 0: [(dst \cdot y \cdot Y)/src \cdot y] \geq [(dst \cdot y \cdot (Y+1))/src \cdot y] \end{cases}$$

As shown in FIG. 35, the input image 51 is equally divided into units of the group regions 51Z by the X-direction boundaries and the Y-direction boundaries 51L. In this case, a discriminant function of the X-direction boundary pixel is set to be border.x(X), and a discriminant function of the Y-direction boundary pixel is set to be border.y(Y). As shown above, border.x(X) is a function of dst.x, src.x and X. dst.x represents a width of the output image in the main scan direction. src.x represents a width of the input image in the main scan direction. X represents a position of a target pixel in the main scan direction of the input image. When an interval between the input pixels is "1", a width of each small region is given by src.x/dst.x. Under these conditions, a condition for the X-th input pixel from the left to be a boundary pixel is that the boundary of the region falls between the X-th and (X+1)-th input pixels. Since the boundaries of the regions are arranged at intervals of src.x/dst.x, condition for the X-th input pixel to be a boundary pixel is given by the following formula (1):

$$X < ((src.x \cdot n)/dst.x) \leq X+1 \tag{1}$$

Further, a condition for the X-th input pixel to be a boundary pixel is that an integer m satisfying the following formula (2) exists:

$$X < ((src.x \cdot m)/dst.x) \leq X+1 \tag{2}$$

In the formula (2), all the sides are multiplied by dst.x/src.x. Since dst.x/src.x is positive, the directions of inequality signs do not change.

$$(dst.x \cdot X)/src.x < m \leq (dst.x \cdot (X+1))/src.x \tag{3}$$

Since m is an integer, even if the Gauss' symbol is added to both sides, the relationship does not change so that the following formula (4) is established:

$$[(dst.x \cdot X)/src.x] < m \leq [(dst.x \cdot (X+1))/src.x] \tag{4}$$

Further, since [(dst.x·X)/src.x] and [(dst.x·(X+1))/src.x] are integers, if [(dst.x·X)/src.x]<[(dst.x·(X+1))/src.x], m satisfying [(dst.x·X)/src.x]<m≤[(dst.x·(X+1))/src.x] exists. At least m=[(dst.x·(X+1))/src.x] satisfies the condition.

Specifically, [(dst.x·X)/src.x]<[(dst.x·(X+1))/src.x] is a condition for X to be a boundary pixel.

From the foregoing, border.x(X) is defined as follows:

$$border.x(X)=1: [(dst.x \cdot X)/src.x] < [(dst.x \cdot (X+1))/src.x] \tag{5}$$

$$border.x(X)=0: [(dst.x \cdot X)/src.x] \geq [(dst.x \cdot (X+1))/src.x] \tag{6}$$

Similarly, the discriminant function can also be used in the secondary scan direction, that is, in the Y-direction.

$$\text{border.}y(Y)=1: [(dst.y \cdot Y)/src.y] < [(dst.y \cdot (Y+1))/src.y] \quad (7)$$

$$\text{border.}y(Y)=0: [(dst.y \cdot Y)/src.y] \geq [(dst.y \cdot (Y+1))/src.y] \quad (8)$$

Figure 36:
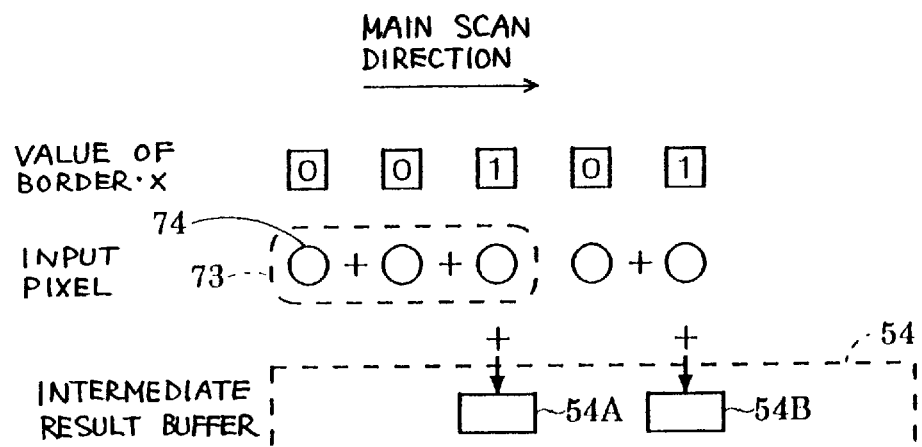
FIG. 36 is a diagram for explaining the X-direction flow of data in the averaging method.

FIG. 36 is a diagram for explaining the X-direction flow of data in the averaging method.

Using this figure, a structure of the intermediate result buffer 54 and a totaling process of the pixel values executed in this embodiment will be described.

For example, as shown in the figure, it is assumed that pixels 74 forming the input image are stored in the input image buffer 53 shown in FIG. 28 serially in the main scan direction. These pixels are processed in turn from the left in FIG. 36. A pixel value of the first pixel is stored as the X-direction total counter value HT shown in FIG. 28. A pixel value of the next pixel is added to the total counter value HT. Pixel values of the subsequent pixels are added in sequence to the total counter value HT. On the other hand, if a boundary pixel of the group is detected, the total counter value HT is transferred to a register 54A of the intermediate result buffer 54 and then reset. The detection of the boundary pixel is determined based on a value of border.x.

Accordingly, as shown in FIG. 36, when the value of border.x becomes "1", the register 54A is switched to a register 54B for the next group. The same process is carried out for the subsequent groups so that, when the process for one line is finished, the total values of the pixel values of the pixels included in the respective small regions and processed up to then are stored in the registers of the intermediate result buffer 54 the number of which is the same as the number of the small regions in the main scan direction.

Figure 37:
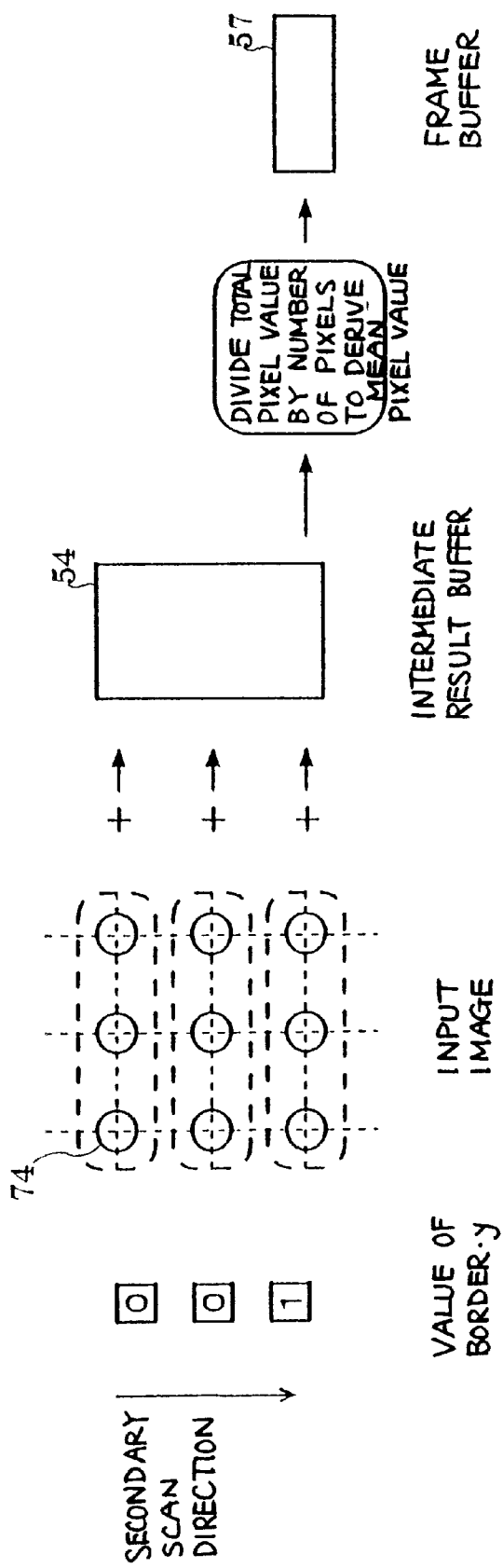
FIG. 37 is a diagram for explaining the Y-direction flow of data in the averaging method.

FIG. 37 is a diagram for explaining the Y-direction flow of data in the averaging method.

The process in the main scan direction advances as shown in FIG. 36. Then, when the process for one line is finished, the process for the next line is started. The process in the secondary scan direction is carried out as shown in FIG. 37.

When executing the process in the secondary scan direction, a value of border.y is referred to before starting the process. When the value of border.y is "0", the totaling process for one line is executed as show in FIG. 36. The contents of each register of the intermediate result buffer 54 are accumulated per line by adding the total value for a subsequent line. Now, it is considered to process the line where the value of border.y becomes "1". Since this line represents a group of the pixel values arranged last in each region, after the pixel values of this line are totaled per region, a value of each register of the intermediate result buffer 54 represents the total value of all the pixel values included in the corresponding region. On the other hand, the number of the pixels included in each region can be calculated based on the X-direction group dot counter value xnum and the Y-direction group dot counter value ynum. Accordingly, by dividing the total value of the pixel values of each region by the number of the pixels included in the corresponding region, the mean value can be derived. This mean value is stored in the frame buffer 57 so as to be a pixel value of an output pixel.

Figure 38:
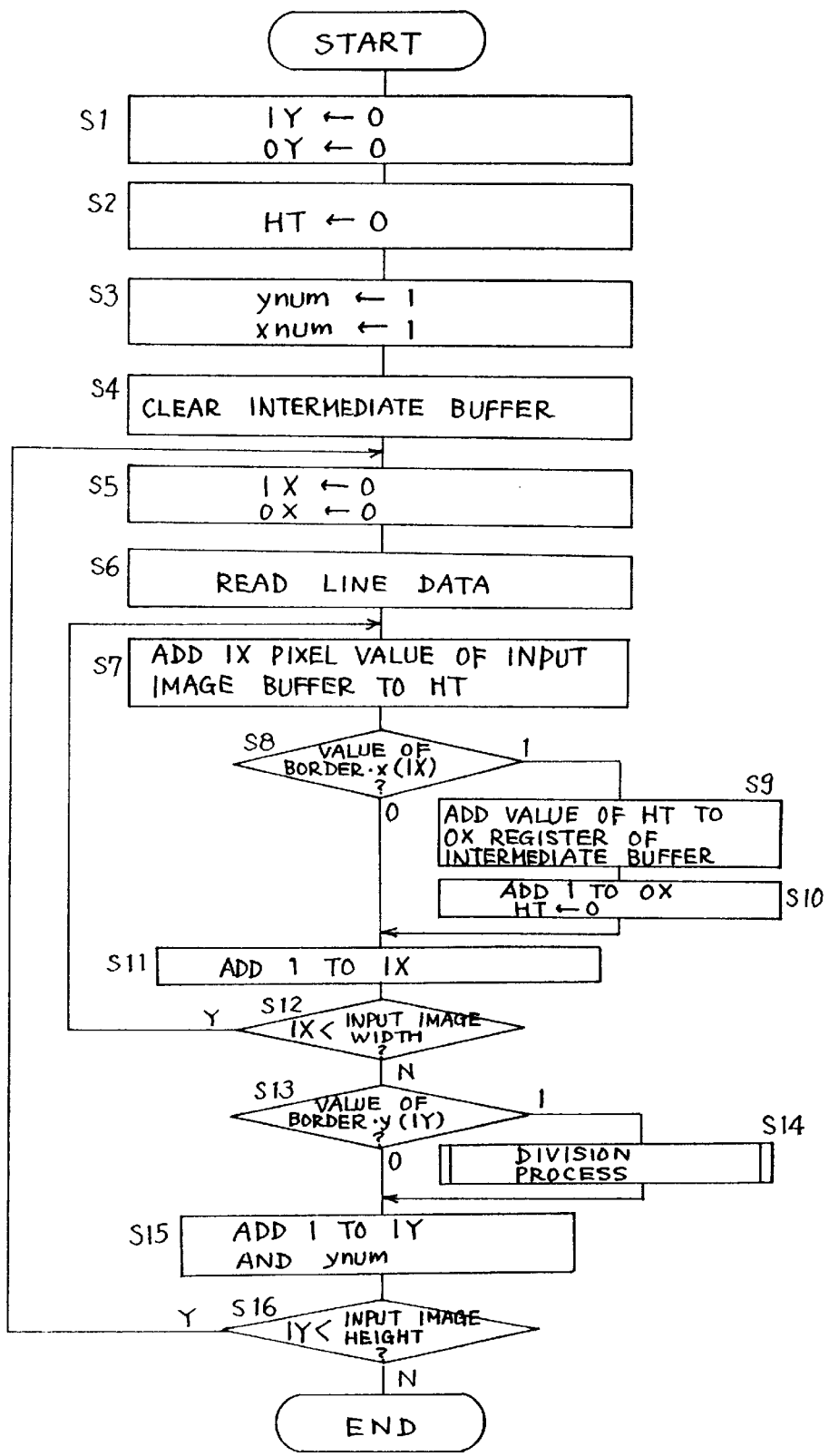
FIG. 38 is a flowchart representing an operation of the image data adjusting device according to the sixth preferred embodiment.

FIG. 38 is a flowchart showing an operation of the image data adjusting device shown in FIG. 28, that is, an image data adjusting method according to the sixth preferred embodiment.

Steps S1 to S4 represent initializing processes. At step S1, the Y-direction input pixel counter value IY and the Y-direction output pixel counter value OY are set to "0". This enables reading the image data from the first line. At step S2, the X-direction total counter value HT is set to "0". The counter value HT is for holding an intermediate totaling result of the pixel values. At step S3, the Y-direction group dot counter value ynum and the X-direction group dot counter value xnum are set to "1". This enables counting the number of the pixels in the region in the main scan direction and the secondary scan direction. At step S4, the intermediate result buffer 54 is cleared.

Subsequently, at step S5, the X-direction input pixel counter value IX and the X-direction output pixel counter value OX are set to "0". Now, from the leftmost pixel, the following process is repeated. At step S6, the input image is read in by one line. Then, at step S7, the IX-th pixel value of the input image buffer 53 is added to the total counter value HT. Thus, the total counter value HT represents the sum of the pixel values of the pixels being processed. Subsequently, at step S8, a value of border.x is checked. If this value is "0", the routine proceeds to step S11 where the counter value IX is incremented by "1", and further proceeds to step S12 where it is checked whether the counter value IX is smaller than a width of the input image. If answer at step S12 is positive, that is, being smaller, the routine returns to step S7.

In this manner, the pixel values are added to the total counter value HT in sequence and, when the value of border.x becomes "1" at step S8, the routine proceeds to step S9 where the total counter value HT is added to the OX-th register of the intermediate result buffer 54. Then, at step S10, the counter value OX is incremented by "1" and the total counter value HT is reset to "0". Subsequently, the routine proceeds to step S11 where the counter value IX is incremented by "1", and further proceeds to step S12. Through the execution of steps S7 to S12, the pixel values for one line are totaled per region and stored in the intermediate result buffer 54 per region.

From step S12, the routine proceeds to step S13 where a value of border.y is checked. If this value is "0", the routine proceeds to step S15 where the counter value IY and the counter value ynum are incremented by "1" for processing the next line. Subsequently, the routine proceeds to step S16 where it is checked whether the counter value IY is smaller than a height of the input image. If answer at step S16 is positive, that is, being smaller, the routine returns to step S5. Through the execution of step S16, it is checked whether the process for one frame is finished.

On other hand, if the value of border.y becomes "1" at step S13, the routine proceeds to step S14 where a division process is executed.

Figure 39:
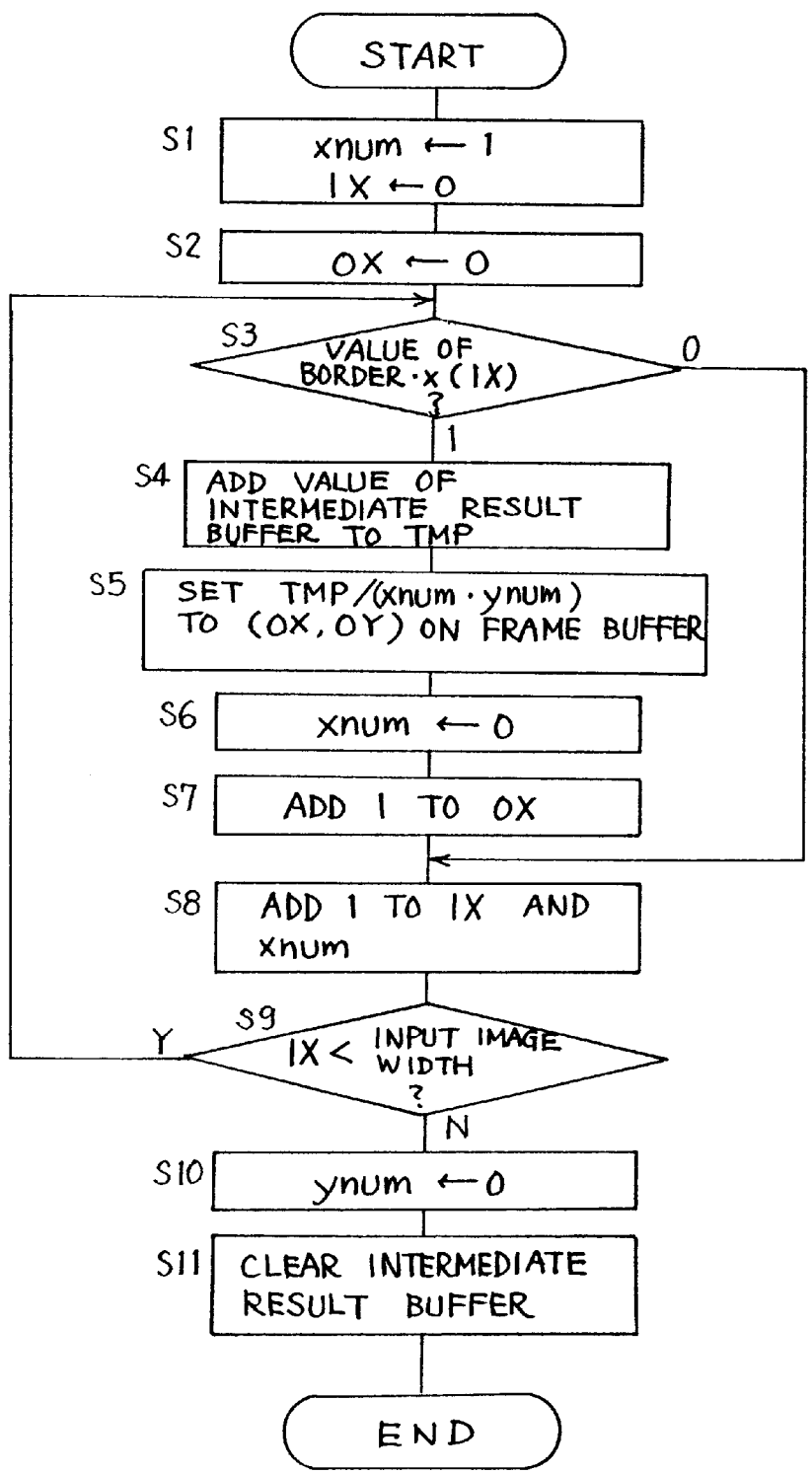
FIG. 39 is a flowchart representing a division process as a subroutine of the flowchart shown in FIG. 38.

FIG. 39 is a flowchart showing the division process of step S14.

In the division process, first at step S1, the counter value xnum is set to an initial value of "1", and the counter value IX is set to an initial value of "0". Further, at step S2, the counter value OX is set to an initial value of "0".

The execution of steps S1 and S2 enables starting the process from the first pixel of the line.

At step S3, a value of border.x is checked. When two or more pixels are included in one region in the main scan direction, the value of border.x at first is normally "0". Accordingly, the routine proceeds to step S8 where the counter value IX and the counter value xnum are incremented by "1", and further proceeds to step S9. If the counter value IX is smaller than the width of the input image at step S9, the routine returns to step S3. In this manner, the execution of steps S3, S8 and S9 is repeated until the value of border.x becomes "1". This process is executed only for counting the number of the pixels included in the region in the main scan direction, as represented by the counter value xnum.

As appreciated, the totaling of the pixel values of the line has been finished through the execution of steps S7 to S12 in FIG. 38. When the value of border.x becomes "1" at step S3, the routine proceeds to step S4 where the value of the corresponding register of the intermediate result buffer 54 is stored in a temporary file TMP. Then, at step S5, a mean value is derived to determine a pixel value of the corresponding pixel on the frame buffer 57. The mean value is derived by dividing the value stored in the temporary file TMP by xnum·ynum and set at a position (OX, OY) on the frame buffer 57. At step S6, the counter value xnum is cleared to "0" for counting the number of pixels in the next region in the main scan direction. Then, at step S7, the counter value OX is incremented by "1" for designating the next output pixel on the frame buffer 57.

Subsequently, at step S8, the counter value IX and the counter value xnum are incremented by "1". Then, the routine proceeds to step S9 where it is checked whether the process has been finished over the line. If there remains a subsequent region on the line, the routine returns to step S3 and repeats the foregoing process. In this manner, when the value of border.y becomes "1", steps S1 to S9 in FIG. 39 are executed so as to derive the mean value of the pixel values of all the pixels included in each of the regions arranged on the line where the value of border.y becomes "1". After the execution of steps S1 to S9, the routine proceeds to step S10 where the counter value ynum is cleared to "1" and further to step S11 where the intermediate result buffer 54 is cleared, for processing the next line.

<Effect of Sixth Embodiment>

According to the sixth preferred embodiment, the pixels forming the input image are stored per line and, upon detection of each of the boundary pixels of the small regions in the main scan direction, the sum of the pixel values in each of the small regions is stored in the intermediate result buffer. Then, upon detection of the boundary pixel in the secondary scan direction, the mean value of the pixel values in each region is derived by dividing the sum of the pixel values in the corresponding region by the number of the pixels included in the corresponding region. With this arrangement, only the input image buffer 53 for one-line data and the intermediate result buffer 54 of relatively small capacity are required for storing the pixel values forming the input image. Thus, a buffer memory area to be used can be largely reduced.

<Seventh Embodiment>

Figure 40:
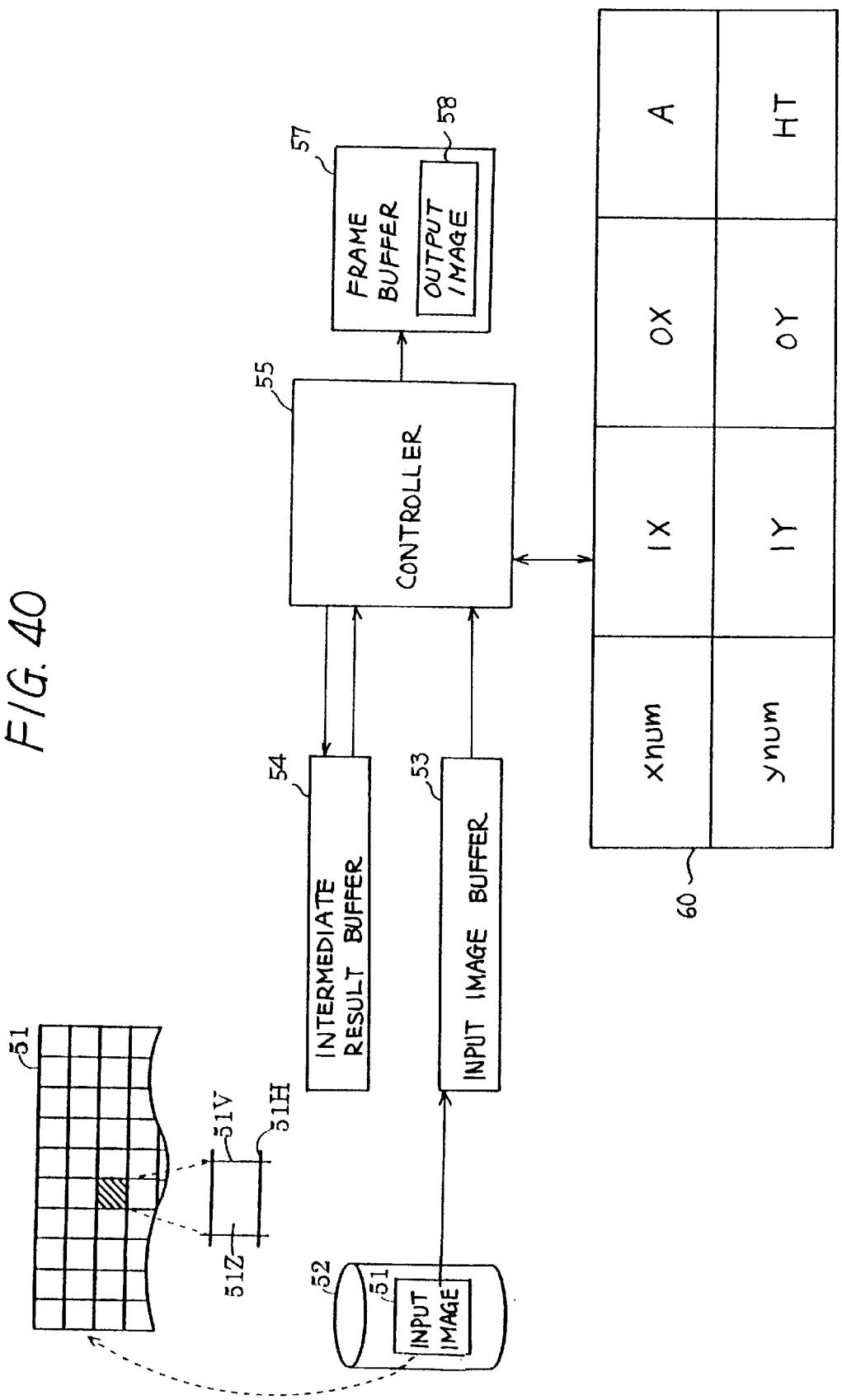
FIG. 40 is a block diagram showing an image data adjusting device according to a seventh preferred embodiment of the present invention.

FIG. 40 is a block diagram showing an image data adjusting device according to the seventh preferred embodiment.

The device in this embodiment differs from that in the sixth preferred embodiment in that a parameter holding section 60 further includes a register for holding a sampling interval A. With this arrangement, in this embodiment, as opposed to the sixth preferred embodiment where the pixel values of all the pixels in each small region are sampled, added and averaged, pixel values of only partly sampled pixels in each small region are added and averaged.

Figure 41:
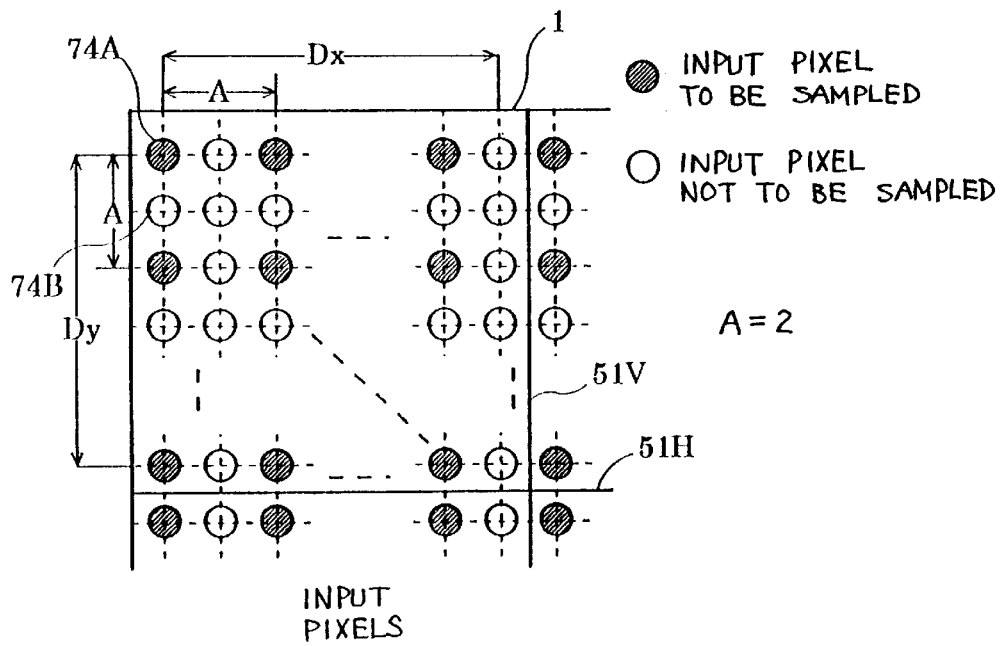
FIG. 41 is a diagram for explaining input pixels to be sampled.

FIG. 41 is a diagram for explaining input pixels to be sampled.

As shown in the figure, an input image 1 is equally divided into small regions by boundaries 51V parallel to the secondary scan direction and boundaries 51H parallel to the main scan direction. As shown in the figure, each small region includes a number of input pixels, and black pixels 74A and white pixels 74B are set among them so as to sample only the black pixels 74A. As further shown in the figure, intervals between the pixels located at corners of the region are set to Dx in the main scan direction and Dy in the secondary scan direction, respectively, and a sampling interval is set to A. In this embodiment, A is set to two (A=2) both in the main and secondary scan directions (X- and Y-directions). Accordingly, the pixels are sampled alternately both in the main and secondary scan directions.

Figure 42:
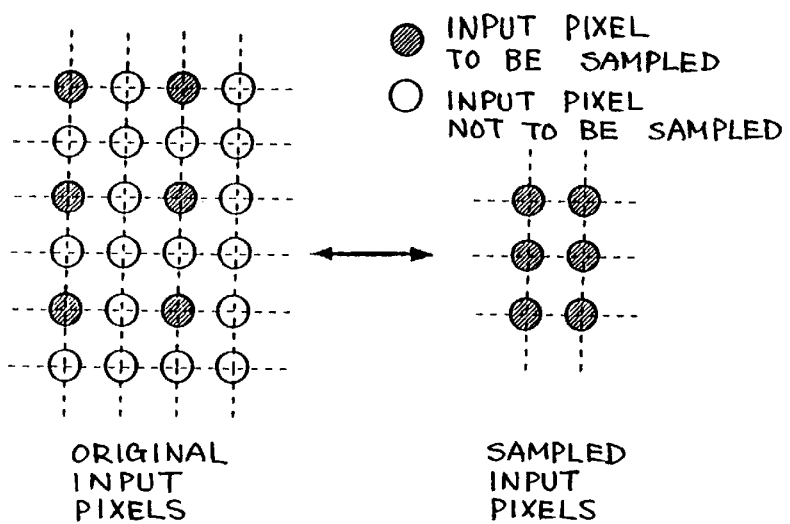
FIG. 42 is a diagram for explaining an image after sampling.

FIG. 42 is a diagram for explaining an image after sampling.

In the figure, an original input image is shown on the left and an image formed by sampled input pixels is shown on the right. As appreciated, if the sampling intervals are set to be equal in the X- and Y-directions, the image after sampling is similar to the original input image.

Figure 43:
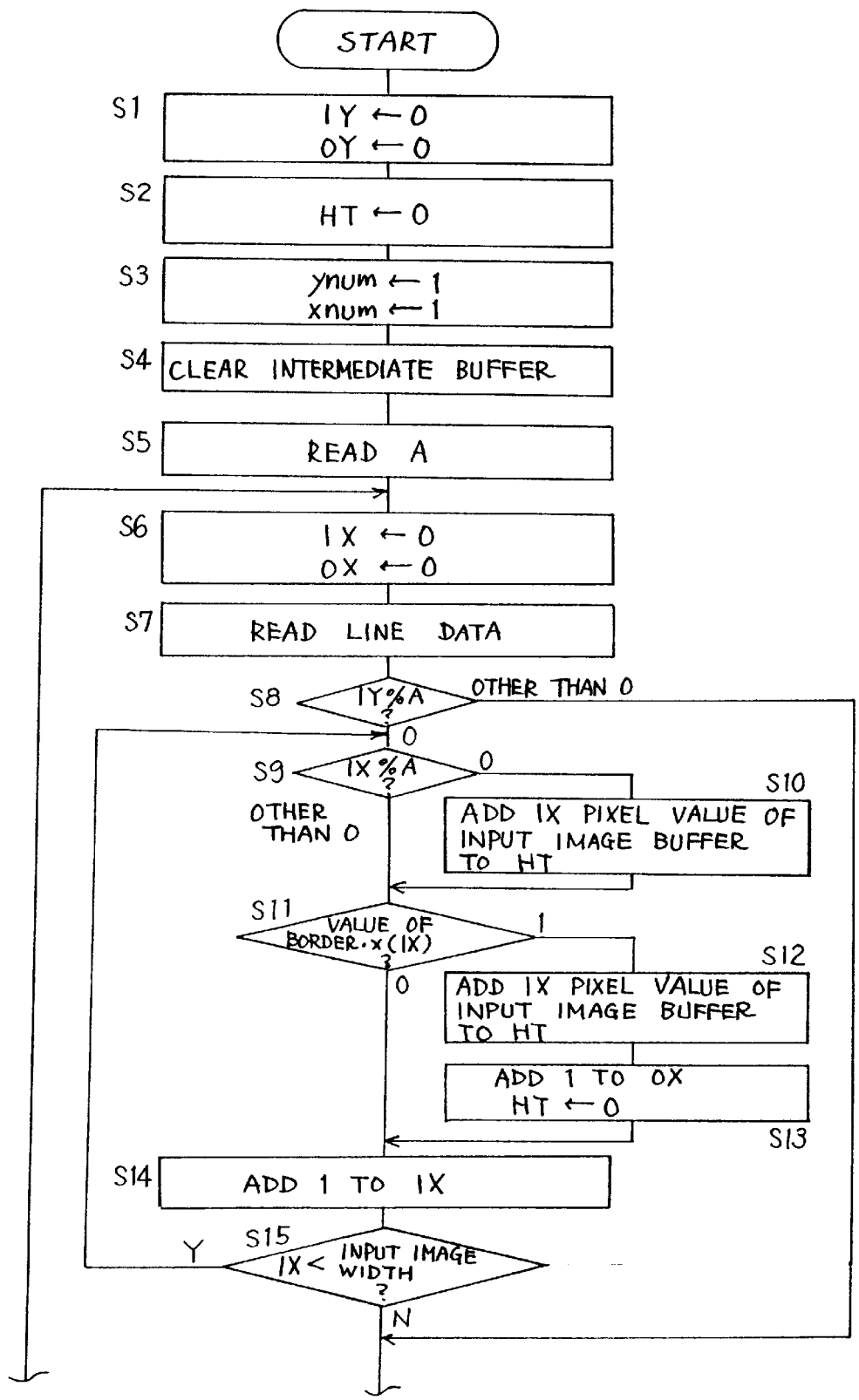
FIG. 43 is a flowchart representing an operation of the image data adjusting device according to the seventh preferred embodiment.

FIG. 43 is a flowchart showing an operation of the image data adjusting device shown in FIG. 40, that is, an image data adjusting method according to the seventh preferred embodiment.

The flowchart in this embodiment differs from that in the sixth preferred embodiment in that steps S5, S8 and S9 are newly added in this embodiment. Since the other process is essentially the same as that in the sixth preferred embodiment, explanation thereof is omitted for brevity of description.

At step S5 in FIG. 43, a sampling interval A is read in. As described above, in this embodiment, A is set to two (A=2) both in the main and secondary scan directions (X- and Y-directions). Then, just after reading in the input pixels at step S7, a remainder of division of the counter value IY by A is compared with 0 at step S8 so as to determine whether the line is a sampling line to be subjected to a totaling process or a line to be skipped.

If it is the line to be skipped, the routine proceeds from step S8 to step S13 in FIG. 38. Even if the line is to be skipped, it may be the final line of the region. Accordingly, a value of border.y is checked at step S13 in FIG. 38. Since the routine subsequent to step S15 in FIG. 43 is the same as the routine subsequent to step S12 in FIG. 38, illustration thereof in FIG. 43 is omitted.

On the other hand, if it is the sampling line at step S8, the routine proceeds to step S9 where a remainder of division of the counter value IX by A is compared with 0 so as to determine whether the corresponding pixel is to be sampled or skipped. If the pixel is to be skipped, the routine proceeds from step S9 to step S11 where it is checked whether the pixel is a boundary pixel. On the other hand, if the pixel is to be sampled, the routine proceeds from step S9 to step S10 where a pixel value of that pixel is added to the counter value HT.

When deriving the remainder of division of IY and A or IX and A, the following process is carried out in advance:
Some conditions are set in advance.
(1) Similar to the sixth preferred embodiment, the mean value is derived per group of input pixels corresponding to an output pixel. However, as opposed to the sixth preferred embodiment, the sum of all the input pixels in the group is not derived.
(2) Input pixels to be used in the totaling process are sampled at constant intervals A. When A=1, all the input pixels are sampled. The sampling intervals A are equal both in the X- and Y-directions. This is necessary when an image after sampling is required to be similar to an original image.

Now, explanation will be made to how to derive A. For deriving A, some parameters are set in advance.
(1) The maximum number of input pixels to be totaled is set to N. N is determined based on the accuracy of the totaling calculation and the number of gradations of an input pixel. For example, it is assumed that a pixel value represents 256 gradations (in this case, the maximum pixel value is 255) and the sum is derived by 16 bits. In this case, since the maximum value which can be expressed by 16 bits is 65,535, it is necessary to satisfy N·255≦65,535 in consideration of all the pixel values being 255. Accordingly, N=257.

(2) In a group, the number of X-direction pixels is set to Dx, and the number of Y-direction pixels is set to Dy.

When sampling the pixels at intervals A, the number of the pixels to be sampled in the group is Dx/A in the X-direction and Dy/A in the Y-direction. Since the number of the pixels to be sampled can not exceed N, the interval A needs to satisfy the following formula:

$$(Dx/A)\cdot(Dy/A) \leq N \tag{9}$$

wherein A is an integer.

Further, if A is set to be too great, the number of the pixels to be sampled is reduced. Accordingly, A needs to be the minimum value which satisfies the formula (9). Specifically, A needs to be a value such that A−1 does not satisy the formula (9), but A satisfies the formula (9). Such A can be derived by raising to unit a decimal part of A' which satisfies (Dx/A')·(Dy/A')=N.

By solving (Dx/A')·(Dy/A')=N, A' is given by $$A' = sqrt((Dx \cdot Dy)/N) \tag{10}$$

wherein sqrt represents square root.

Since A is obtained by raising to unit a decimal part of A', A is given by $$A = [A'] + 1 \tag{11}$$

wherein A' is not an integer, and [A'] is the Gauss' symbol and represents the maximum integer not exceeding A'.

$$A = A' \tag{12}$$

wherein A' is an integer.

Values of Dx and Dy differ depending on groups. Accordingly, it is possible that A derived based on Dx and Dy of a certain group induces the overflow of the register of the intermediate result buffer in another group.

However, using the maximum values of Dx and Dy upon calculation of A, a value of A which can be used for all the groups can be derived.

The maximum value of Dx can be derived by raising to unit a decimal part of src.x/dst.x, and the maximum value of Dy can be derived by raising to unit a decimal part of src.y/dst.y.

As appreciated, at step S5 in FIG. 39 where the mean value TMP/xnum·ynum is derived, since the pixels are sampled intermittently in this embodiment, it is necessary that xnum and ynum be subjected to division, that is, in the flowchart of FIG. 43, xnum and ynum are divided by the sampling interval A, respectively.

<Effect of Seventh Embodiment>

As described above, by sampling the pixels at intervals A, even when a large number of the pixels are included in the small region, a desired number of the pixels are sampled from among them and totaled. Accordingly, when the pixel values are totaled and stored in the intermediate result buffer, the sum of the pixel values does not become unnecessarily large so that the memory capacity of the buffer can be largely reduced.

<Eighth Embodiment>

Figure 44:
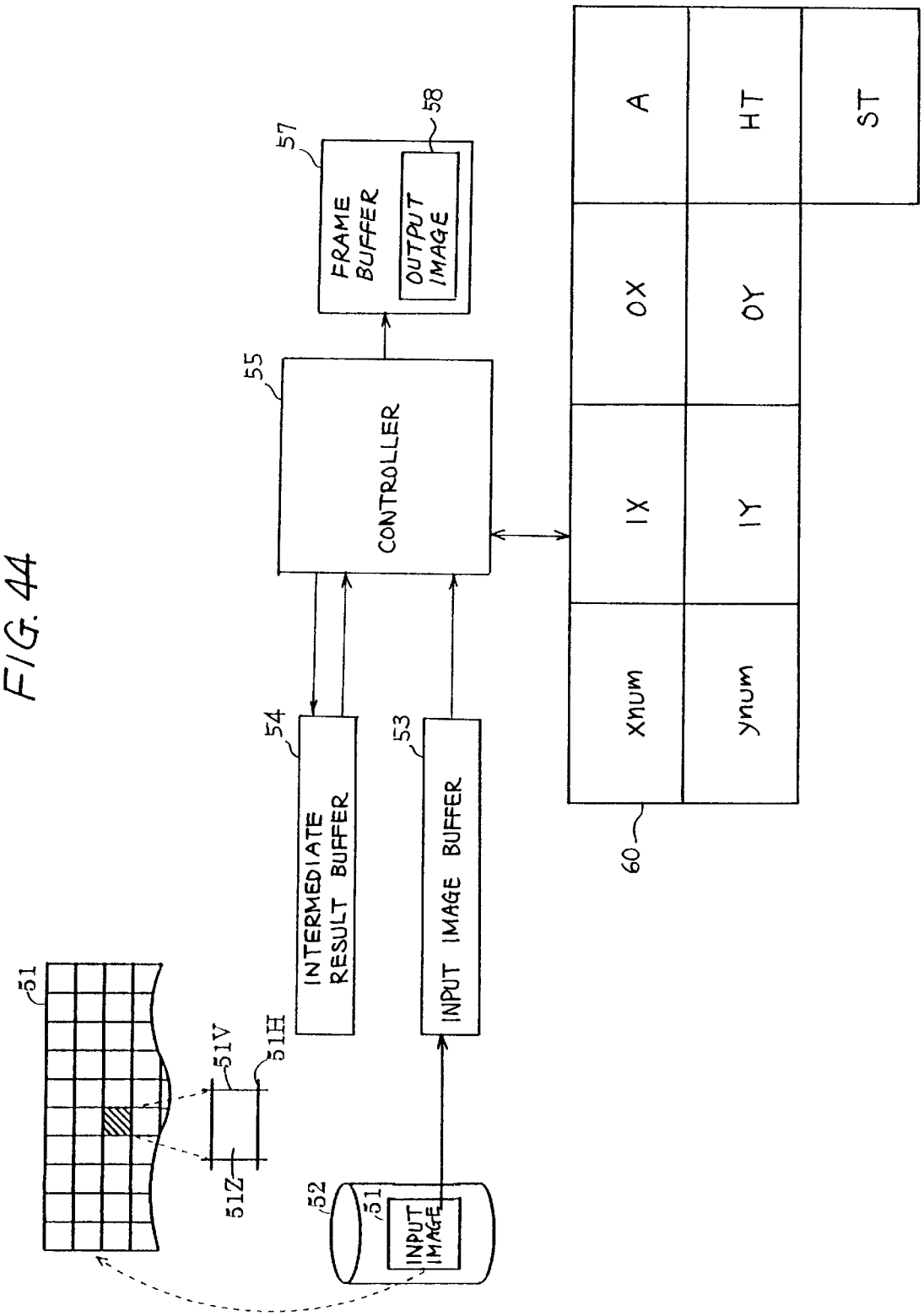
FIG. 44 is a block diagram showing an image data adjusting device according to an eighth preferred embodiment of the present invention.

FIG. 44 is a block diagram showing an image data adjusting device according to the eighth preferred embodiment.

The device in this embodiment differs from that in the seventh preferred embodiment in that a parameter holding section 60 further stores a sampling total counter value ST. The other structure is essentially the same as that of the seventh preferred embodiment.

Figure 45:
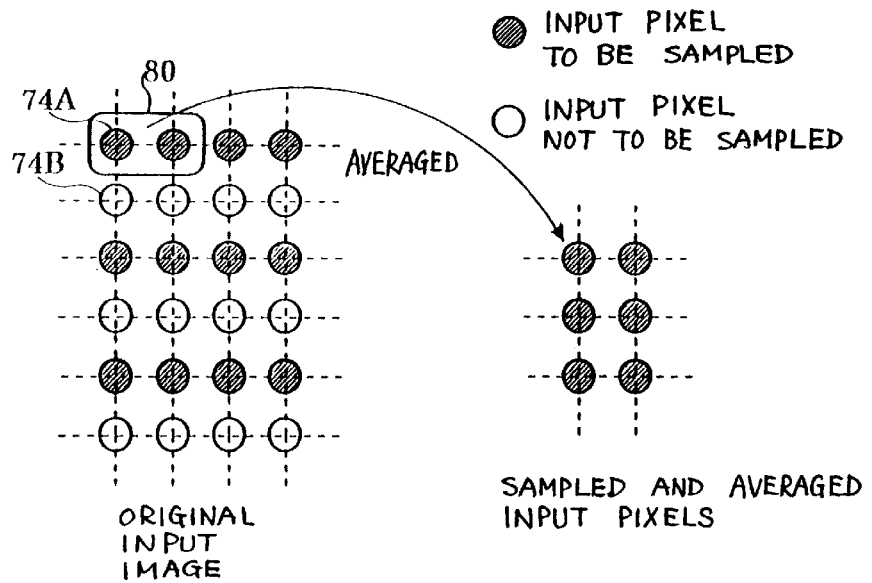
FIG. 45 is a diagram for explaining a data adjusting process according to the eighth preferred embodiment.

FIG. 45 is a diagram for explaining a data adjusting process according to the eighth preferred embodiment.

In the seventh preferred embodiment, by carrying out the intermittent sampling of the pixels, the pixel values can be totaled and averaged without causing the overflow of the register of the intermediate result buffer. In this case, the input pixels not sampled are ignored. On the other hand, in this embodiment, an averaging process is also applied to pixels not to be sampled for improving the image quality. For defining the range where the averaging process is applied, the concepts of a sampling region is introduced. The sampling region comprises, on a line to be sampled, a plurality of input pixels including at least an input pixel to be sampled and a rightward subsequent input pixel which is not to be sampled. The sampling region is a region having a width of A and a height of one line on an input image. In FIG. 45, black pixels represent pixels on lines to be sampled. Further, each of sampling regions 80 is formed by a pair of adjacent two black pixels. By averaging the pixels forming the sampling regions 80 on the original input image as shown on the left in the figure, an image of input pixels similar to the original input image are obtained as shown on the right in the figure.

Figure 46:
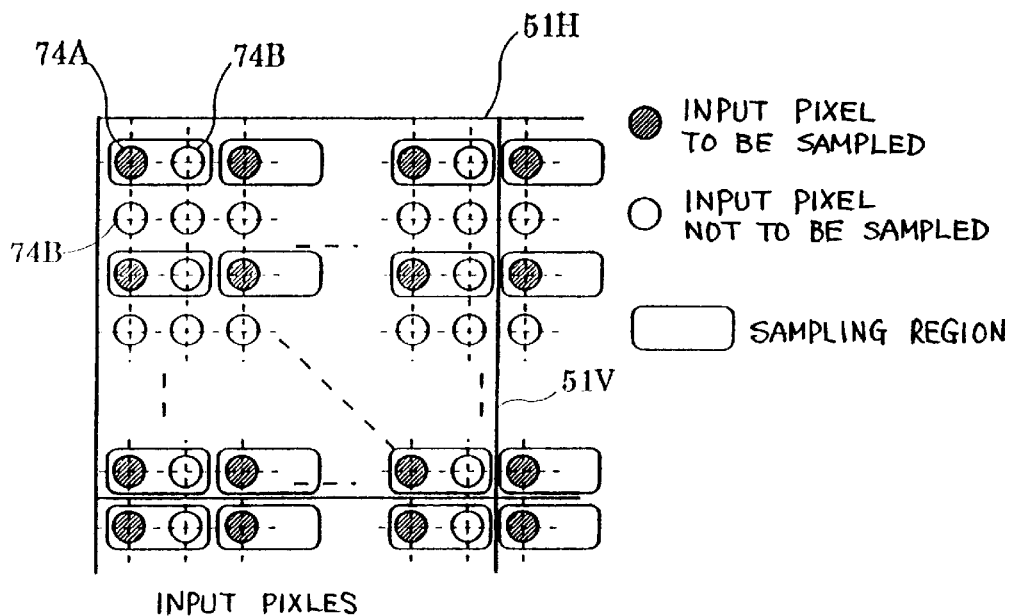
FIG. 46 is a diagram for explaining a sampling region.

FIG. 46 is a diagram for explaining the sampling region.

For example, as shown in FIG. 46, it is assumed that a large number pixels exist in each of small regions defined by the boundaries 51H and 51V, and sampling of the pixels is carried out at A=2 both in the X- and Y-directions. In this case, a black pixel 74A and a rightward subsequent pixel 74B are included in the same sampling region 80. Pixel values of the pixels included in the same sampling region 80 are added in turn to the sampling total counter value ST and averaged, and then added to the X-direction total counter value HT. Accordingly, since the pixel values of the pixels included in each sampling region is averaged and then added to the counter value HT, even if the number of sampled pixels is actually increased, the overflow of the register of the intermediate result buffer is not induced.

Figure 47:
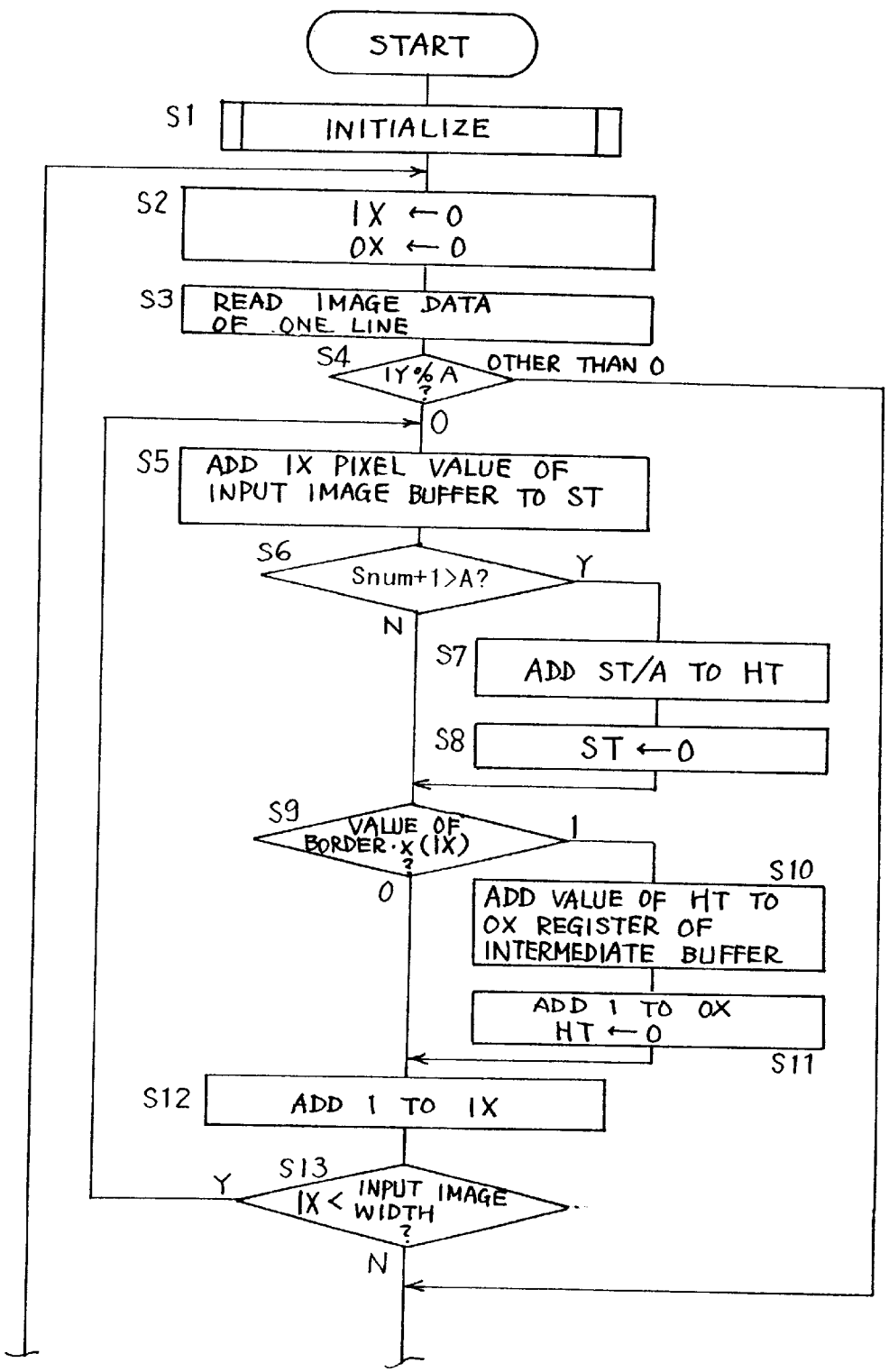
FIG. 47 is a flowchart representing an operation of the image data adjusting device according to the eighth preferred embodiment.

FIG. 47 is a flowchart showing an operation of the image data adjusting device shown in FIG. 44, that is, an image data adjusting method according to the eighth preferred embodiment.

The flowchart of this embodiment differs from the flowchart of the seventh preferred embodiment as shown in FIG. 43 only in steps S5 to S8. Since steps S1 to S4 in FIG. 47 are the same as steps S1 to S8 in FIG. 43, explanation thereof is omitted for brevity of description. Actually, step S1 of this embodiment includes a unique process, which, however, will be referred to later with reference to FIG. 48. When the routine proceeds from step S4 to step S5, the IX-th pixel value of the input image buffer 53 is added to the sampling total counter value ST. Then, at step S6, "1" is added to a counter value Snum representing the number of the pixels within the corresponding sampling region which has/have been processed at step S5, and the sum thereof is compared with the sampling interval A. The counter value Snum is reset to "0" every time the process for one sampling region is finished, and incremented by "1" every time one pixel in the same sampling region is processed. If the sum is not greater than A, the process is still within the corresponding sampling region. Accordingly, through the execution of steps S5 and S6, pixel values of all the pixels included in the same sampling region are added to the sampling total counter value ST. Then, when answer at step S6 becomes positive, that is, the sum becomes greater than A, the routine proceeds from step S6 to step S7 where the sampling total counter value ST is divided by A to derive a mean value of the pixel values of all the pixels within the sampling region. Then, the derived mean value is added to the X-direction total counter value HT. Subsequently, at step S8, the sampling total counter value ST is reset to "0".

Similar to the seventh preferred embodiment, at step S5 in FIG. 39 where the mean value TMP/xnum·ynum is derived, it is necessary that xnum and ynum be subjected to division, that is, in the flowchart of FIG. 47, xnum and ynum are divided by the sampling interval A, respectively.

Figure 48:
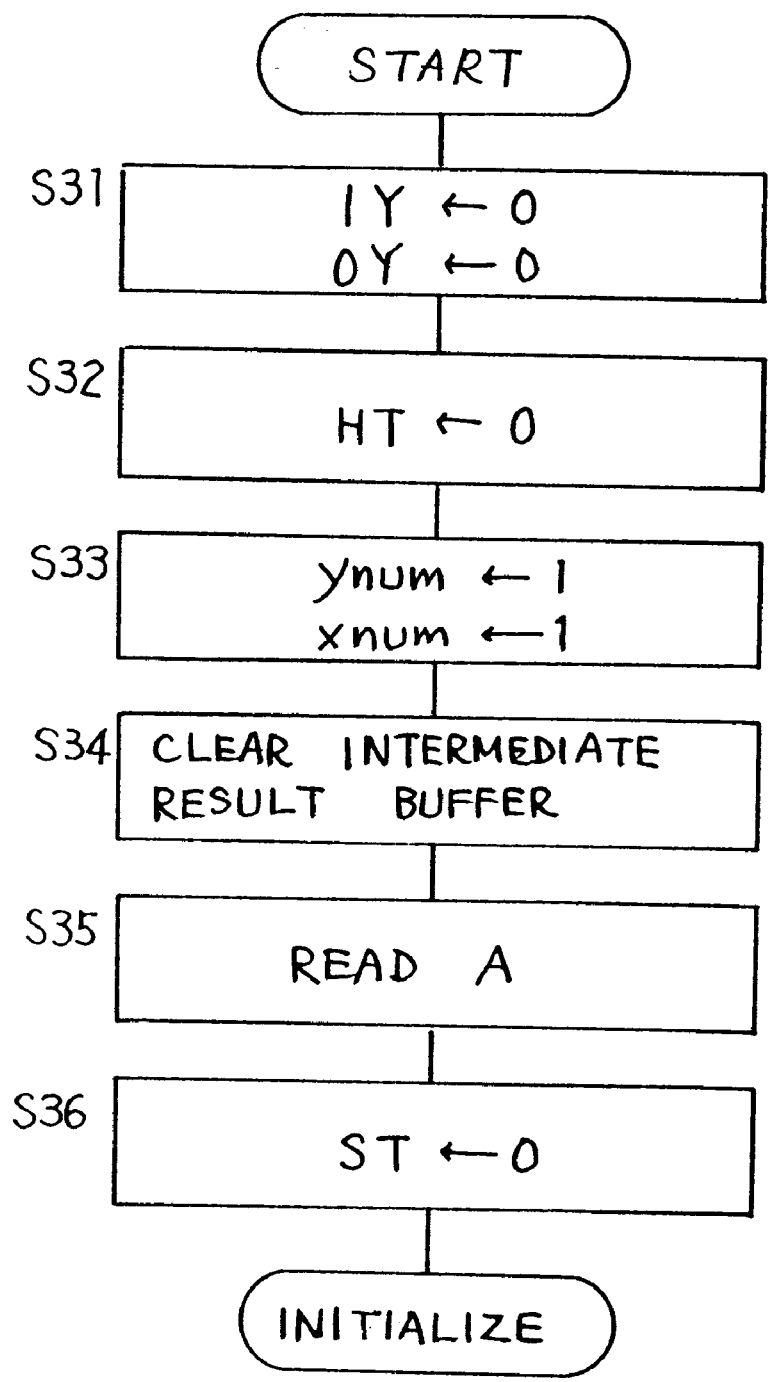
FIG. 48 is a flowchart of an initializing process according to the eighth preferred embodiment.

FIG. 48 is a flowchart of an initializing process corresponding to step S1 in FIG. 47.

As appreciated, steps S31 to S35 in FIG. 48 are the same as steps S1 to S5 in FIG. 43. On other hand, step S36 is a unique process in which the sampling total counter value ST is initialized to "0".

<Effect of Eighth Embodiment>

According to the eighth preferred embodiment, when a large number of the pixels are included in each small region so that, if pixel values of all the pixels are totaled, the overflow of each register of the intermediate result buffer is induced, the averaging process can be carried out without deteriorating the quality of the original image. Specifically, in this embodiment, since pixel values of all the pixels in each sampling region are averaged before adding to the intermediate result buffer, the overflow of the intermediate result buffer is prevented.

Although the explanation has been made only to the case where the sampling regions are set in the main scan direction, it is also possible to set similar sampling regions in the secondary scan direction so as to prevent the overflow of the intermediate result buffer.

<Ninth Embodiment>

In the foregoing preferred embodiments, when, for example, increasing the number of the pixels of the image data, it is necessary to calculate integral magnifications (copy times) for the pixels per column and per line. Based on the result of the calculation, the X- and Y-direction magnification tables are prepared. Then, the data adjusting process is carried out by referring to the tables. Since the magnifications for the corresponding pixels can be obtained only by referring to the tables, the speed-up of the process can be realized. However, depending on the image size (the number of pixels), the data amount of the tables may become large to lower the memory efficiency. Accordingly, this embodiment provides a technique for calculating, easily and at high speed, integral magnifications for the pixels in the X- and Y-directions to render the magnification tables unnecessary, thereby to save the memory area.

Figure 49:
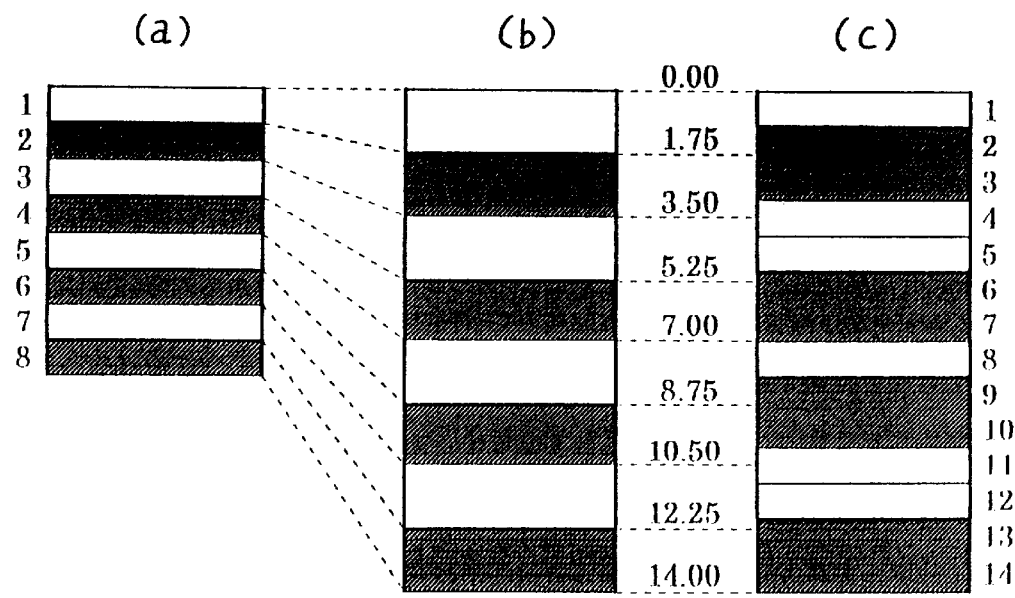
FIG. 49 is a diagram for explaining algorithm carried out in a ninth preferred embodiment of the present invention.

FIG. 49 is a diagram for explaining algorithm carried out in this embodiment.

In FIG. 49, (a) shows the original image, wherein each of white and black portions represents pixels for one line, and (b) shows the state wherein the original image is increased in number of pixels by 1.75 times in the Y-direction. If each line can be increased in number of pixels by 1.75 times, that is, a real number magnification other than an integer, the state of (b) is resulted.

Specifically, the first line is increased to 0.00–1.75, the second line to 1.75–3.50, and the last eighth line to 12.25–14.00. Accordingly, the original 8 lines are increased to a width corresponding to 14 lines. However, in the image data, each line can be increased/decreased only by unit of integer. Specifically, a boundary between the lines needs to be an integer. Accordingly, it is defined that a boundary between the lines is an integer not exceeding a value obtained by a real number magnification. As a result, as shown at (c) in FIG. 49, the original 8 lines are increased to a width corresponding to 14 lines by increasing the first line one time, the second line two times, third line two times, the fourth line two times, the fifth line one time, the sixth line two times, the seventh line two times and the eighth line two times.

The foregoing integral magnification for each line can be derived through the following calculation:

$$MUL(n)=[n\cdot mul]-[(n-1)\cdot mul]$$

wherein mul=(output image size)/(input image size), [ ] is the Gauss' symbol and represents the maximum integer not exceeding a real number in the symbol, and n is a line number (starting from n=1).

The foregoing is directly applicable to a column (X-direction magnification). Accordingly, integral magnifications assigned to each pixel can be derived through the foregoing calculation. However, in the calculation, two-times integral calculation, two-times real number calculation and two-times conversion from real number to integer are carried out. Thus, the foregoing calculation takes much time. If this calculation is performed every time one pixel is processed, it takes impractically much time depending on CPU's.

According to the foregoing algorithm, integral magnifications assigned to the respective lines will be analyzed.

The magnification of each line is at minimum an integral part of the real number magnification. Specifically, in case of 1.75 times, the magnification of the line is one time at minimum and, in case of 2.5 times, two times at minimum. Further, only when a decimal part is raised to unit, the magnification is increased by one. Specifically, if a designated real number magnification is mul, each line is increased by BASE=[mul] times at minimum and, only when a decimal part is raised to unit, BASE+1 times.

Accordingly, it is considered how to determine whether a decimal part is raised to unit. Assuming that a decimal part of the designated real number magnification is set to DEC and a line number is set to n, it can be determined that raising to unit occurs when a decimal part of n·DEC is smaller than DEC.

Figure 50:
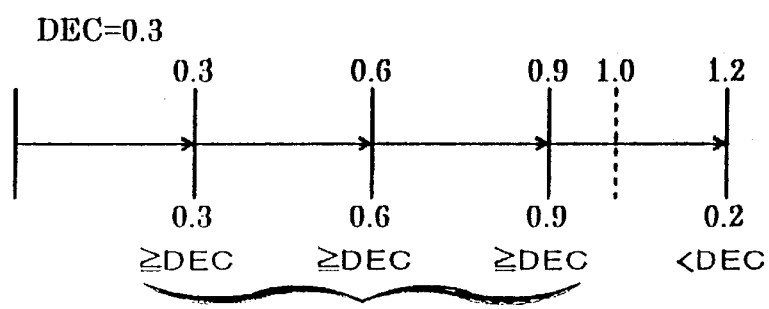
FIG. 50 is a diagram for explaining a method of determining an occurrence of raising to unit.

FIG. 50 is a diagram for explaining a method of determining an occurrence of raising to unit.

For example, it is assumed that DEC=0.3. A decimal part is 0.3 at the first line, 0.6 at the second line and 0.9 at the third line. At the fourth line, a decimal part becomes 0.2 and thus is raised to unit so that one line is added. As appreciated, the decimal parts at the first to third lines are not smaller than DEC, and the decimal part when raised to unit is 0.2 which is smaller than DEC. According to this algorithm, the followings are resulted:

As pre-processing, the following values are calculated in advance:

$$BASE=[mul]$$

$$DEC=mul-BASE$$

The magnification per line is derived in the following manner:

When the decimal part of DEC·n is not smaller than DEC, the magnification is BASE.

On the other hand, when the decimal part of DEC·n is smaller than DEC, the magnification is BASE+1.

The foregoing algorithm requires one-time real number multiplication, one-time real number comparison (real number subtraction) and one-time real number subtraction in which a decimal part is extracted from a real number. However, the number of calculation times is reduced as compared with the foregoing calculation process.

Now, the calculation process of this algorithm is accelerated using the limit of a register width. For example, it is assumed that a CPU width is 32 bits.

As pre-processing, the following values are calculated in advance:

$$BASE = [mul]$$

$$DEC = (mul - BASE) \cdot 2^{\wedge} + 1$$

DEC is held by an integral register of 32-bit width.

In the foregoing equations, BASE is an Integral part, DEC is a decimal part, ^ is an operator representing exponentiation or power, and +1 is added for raising a further low-place figure, if any, to a higher place.

Then, DEC is multiplied by a line number n of a line to be processed. A result of this calculation is set to DEC2.

$$DEC2 = DEC \cdot n$$

DEC2 is held by an integral register of 32-bit width.

Based on comparison between DEC and DEC2, an integral magnification is determined.

Specifically,

When DEC2 $\geq$ DEC, the magnification is BASE, when DEC2<DEC, the magnification is BASE+1

In the foregoing process, the 32-bit width integral register is used to express the decimal part in integer of 0 to 2^32−1. In the calculation of DEC·n, the integral part is intentionally overflown. As a result, the algorithm is used wherein the integral part is rendered invalid and only the decimal part remains. This is the high-speed algorithm in which only one-time integral multiplication and one-time integral comparison (integral subtraction) are carried out. However, in this algorithm, the decimal part is rounded to an integer of 0 to 2^32−1. Accordingly, it is possible not to exactly coincide with a result of the floating-point arithmetic. The accuracy of the process is improved as a register width is increased, for example, to 64 bits or 128 bits.

Figure 51:
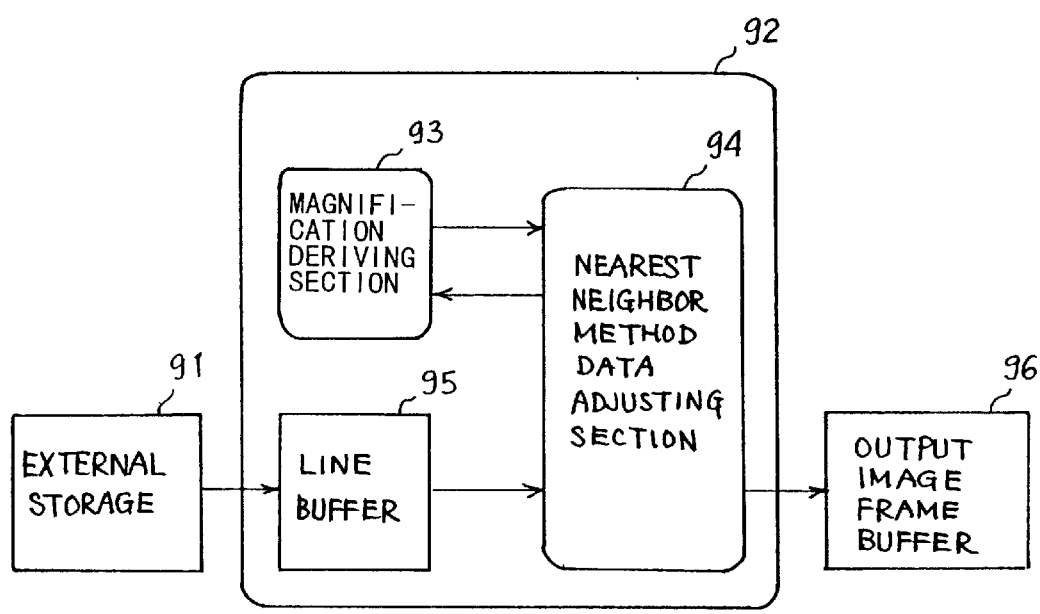
FIG. 51 is a block diagram showing an image data adjusting device according to the ninth preferred embodiment.

FIG. 51 is a block diagram showing an image data adjusting device 92 according to the ninth preferred embodiment.

The device 92 comprises a magnification deriving section 93, a nearest neighbor method data adjusting section 94 and a line buffer 95. An output of the device 92 is fed to an output image frame buffer 96.

An external storage 91 stores input image data before data adjustment. The output image frame buffer 96 stores an output image after data adjustment based on the nearest neighbor method.

The nearest neighbor data adjusting section 94 applies a data adjusting process to line image data in the line buffer 95 based on integral magnifications calculated by the magnification deriving section 93 and outputs the adjusted image data to the output image frame buffer 96. The magnification deriving section 93 receives coordinate values of an input pixel from the data adjusting section 94 and calculates integral magnifications corresponding to the received input pixel. The line buffer 95 reads in the input image data per line from the external storage 91 and holds the line image data.

Figure 52:
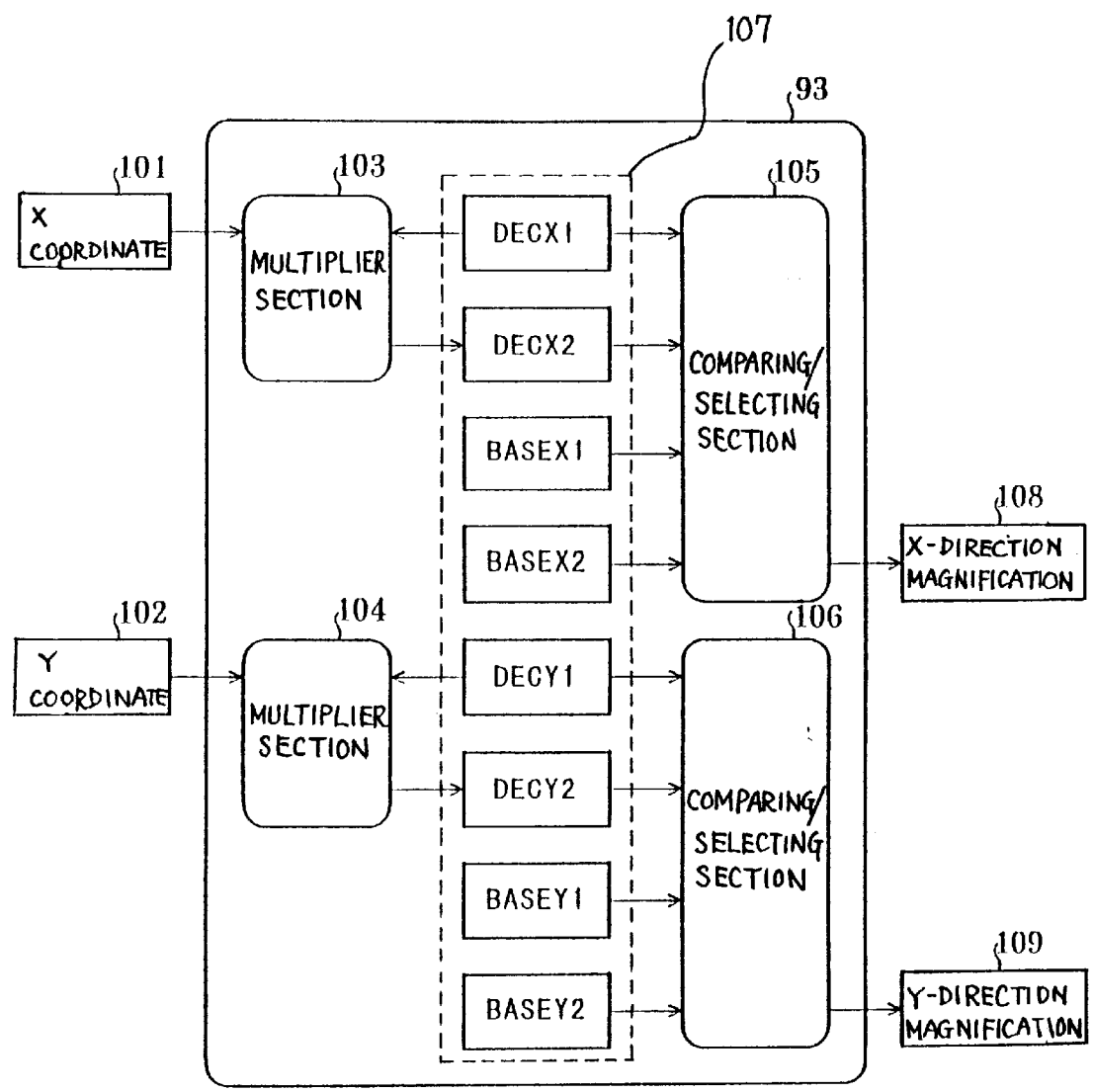
FIG. 52 is a block diagram showing a magnification deriving section according to the ninth preferred embodiment.

FIG. 52 is a block diagram showing the magnification deriving section 93 shown in FIG. 51.

The magnification deriving section 93 comprises multiplier sections 103 and 104, comparing/selecting sections 105 and 106, and a magnification calculator 107. The magnification calculator 107 comprises registers DECX1, DECX2, BASEX1, BASEX2, DECY1, DECY2, BASEY1 and BASEY2. The multiplier section 103 receives an X coordinate 101 and carries out given integral multiplication. The multiplier section 104 receives a Y coordinate 102 and carries out given integral multiplication.

The comparing/selecting section 105 receives outputs of the registers DECX1, DECX2, BASEX1 and BASEX2, selects one of the outputs of BASEX1 and BASEX2, and outputs it as an X-direction magnification 108. The comparing/selecting section 106 receives outputs of the registers DECY1, DECY2, BASEY1 and BASEY2, selects one of the outputs of BASEY1 and BASEY2, and outputs it as a Y-direction magnification 109. The X coordinate 101 and the Y coordinate 102 are the coordinate values of the pixel to be processed as designated by the data adjusting section 94.

The X-direction magnification 108 and the Y-direction magnification 109 are outputted from the magnification deriving section 93 to the data adjusting section 94. Accordingly, the integral magnifications in the X- and Y-directions corresponding to the designated coordinate values are outputted, respectively.

Figure 53:
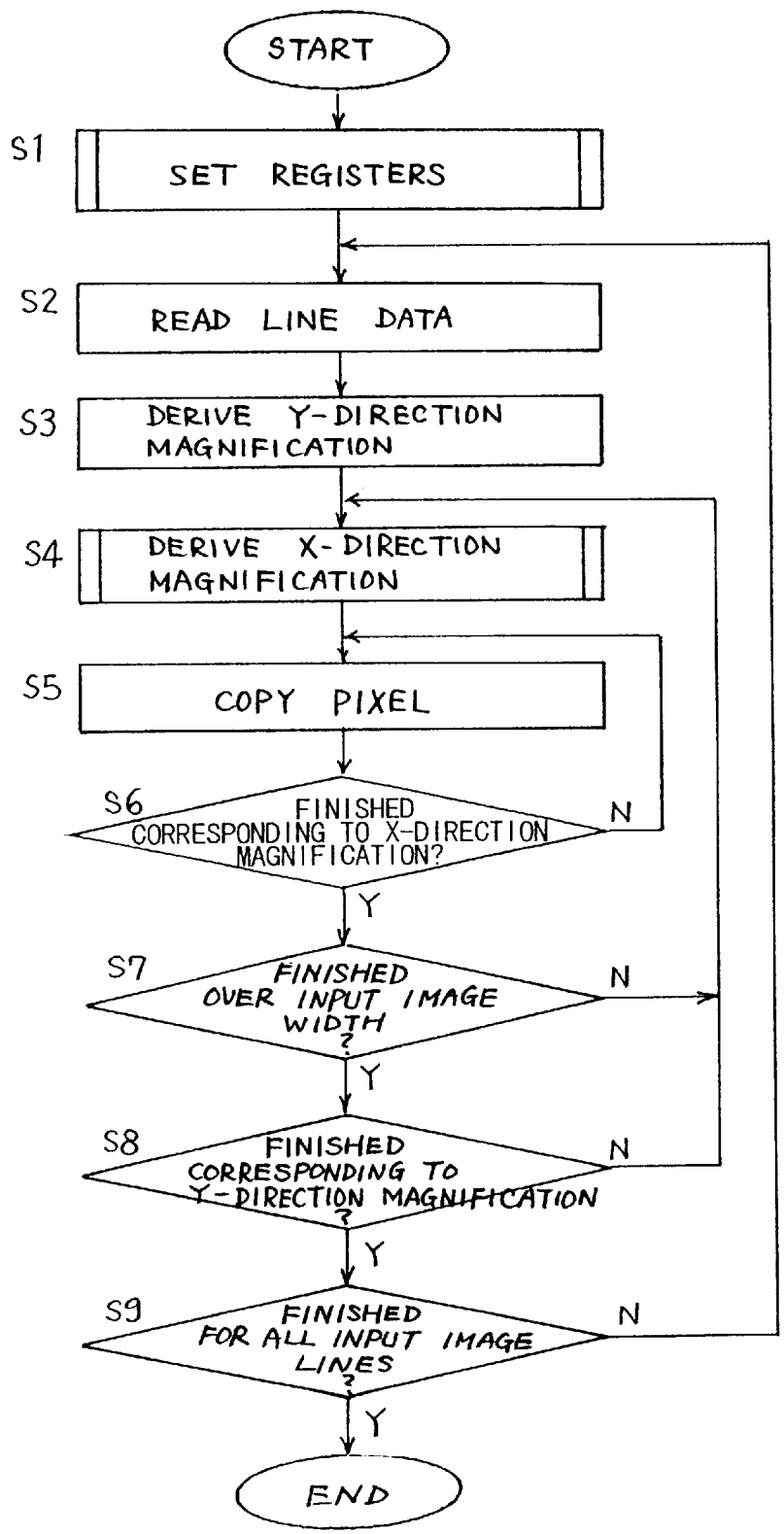
FIG. 53 is a flowchart representing an operation of the image data adjusting device according to the ninth preferred embodiment.

FIG. 53 is a flowchart showing an operation of the image data adjusting device shown in FIG. 51, that is, an image data adjusting method according to the ninth preferred embodiment.

First at step S1, setting of the registers in the magnification deriving section 93 is performed according to designated real number magnifications in the X- and Y-directions. The setting of the registers will be described later in detail.

Then, at step S2, one-line input image data is read into the line buffer 95 from the external storage 91. At step S3, the magnification deriving section 93 calculates an integral Y-direction magnification corresponding to a Y coordinate of the line data read into the line buffer 95. At step S4, the magnification deriving section 93 calculates an integral X-direction magnification corresponding to an X coordinate of a pixel in the line data to be processed.

Subsequently, the routine proceeds to step S5 where the pixel is copied and outputted to the output image frame buffer 96. Step S6 is a process for repeating the execution of step S5 corresponding to the X-direction magnification. Step S7 is a process for repeating the execution of steps S4 to S6 over the width of the input image. Step S8 is a process for repeating the execution of steps S4 to S7 corresponding to the Y-direction magnification. Step S9 is a process for repeating the execution of steps S2 to S8 for all the input image lines.

Through the foregoing process, copies of the input pixels are outputted to the output image frame buffer from left to right and from upper to lower in turn of the input image data.

Figure 54:
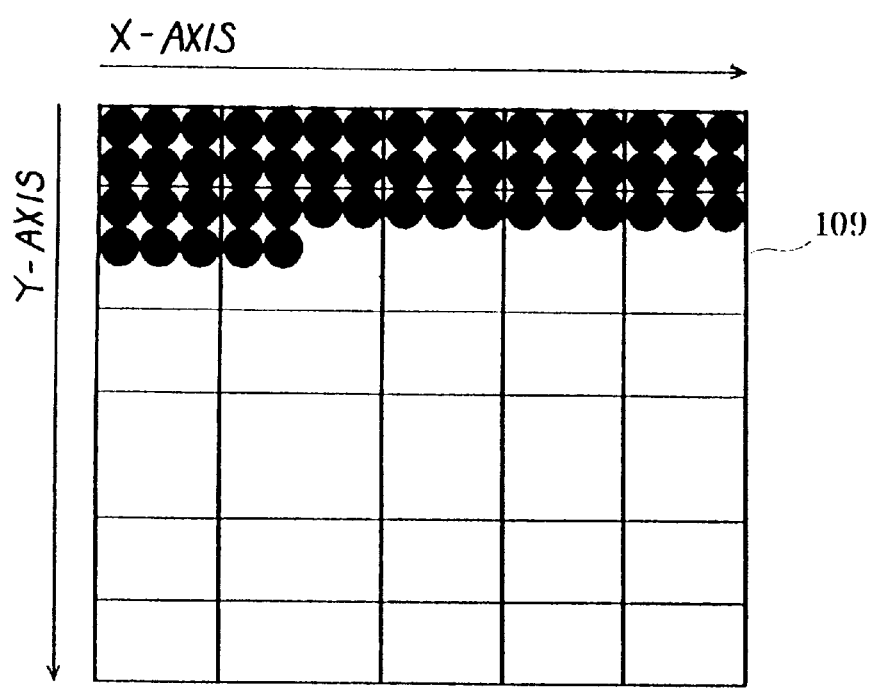
FIG. 54 is a diagram for explaining the course of a data adjusting process.

FIG. 54 is a diagram for explaining the course of the data adjusting process.

In the figure, black circles represent output pixels. On the other hand, each of rectangular regions corresponds to one input pixel. Since the magnifications are not integral both in the X- and Y-directions, the rectangular regions each corresponding to one input pixel correspond to different numbers of the output pixels, respectively.

Figure 55:
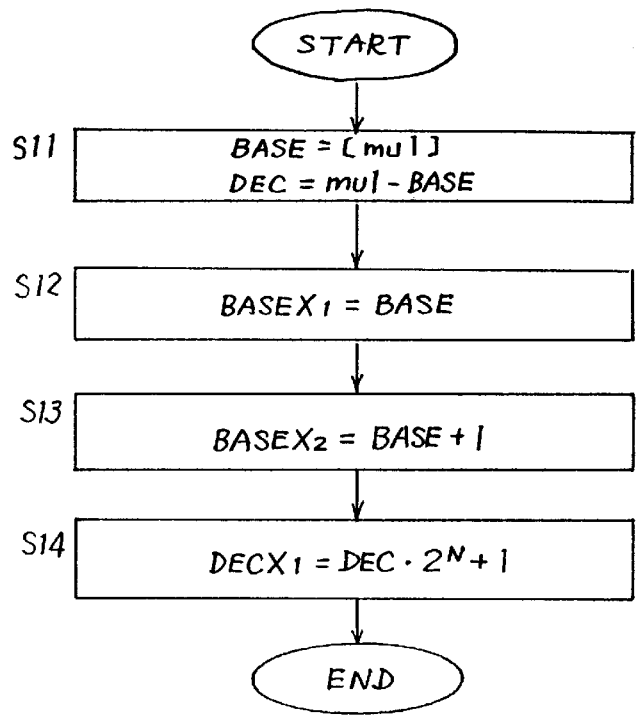
FIG. 55 is a flowchart for setting registers in the magnification deriving section.

FIG. 55 is a flowchart for setting the registers in the magnification deriving section 93.

The flowchart of FIG. 55 only deals with the X-direction. Since the Y-direction is dealt with in the same manner, explanation thereof is omitted.

It is assumed that the registers DECX1, DECX2, BASEX1 and BASEX2 have widths of N bits, respectively. Further, the designated real number magnification is represented by mul. It is further assumed that N=32 and mul=2.5.

In FIG. 55, at step S11, the designated real number magnification is separated into an integral part and a decimal part. Since mul=2.5, it follows that BASE=2 and DEC=0.5. Then, at step S12, the value of BASE is set in the BASEX1. Since a value greater than BASE by "1" is selected in case of an occurrence of raising to unit, BASE+1 is set in the BASEX2 at step S13. Specifically, BASEX1=2 and BASEX2=3.

Then, at step S14, an integer obtained by multiplying DEC by 2^N and adding "1" to the product of DEC and 2^N is set in the DECX1. Specifically, it is given by $$DECX1 = DEC \cdot 2^{\wedge}N + 1$$
$$= 0.5 \cdot 2^{\wedge}32 + 1$$
$$= 2{,}147{,}483{,}649$$

Now, calculation of an X-direction magnification is carried out.

Figure 56:
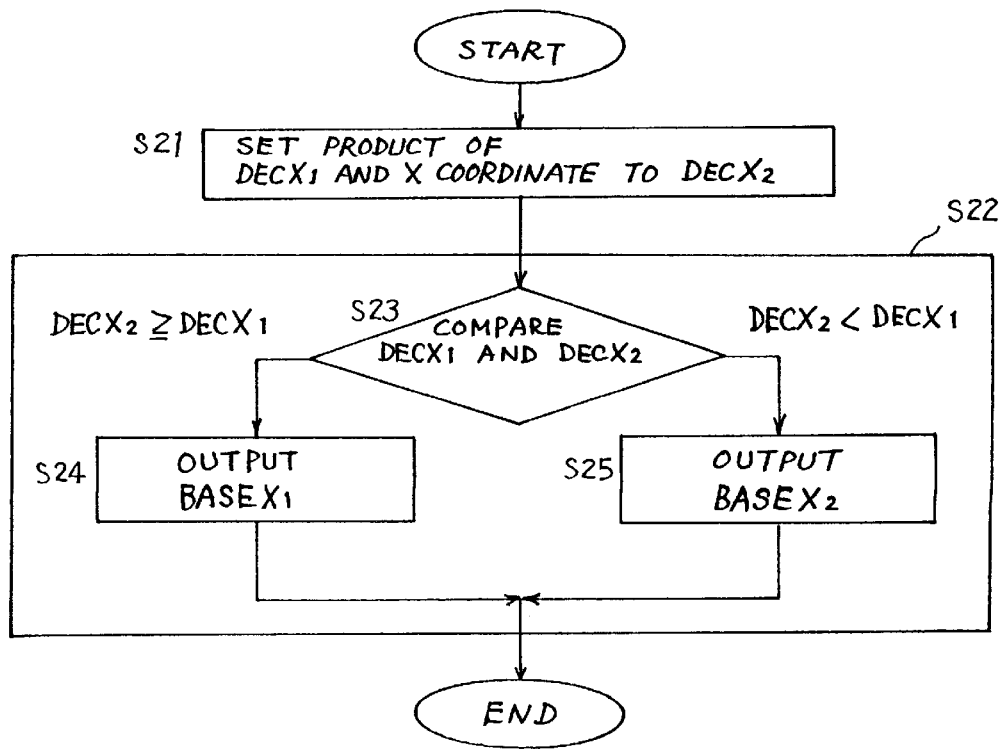
FIG. 56 is a flowchart for calculating an X-direction magnification.

FIG. 56 is a flowchart for calculating the X-direction magnification. Since a Y-direction magnification can also be calculated in the same manner, explanation thereof is omitted.

It is assumed that N=32, mul=2.5 and an X coordinate of an input pixel is 2(X=2). At step S21, the multiplier section 103 derives the product of the X coordinate designated by the data adjusting section 94 and DECX1 and sets the product in the DECX2. Then, at step S22, according to a result of step S23, step S24 or S25 is executed.

Specifically, when DECX2≧DECX1, there is no occurrence of raising to unit so that BASEX1 is outputted at step S24. On the other hand, when DECX2<DECX1, raising to unit occurs so that BASEX2 is outputted at step S25. In this manner, the X-direction magnification is obtained by selecting one of BASEX1 and BASEX2.

With the foregoing arrangement, the calculation of the integral magnification depending on the coordinate value can be achieved only by integral multiplication and comparison/selection.

<Effect of Ninth Embodiment>

According to the ninth preferred embodiment, when calculating an integral magnification in the X- or Y-direction based on the nearest neighbor method, the calculation thereof can be accelerated using the limit of the register width. This eliminates the necessity for preparing in advance the magnification tables. Thus, the memory area for storing the tables can be saved so that the memory efficiency is improved. Further, the image data increasing/decreasing process by the real number magnification based on the nearest neighbor method can be carried out at high speed with reduced memory capacity.

<Tenth Embodiment>

In the method of first degree interpolation described in the foregoing fourth preferred embodiment, the neighborhood area tables as shown in FIG. 18 are used. In this embodiment, the algorithm of the foregoing ninth preferred embodiment is adopted to eliminate the necessity for the neighborhood area tables.

Using FIG. 57, the neighborhood area will be explained again hereinbelow.

Figure 57:
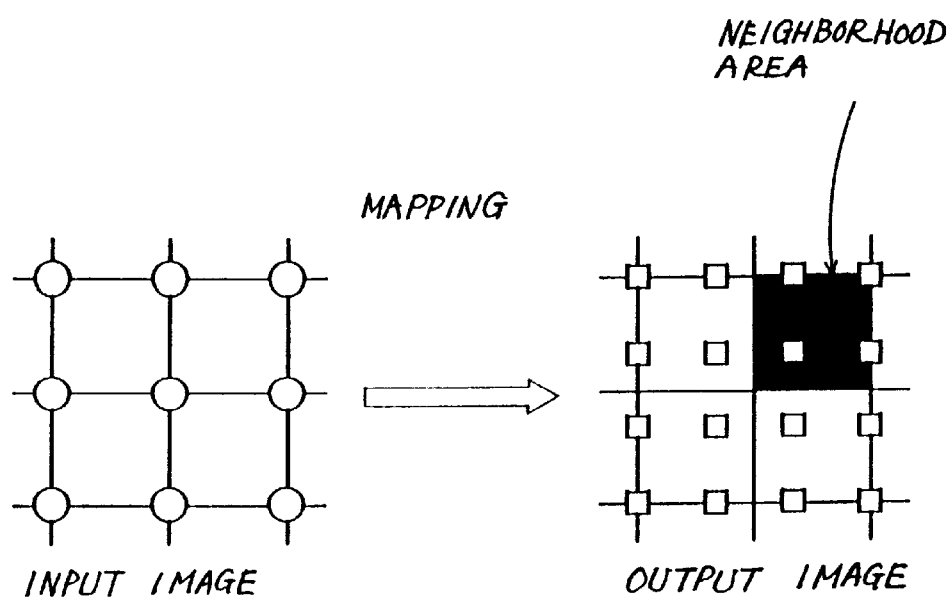
FIG. 57 is a diagram for explaining the neighborhood area.

FIG. 57 shows an input image on the left and an output image on the right.

As shown in the figure, when lattices formed by input pixels are mapped on the output image, regions surrounded by the mapped lattices are set to be the neighborhood areas. The first degree interpolation is carried out per neighborhood area. The number of output pixels in each of the neighborhood areas in the X- or Y-direction can be derived from the following equations:

When $A=1$, $MUL(n)=B$

When $A \neq 1$, $MUL(0)=1$ $MUL(n)=[n \cdot mul]-[(n-1) \cdot mul](n>0)$ wherein mul=(B−1)/(A−1)

Similar explanation is given in the foregoing fourth preferred embodiment.

In the foregoing equations,

A: input image size (the number of pixels) in X- or Y-direction

B: output image size (the number of pixels) in X- or Y-direction n: neighborhood area number (starting from n=O) in X- or Y-direction MUL(X): the number of pixels in X-th neighborhood area in X- or Y-direction

[ ]: Gauss' symbol representing the maximum integer not exceeding a real number in the symbol Similar explanation is given in the foregoing fourth preferred embodiment.

The foregoing equations are basically the same as the equations of the nearest neighbor method. However, in the first degree interpolation, MUL(X) always becomes "1" at the left end or the upper end. This is also shown in FIG. 18. The number of the output pixels included in the neighborhood area in the X- or Y-direction in the first degree interpolation and the integral magnification per input pixel in the X- or Y-direction in the nearest neighbor method are basically the same with each other.

Figure 58A:
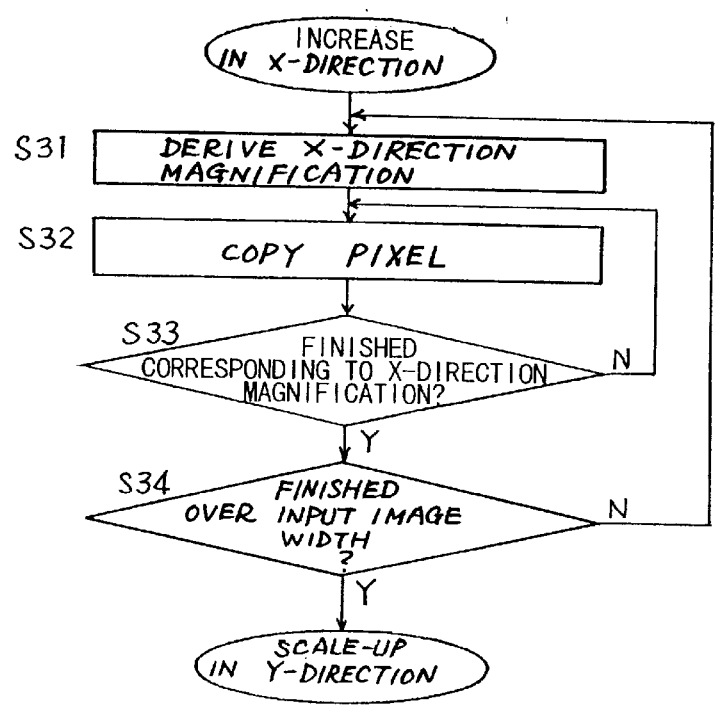
FIG. 58A is a flowchart of data adjusting process based on the nearest neighbor method.
Figure 58B:
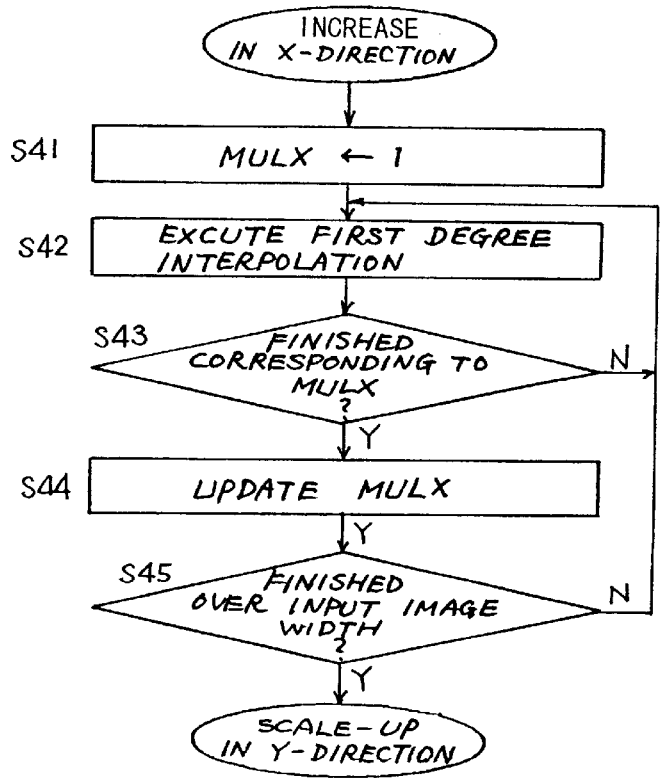
FIG. 58B is a flowchart of data adjusting process based on the first degree interpolation.

FIG. 58A is a flowchart of data adjusting process based on the nearest neighbor method, and FIG. 58B is a flowchart of data adjusting process based on the first degree interpolation.

In FIG. 58A, first at step S31, calculation of an X-direction magnification is executed. Then, at step S32, a pixel is copied by one. Subsequently, at step S33, it is checked whether the pixel has been copied corresponding to the X-direction magnification. If positive, the routine proceeds to step S34 where it is checked whether the pixels have been copied over the width of the input image. If positive, pixel copying in the Y-direction is further executed.

In FIG. 58B, first at step S41, MULX representing a current integral magnification in the X-direction is set to an initial value of "1". Then, at step S42, the first degree interpolation is executed. Subsequently, at step S43, it is checked whether the process is finished corresponding to MULX. Accordingly, the execution of step S42 is repeated by MULX times. Then, the routine proceeds to step S44 where MULX is updated. Subsequently, at step S45, it is checked whether the process is finished over the width of the input image. Accordingly, the execution of steps S42 to S44 is repeated to finish the first degree interpolation of the pixels in the X-direction over the width of the input image.

The calculation of the X-direction magnification at step S31 in FIG. 58A and the calculation of MULX at step S44 in FIG. 58B are the same with each other.

Accordingly, in the subsequent description, the number of the output pixels included in the neighborhood area is not distinguished from the integral magnification, and is identified as the integral magnification even in the first degree interpolation. The first degree interpolation is carried out for the neighborhood areas from upper to lower and from left to right. Accordingly, in a loop scanning all the neighborhood areas, the integral magnification becomes "1" at the first of the loop, and subsequently, the integral magnifications are derived in the same calculation method as the nearest neighbor method. There are two methods considered for setting only the integral magnification of the first neighborhood area to be "1", which are as follows:

(1) The loop is divided into one for the upper-end or left-end neighborhood area and one for the others;

(2) A condition check is added to the equation for calculating the integral magnification so that the integral magnification is set to "1" when a position of the pixel is at the upper end or the left end.

However, in case of the method (1), the process becomes complicate so that the program size is increased. In case of the method (2), since one condition check is added, the execution speed of the program is lowered.

This embodiment provides a method, wherein the program size is not so increased and the program execution speed is not lowered. Such a method can be realized by satisfying the following conditions:

(1) In addition to the variables used in the nearest neighbor method in the ninth preferred embodiment, a variable MULX representing a current integral magnification is provided;

(2) MULX is initialized to "1" at the head of the loop scanning the neighborhood areas;

(3) Calculation of the integral magnification is executed not at the head of the loop, but at a later stage of the loop.

With this arrangement, MULX is set to "1" at the head of the loop and subsequently to BASEX1 or BASEX2.

Although the explanation deals with the X-direction only, it is the same about the Y-direction.

Figure 59:
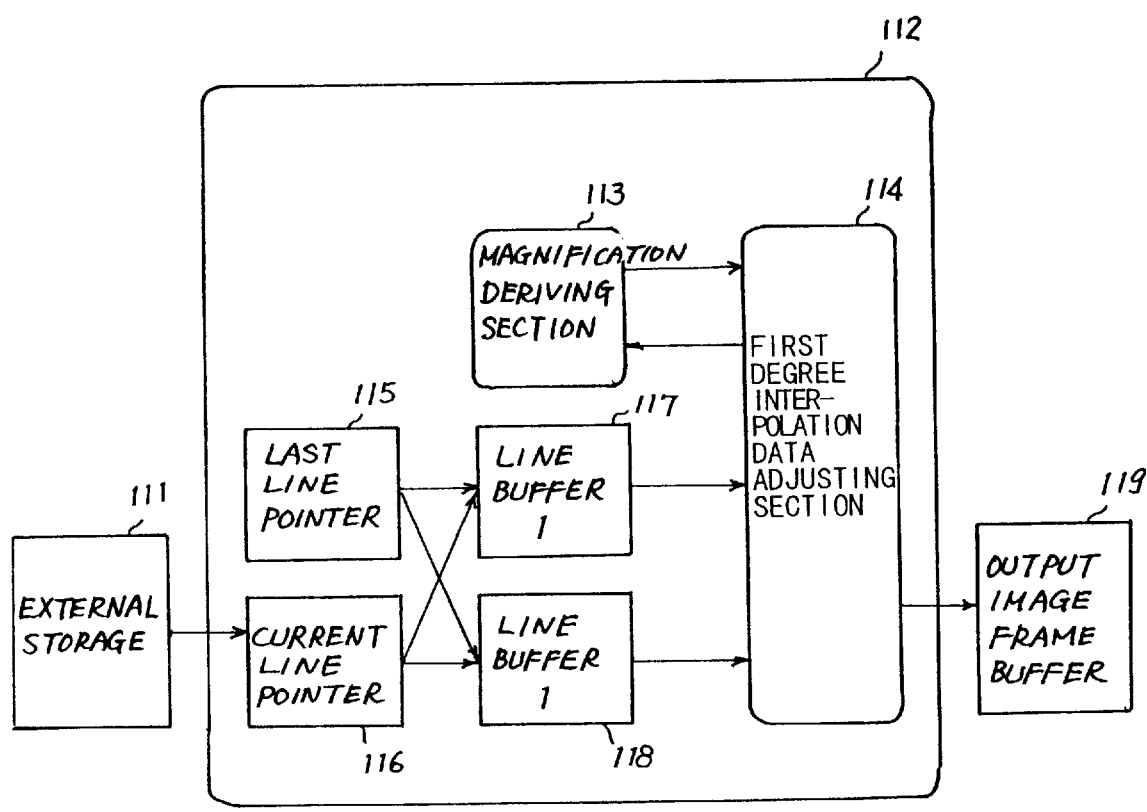
FIG. 59 is a block diagram showing an image data adjusting device according to a tenth preferred embodiment of the present invention.

FIG. 59 is a block diagram showing an image data adjusting device 112 according to the tenth preferred embodiment.

The device 112 comprises a magnification deriving section 113, a first degree interpolation data adjusting section 114, a last line pointer 115, a current line pointer 116, a line buffer 117 and a line buffer 118. An external storage 111 stores input image data before data adjustment, and an output of the device 112 is fed to an output image frame buffer 119.

As compared with the device of the ninth preferred embodiment, the device in this embodiment differs in that the last line pointer 115, the current line pointer 116, the line buffer 117 and the line buffer 118 are provided. Since the pixels of upper and lower two lines are necessary for defining the neighborhood areas, the line buffers 117 and 118 are provided for two-line data. Since the line buffers 117 and 118 alternately store upper line data and lower line data, respectively, the last line pointer 115 is arranged to point the upper line data while the current line pointer 116 is arranged to point the lower line data.

Figure 60:
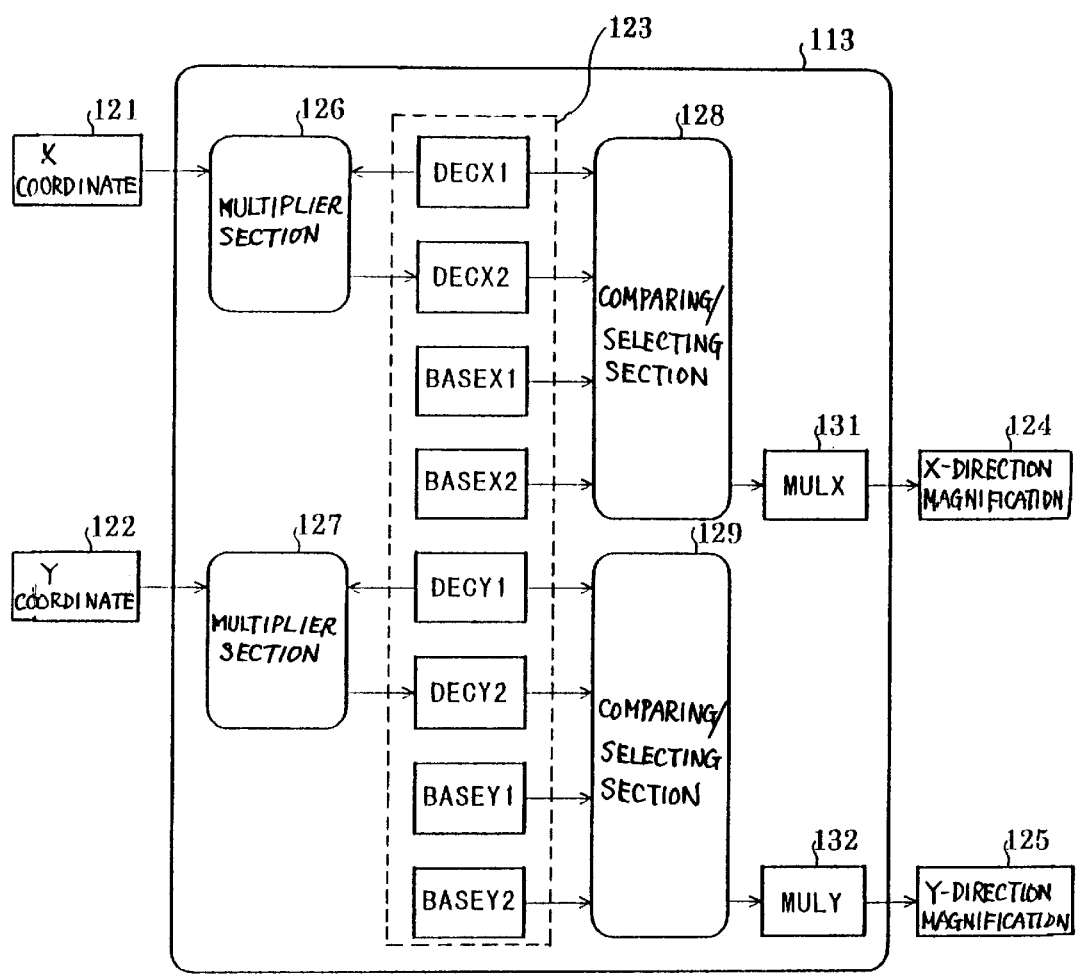
FIG. 60 is a block diagram showing a magnification deriving section according to the tenth preferred embodiment.

FIG. 60 is a block diagram showing the magnification deriving section 113.

Similar to the ninth preferred embodiment, the magnification deriving section 113 is a circuit for receiving an X coordinate 121 and a Y coordinate 122 and outputting an X-direction magnification 124 and a Y-direction magnification 125. In the magnification deriving section 113, multiplier sections 126 and 127, comparing/selecting sections 128 and 129 and a magnification calculator 123. The magnification deriving section in this embodiment differs from that in the ninth preferred embodiment in that a MULX 131 is provided at an output side of the comparing/selecting section 128 and a MULY 132 is provided at an output side of the comparing/selecting section 129.

These registers MULX and MULY are provided for storing the X- and Y-direction integral magnifications, respectively. By setting these registers to an initial value of "1", the magnification of the first neighborhood area can be set to "1".

Figure 61:
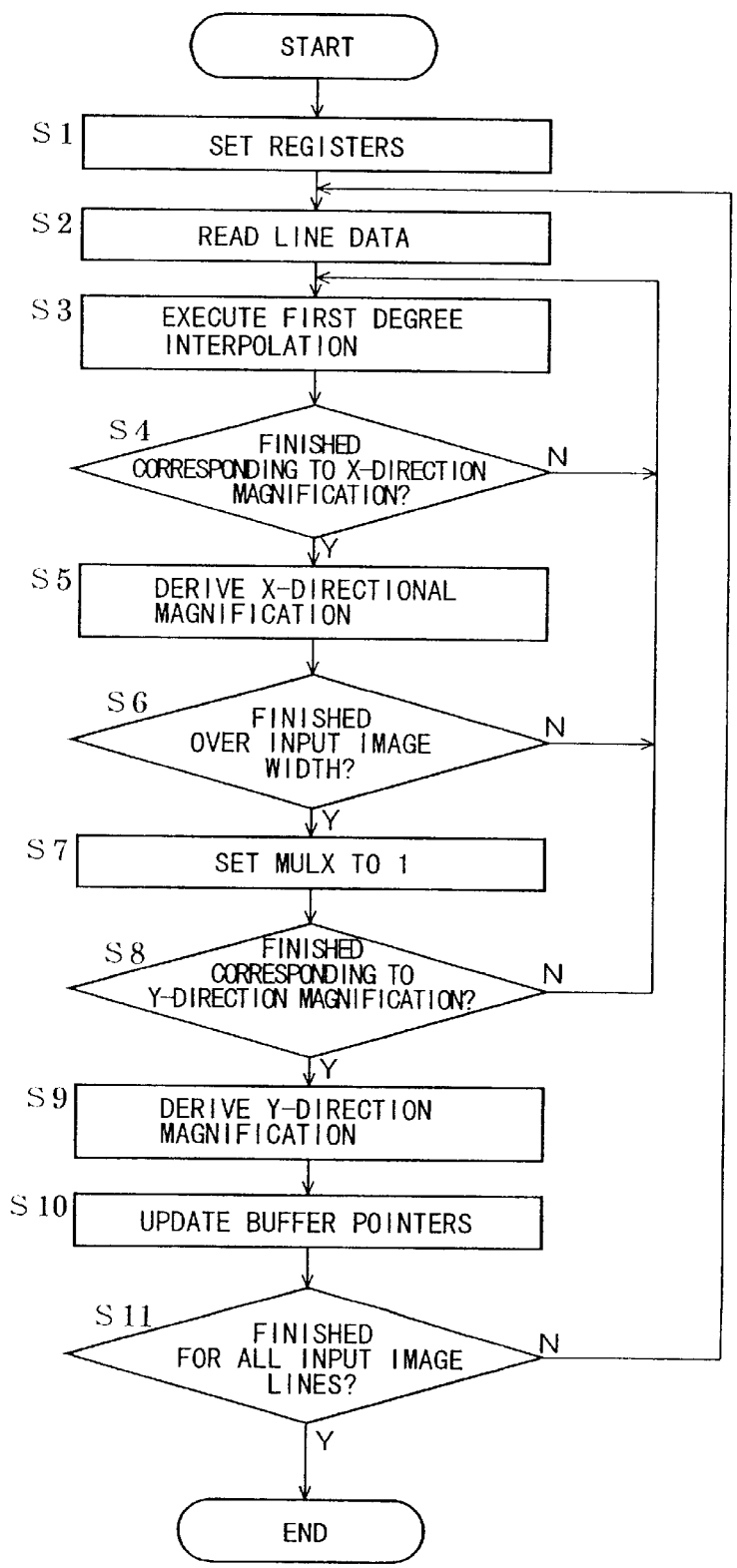
FIG. 61 is a flowchart representing an operation of the image data adjusting device according to the tenth preferred embodiment.

FIG. 61 is a flowchart showing an operation of the image data adjusting device shown in FIG. 59, that is, an image data adjusting method according to the tenth preferred embodiment.

First at step S1, setting of the registers in the magnification deriving section 113 is executed. Although the setting of the registers will be described later in detail, it is important that the registers MULX and MULY are set to "1", respectively. Then, at step S2, line data is read into the line buffer 117 or 118 pointed by the current line pointer 116 from the external storage 111.

At step S3, the first degree interpolation is carried out using the line buffers 117 and 118. Step S4 is a process for repeating the execution of step S3 corresponding to the X-direction magnification, that is, corresponding to a value of MULX. The register MULX representing the X-direction magnification is initialized to "1". When the process is finished corresponding to the X-direction magnification, the routine proceeds to step S5 where the X-direction magnification is calculated and stored in the MULX. Then, at step S6, it is checked whether the process is finished over the width of the input image.

At step S7, MULX is set to "1" for processing the next line. Step S8 is a process for repeating the execution of steps S3 to S7 corresponding to the Y-direction magnification, that is, corresponding to a value of MULY. The register MULY is also initialized to "1".

Then, at step S9, the Y-direction magnification is derived and stored in the MULY. At step S10, the buffer pointers are updated to switch the pointing line buffers. Then, at step S11, a control is carried out to repeat the execution of steps S2 to S10 for all the input image lines.

Figure 62:
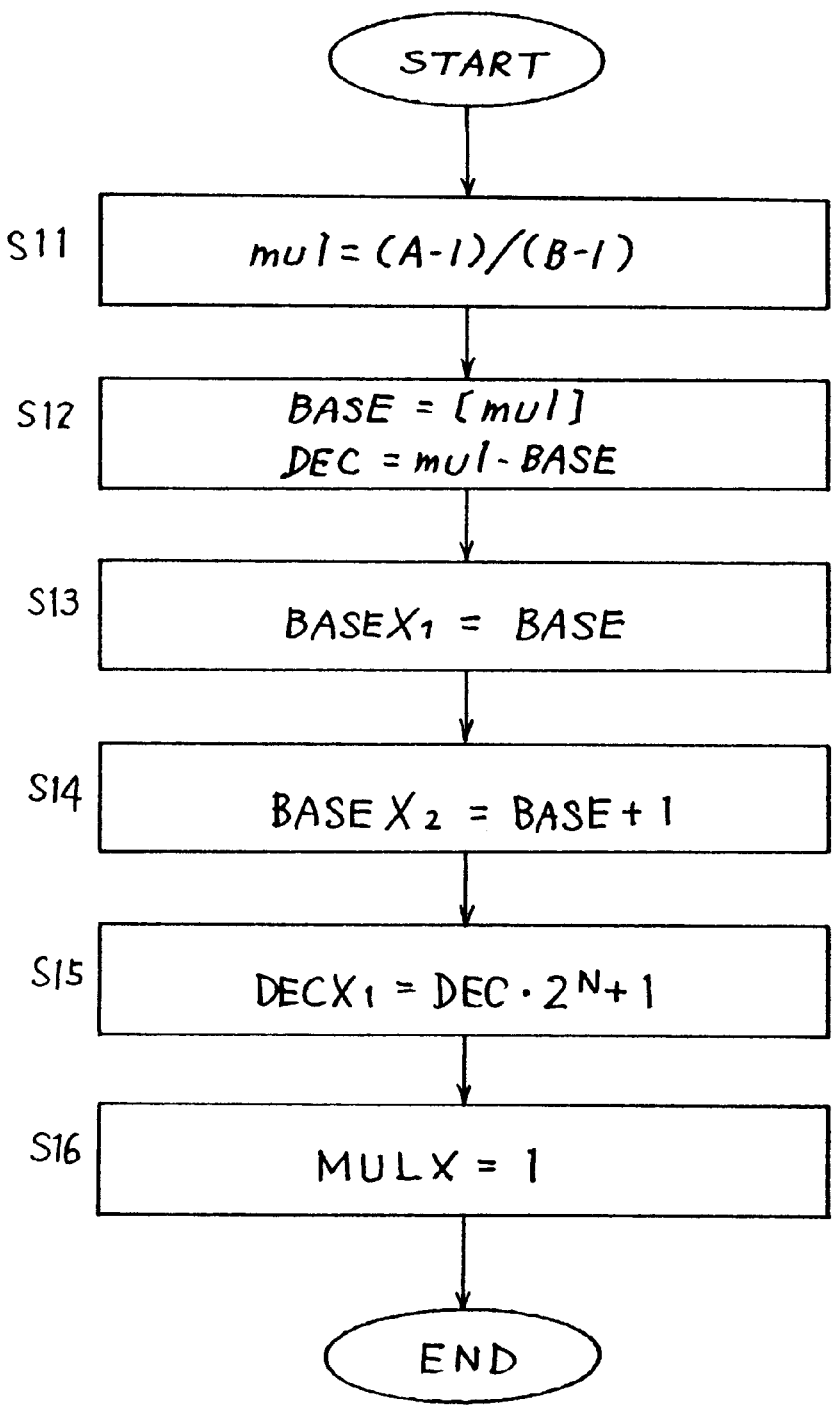
FIG. 62 is a flowchart for setting registers in the magnification deriving section.

FIG. 62 is a flowchart for setting the registers in the magnification deriving section 113.

Similar to the ninth preferred embodiment, it is assumed that the registers in the magnification deriving section 113 have widths of N bits, respectively. The flowchart of FIG. 62 only deals with the X-direction. Since the Y-direction is dealt with in the same manner, explanation thereof is omitted.

At step S11, a real number magnification mul is derived from a width A of the input image and a width B of the output image. Then, at step S12, the derived real number magnification is separated into an integral part and a decimal part. BASE represents the integral part and DEC represents the decimal part.

Subsequently, at step S13, the value of BASE is set in the BASEX1. Then, at step S14, BASE+1 is set in the BASEX2. Further, at step S15, a value obtained by multiplying DEC by $2^N$ and adding "1" to the product of DEC and $2^N$ is set in the DECX1. Finally, at step S16, MULX is initialized to "1". For example, if the width of the input image is 3 and the width of the output image is 6, mul is derived by the following equation:

$$mul = (6-1)/(3-1)$$
$$= 2.5$$

Further, DECX1 is derived by the following equation:

$$DECX1 = DEC \cdot 2\wedge N + 1$$
$$= 0.5 \cdot 2\wedge 32 + 1$$
$$= 2,147,483,649$$

The comparing/selecting section 128 shown in FIG. 60 selects one of BASEX1 and BASEX2 depending on a magnitude relationship between DECX1 and DECX2, and sets it in the register MULX as an X-direction magnification. DECX2 is the product of the X coordinate 121 and DECX1. When a retrieve result exceeds $2^N$, the comparison/selection to be performed by the comparing/selecting section 128 is as follows:

When DECX2≧DECX1, magnification is BASEX1;
When DECX2<DECX1, magnification is BASEX2.

By carrying out the foregoing calculation per neighborhood area, the necessity for storing the neighborhood area tables as shown in FIG. 18 is eliminated.

<Effect of Tenth Embodiment>

According to the tenth preferred embodiment, the algorithm of the ninth preferred embodiment is used in the image data adjusting process based on the first degree interpolation. By using the registers holding the X- and Y-direction magnifications, the necessity for storing the neighborhood tables is eliminated to improve the memory efficiency. Accordingly, the process for adjusting the image data in number of pixels in the first degree interpolation can be carried out at high speed and with reduced memory capacity.

<Eleventh Embodiment>

When an image to be printed protrudes from a printable region, it is necessary to cut the image for matching up with the size of the printable region. This cutting operation is called clipping.

Figure 63:
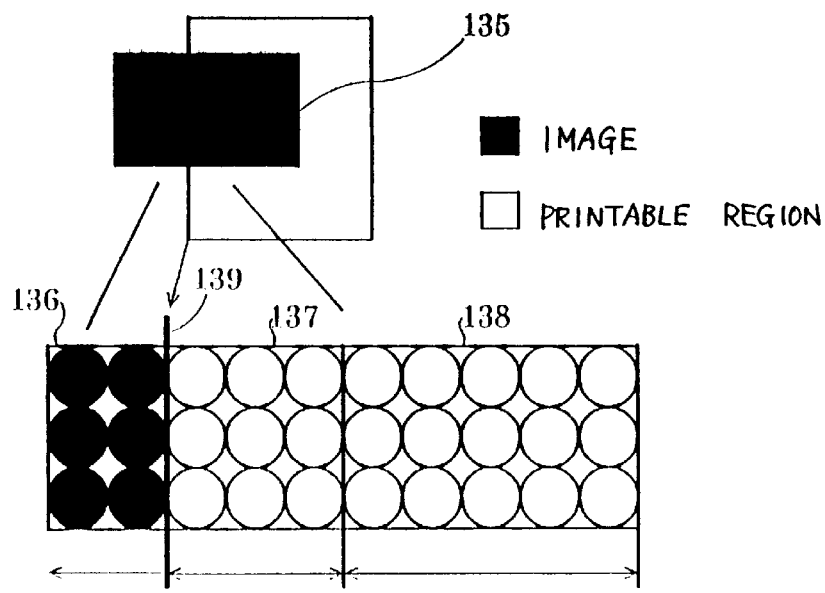
FIG. 63 is a diagram for explaining an example where clipping is necessary.

FIG. 63 is a diagram for explaining an example where the clipping is necessary.

In this example, an image is increased five times in number of pixels using the nearest neighbor method and then printed. A rectangular black portion 135 is the image increased five times. A dot structure thereof is shown below the image 135 in the figure, wherein circles represent pixels, respectively.

Assuming that a rectangular white portion is a printable region, the left side of the black portion 135 protrudes from the printable region. Accordingly, the protruding portion of the black portion 135 is clipped and not printed. A region 138 is increased in number of pixels by five times in the X-direction and is an effective portion. Although a region 137 and a region 136 are increased in number of pixels by five times in the X-direction, the left region 136 is clipped and not printed. In general, a clipping boundary 139 falls on the pixel-increased image. On the other hand, it is sufficient that the pixel increasing process is carried out only for the image within the printable region. That is, the black circle data in the region 136 can be simply discarded. Accordingly, in consideration of the clipping, a magnification of the image at a portion corresponding to the edge of the printable region may have a different value as compared with magnifications at other portions of the image.

In the example of FIG. 63, since the white pixels in the region 138 are all printed, the original image corresponding to the region 138 may be increased in number of pixels by five times. On the other hand, since the black circle pixels in the region 136 are not printed, the original image corresponding to the regions 136 and 137 may be increased in number of pixels by three times.

In the eleventh preferred embodiment, a technique is provided which is particularly suitable for clipping the image at the upper or left edge of the printable region.

In this embodiment, registers MULX and MULY are provided for storing X- and Y-direction magnifications, respectively. For the pixel located at a position corresponding to the upper or left edge of the printable region, the magnifications are not calculated, but initial values of the MULX and the MULY are used as the X- and Y-direction magnifications. This is similar to the tenth preferred embodiment. However, although the initial values of the MULX and the MULY are set to "1" in the tenth preferred embodiment, the initial values of the MULX and the MULY in this embodiment differ depending on conditions. Accordingly, the magnifications for the pixel located at a position corresponding to the upper or left edge of the printable region are calculated in advance.

Figure 64:
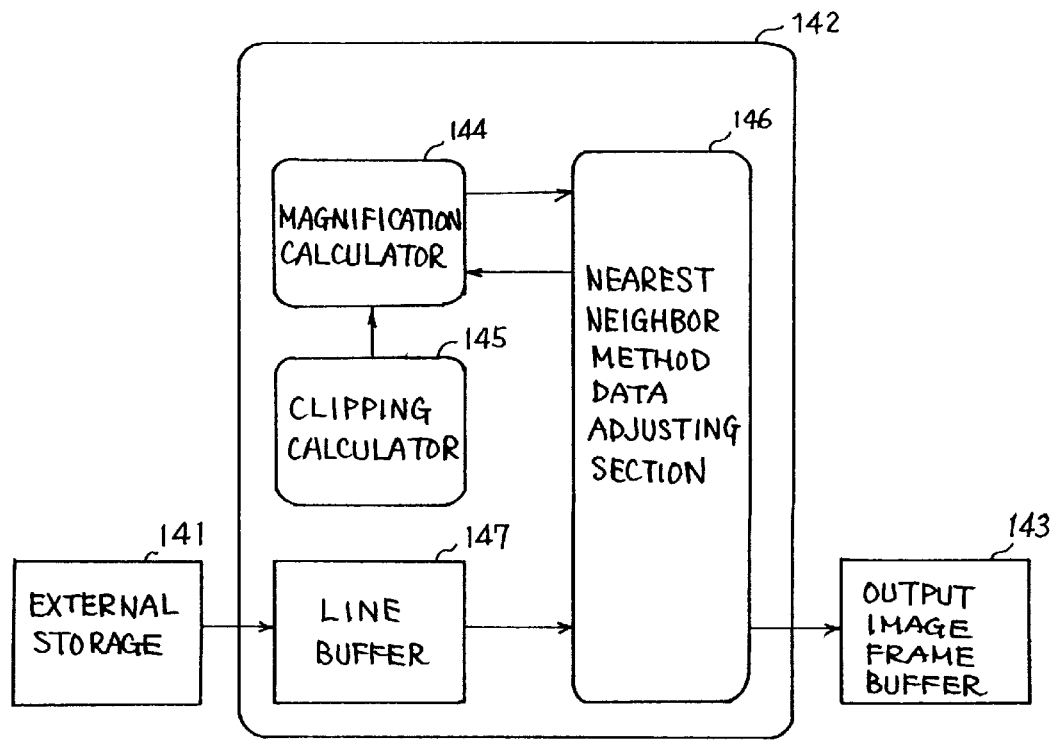
FIG. 64 is a block diagram showing an image data adjusting device according to an eleventh preferred embodiment of the present invention.

FIG. 64 is a diagram showing an image data adjusting device 142 according to the eleventh preferred embodiment.

The device 142 is connected between an external storage 141 and an output image frame buffer 143 and comprises a magnification deriving section 144, a clipping calculator 145, a nearest neighbor method data adjusting section 146 and a line buffer 147.

As compared with the device 92 shown in FIG. 51 (the ninth preferred embodiment), the device 142 differs in that the clipping calculator 145 is added. The clipping calculator 145 calculates, based on positional data about the pixels and data about the printable region, the magnifications for the pixel corresponding to the upper or left edge of the printable region. The derived magnifications are stored in the registers MULX and MULY provided in the magnification deriving section 144.

Figure 65:
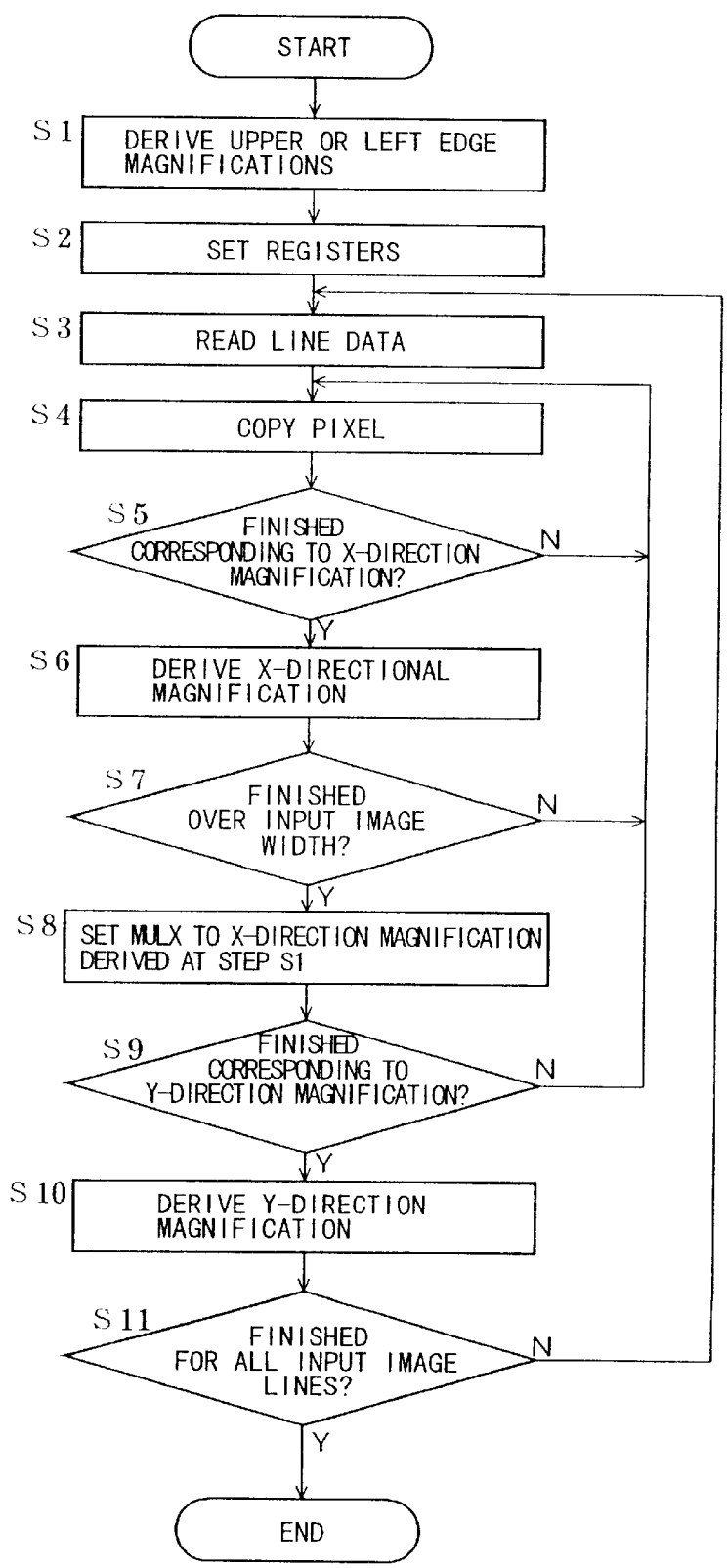
FIG. 65 is a flowchart representing an operation of the image data adjusting device according to the eleventh preferred embodiment.

FIG. 65 is a flowchart representing an operation of the image data adjusting device shown in FIG. 64, that is, an image data adjusting method according to the eleventh preferred embodiment.

First at step S1, the X- and Y-direction magnifications of the pixel at a position corresponding to the upper or left edge of the printable region are calculated using the clipping calculator 145. Then, at step S2, the registers in the magnification deriving section are initialized. In this case, the MULX and the MULY are set to the values derived at step S1. Subsequently, at step S3, one-line data is read into the line buffer 147 from the external storage 141.

Then, at step S4, a pixel is copied and outputted to the output image frame buffer 143. Subsequently, at step S5, a control is carried out to repeat the execution of step S4 corresponding to the X-direction magnification as represented by the value of the MULX. Then, at step S6, the X-direction magnification is calculated to update the value of the MULX. The calculation of the X-direction magnification is the same as that in the tenth preferred embodiment. Specifically, when DECX2≧DECX1, BASEX1 is selected and, when DECX2<DECX1, BASEX2 is selected.

Subsequently, at step S7, a control is carried out to repeat the execution of steps S4 to S6 over the width of the input image. Then, at step S8, the X-direction magnification derived at step S1 is set in the register MULX for processing the next line. Further, at step S9, a control is carried out to repeat the execution of steps S4 to S8 corresponding to the Y-direction magnification. Subsequently, at step S10, through calculation of the Y-direction magnification, the value of the register MULY is updated. The calculation of the Y-direction magnification is the same as that in the tenth preferred embodiment. Specifically, when DECY2≧DECY1, BASEY1 is selected and, when DECY2<DECY1, BASEY2 is selected. Then, at step S11, a control is carried out to repeat the execution of steps S3 to S10 for all the input image lines.

Figure 66:
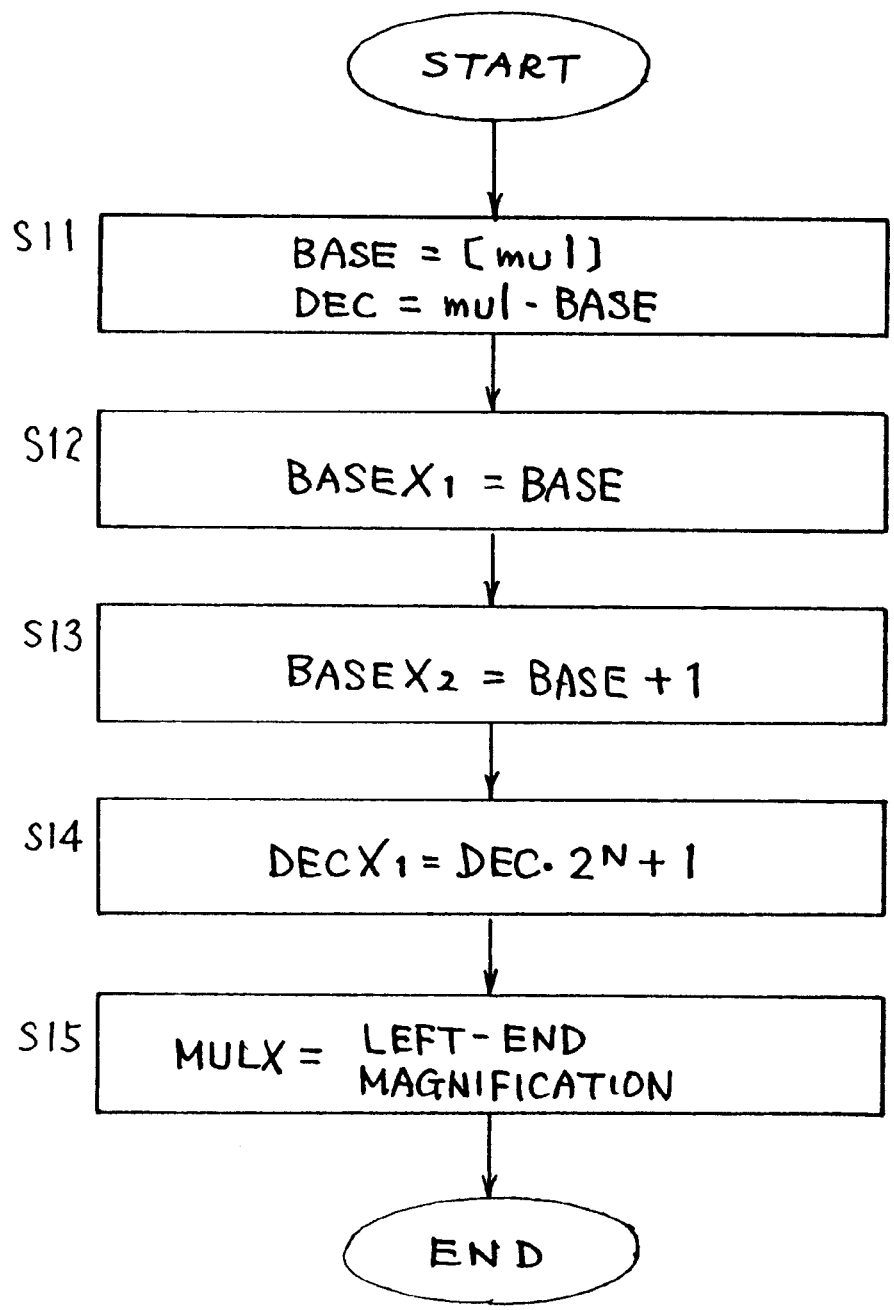
FIG. 66 is a flowchart for setting registers in a magnification deriving section.

FIG. 66 is a flowchart for setting the registers in the magnification deriving section 144.

Steps S11 to S14 are the same as those in FIG. 55 (the ninth preferred embodiment). Specifically, an integral part of a real number magnification mul is set in BASE and a decimal part thereof is set in DEC. Then, the value of BASE is set in the BASEX1, and BASE+1 is set in the BASEX2. Thereafter, a value obtained by multiplying DEC by $2^N$ and adding "1" to the product of DEC and $2^N$ is set in the DECX1. Finally, at step S15, the X-direction magnification derived by the clipping calculator at step S1 in FIG. 65 is set in the MULX.

<Effect of Eleventh Embodiment>

According to the eleventh preferred embodiment, even when the clipping is necessary in the image data adjusting process based on the nearest neighbor method, since the magnifications for the pixel corresponding to the upper or left edge portion of the printable region are derived in advance and stored in the registers, the data adjusting process can be carried out at high speed and with reduced memory capacity. Even in the data adjusting process based on the first degree interpolation, the clipping can be dealt with.

While the present invention has been described in terms of the preferred embodiments, the invention is not to be limited thereto, but can be embodied in various ways without departing from the principle of the invention as defined in the appended claims.

What is claimed is:

1. An image data adjusting method for increasing the number of pixels of input image data by a given magnification in a given direction to obtain output image data, the method comprising:

setting a tetragonal lattice including the pixels of the input image data at a corresponding position in an image represented by the output image data;

calculating first-degree-interpolating pixel values of output pixels included in the tetragonal lattice based on pixel values of part of the input pixels which are stored in buffer memories, wherein the tetragonal lattice is formed by four input pixels of the input image data, and a corresponding neighborhood area is written in the output image data, the output pixel values being derived from pixel values of the four input pixels using the first-degree-interpolating calculation;

using two line buffers to alternately receive and store new one-line input image data;

setting the capacity of each line buffer to be greater than the width of the input image by one pixel; and storing a dummy dot in each line buffer.

2. A method according to claim 1 further comprising:

storing the same pixel value in first and second elements of each line buffer.

3. An image data adjusting method for increasing the number of pixels of input image data by a given magnification in a given direction to obtain output image data, the method comprising:

setting a tetragonal lattice including the pixels of the input image data at a corresponding position in an image represented by the output image data;

calculating first-degree-interpolating pixel values of output pixels included in the tetragonal lattice based on pixel values of part of the input pixels which are stored in buffer memories;

deriving pixel values of all of the output pixels in a neighborhood area based upon the pixel value of an upper-left end output pixel;

wherein one of the output pixels in the tetragonal lattice is selected and subjected to a first-degree-interpolation, and each of the pixel values of the other output pixels in the tetragonal lattice is derived by applying a conversion process to a result of the first-degree-interpolation, the conversion process based on a positional relationship to the selected pixel;

wherein the deriving step is performed using dot interrelation; and wherein the deriving step is performed using a pixel value of an upper-left end output pixel, an interval in the X-direction between adjacent pixels, and an interval in the Y-direction between adjacent pixels, the method further comprising:

deriving pixel values of the pixels located at a right side or lower side relative to the upper-left end output pixel through a conversion process.

* * * * *